United States Patent
Ashour et al.

(10) Patent No.: US 12,376,142 B2
(45) Date of Patent: Jul. 29, 2025

(54) METHODS FOR ENHANCED SIDELINK COMMUNICATIONS WITH CLUSTERED OR PEER-TO-PEER FEDERATED LEARNING

(71) Applicant: QUALCOMM Incorporated, San Diego, CA (US)

(72) Inventors: Mahmoud Ashour, San Diego, CA (US); Kapil Gulati, Belle Mead, NJ (US); Kyle Chi Guan, New York, NY (US); Libin Liu, Monterey Park, CA (US); Anantharaman Balasubramanian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 356 days.

(21) Appl. No.: 17/821,104

(22) Filed: Aug. 19, 2022

(65) Prior Publication Data

US 2024/0064793 A1  Feb. 22, 2024

(51) Int. Cl.
*H04W 72/542* (2023.01)
*G06N 20/00* (2019.01)
(Continued)

(52) U.S. Cl.
CPC .......... *H04W 72/542* (2023.01); *G06N 20/00* (2019.01); *H04W 28/26* (2013.01);
(Continued)

(58) Field of Classification Search
None
See application file for complete search history.

(56) References Cited

U.S. PATENT DOCUMENTS

2020/0178269 A1  6/2020  Haas et al.
2022/0180251 A1  6/2022  Pezeshki et al.
(Continued)

FOREIGN PATENT DOCUMENTS

WO  2021234164 A2  11/2021
WO  2022060748 A1  3/2022

OTHER PUBLICATIONS

3GPP TS 23.303: "3rd Generation Partnership Project; Technical Specification Group Services and System Aspects; Proximity-Based Services (ProSe); Stage 2 (Release 12)", 3GPP TS 23.303 V12.8.0 (Mar. 2016), pp. 1-58.
(Continued)

*Primary Examiner* — Xavier S Wong
(74) *Attorney, Agent, or Firm* — Arent Fox, LLP

(57) ABSTRACT

Aspects are provided which allow a UE to achieve sidelink parameter coordination through various signaling in clustered FL or peer-to-peer FL. The UE provides a first ML model information update and a measurement associated with the update. The UE obtains an aggregated ML model information update aggregating the first update with a second ML model information update of either a first network node in a FL cluster including the UE or a second network node in a second FL cluster. The UE provides a sidelink communication parameter in SCI to a network node, which parameter is an output of an ML model associated with the aggregated ML model information update. As a result, UEs may derive common SCI parameters from their updated ML models to apply in sidelink communications, thereby leading to maximized packet reception rate, maximized throughput, or minimized latency in communication.

35 Claims, 32 Drawing Sheets

(51) Int. Cl.
  *H04W 28/26* (2009.01)
  *H04W 72/0446* (2023.01)
  *H04W 72/20* (2023.01)
  *H04W 76/20* (2018.01)
  *G06N 3/04* (2023.01)

(52) U.S. Cl.
  CPC ....... *H04W 72/0446* (2013.01); *H04W 72/20* (2023.01); *H04W 76/20* (2018.02)

(56) References Cited

U.S. PATENT DOCUMENTS

2022/0237507 A1* 7/2022 Bai ................ H04W 72/21
2022/0377614 A1* 11/2022 Balakrishnan .... H04W 28/0925
2023/0325679 A1* 10/2023 Wang ................ G06N 3/045
  706/25

OTHER PUBLICATIONS

International Search Report and Written Opinion—PCT/US2023/071793—ISA/EPO—Nov. 3, 2023.

\* cited by examiner

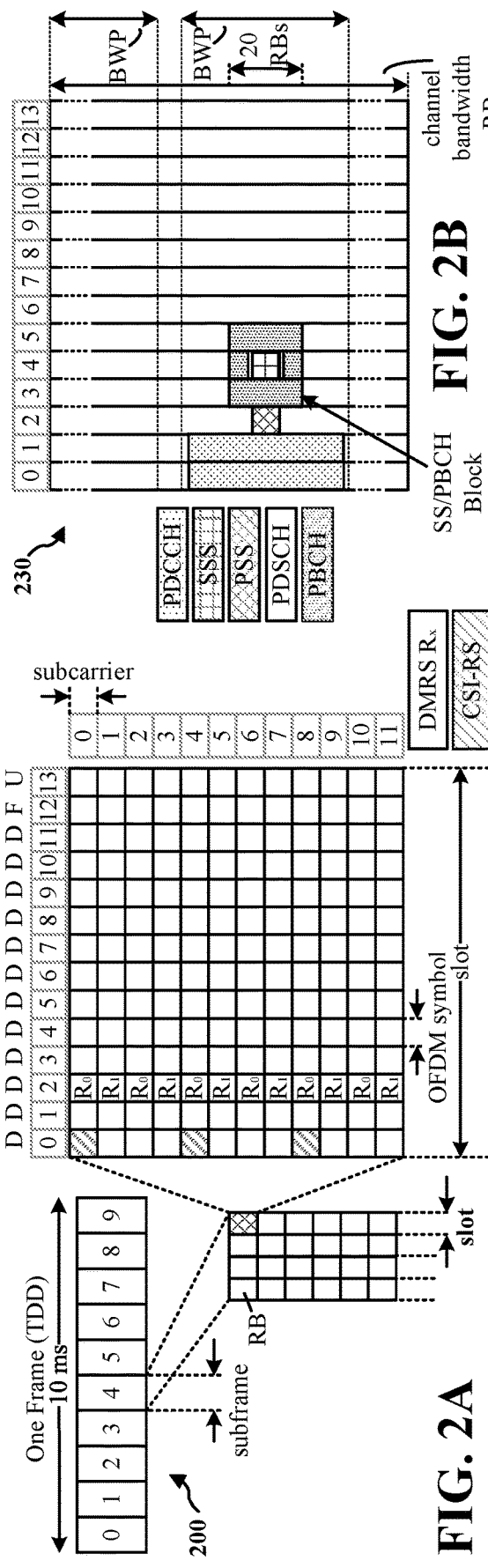
FIG. 2A
FIG. 2B
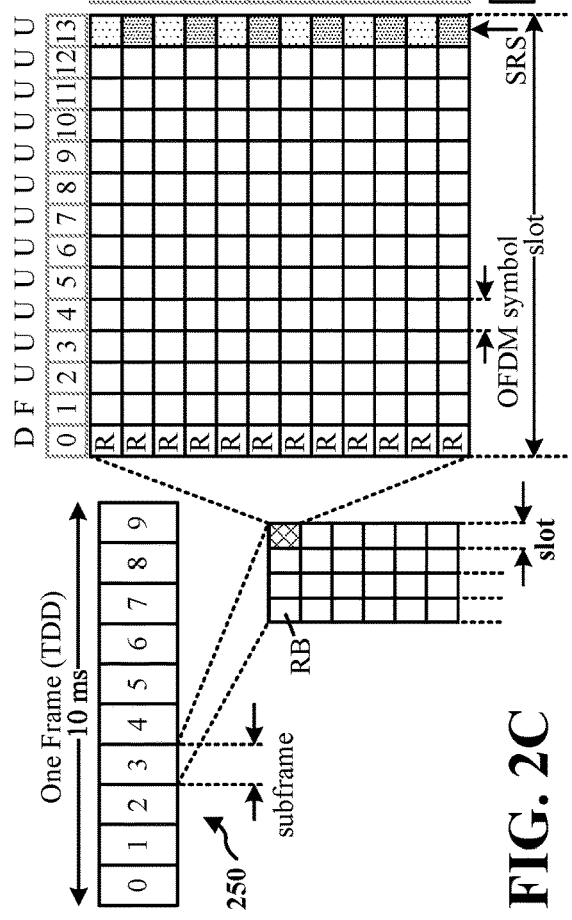
FIG. 2C
FIG. 2D

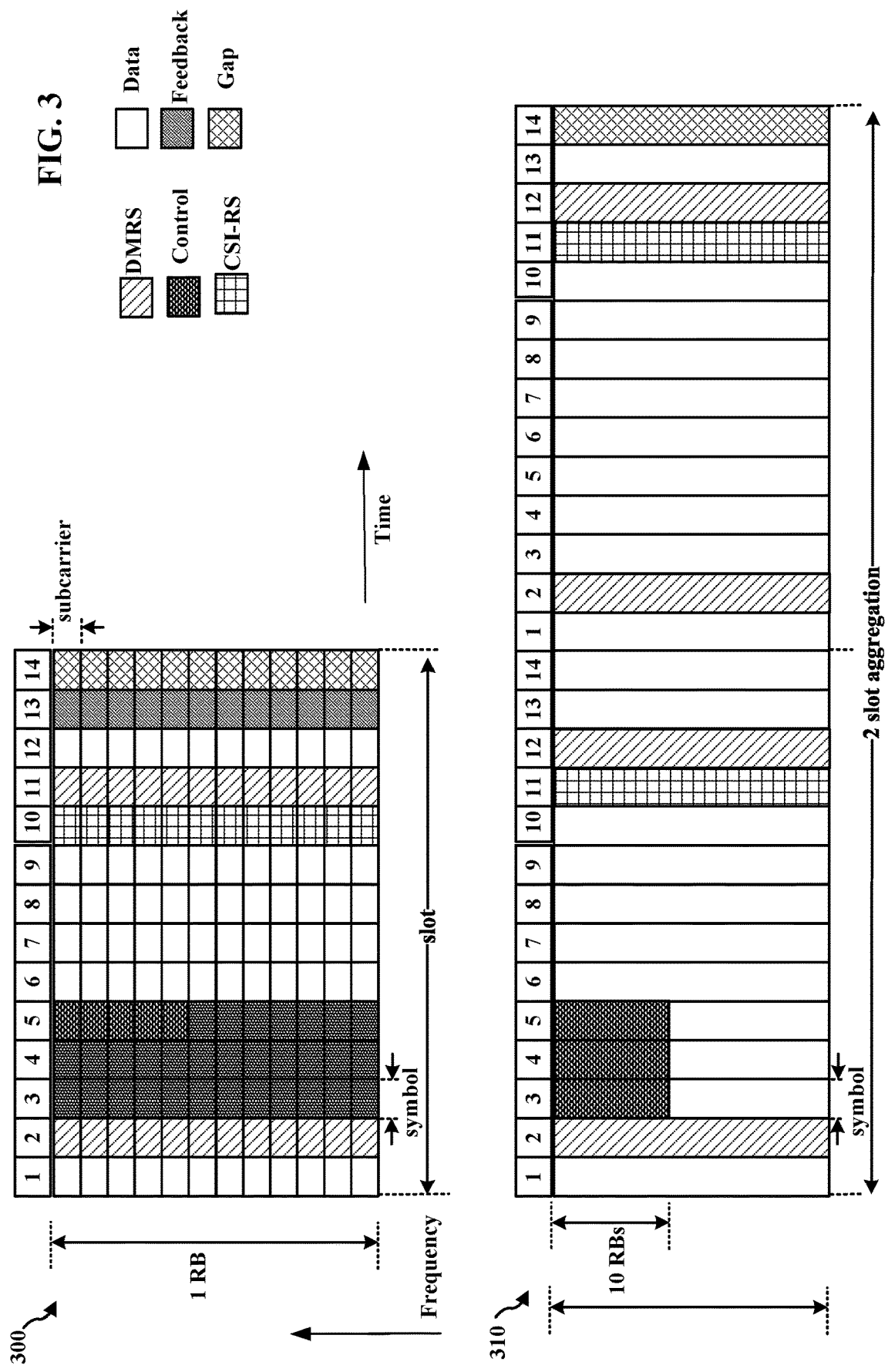

2900

2902

Obtain A First ML Model Information Update And A Measurement Associated With The First ML Model Information Update

2904

Obtain, From An FL Cluster Leader, An Identifier Of A Network Node In An FL Cluster And An Individual Measurement Of The Network Node, Where The Individual Measurement Of The Network Node Is An Outlier To The Measurement

2906

Provide An Aggregated ML Model Information Update, Where The Aggregated ML Model Information Update Includes An Aggregation Of The First ML Model Information Update With A Second ML Model Information Update Of A Network Node In An FL Cluster; Where A Sidelink Communication Parameter In SCI Of A Network Node Is An Output Of An ML Model Associated With The Aggregated ML Model Information Update

2908

Provide A Message Indicating A Network Node Is A Cluster Member Of Another FL Cluster In Response To An Individual Measurement Of The Network Node Being An Outlier To The Measurement

FIG. 29

METHODS FOR ENHANCED SIDELINK COMMUNICATIONS WITH CLUSTERED OR PEER-TO-PEER FEDERATED LEARNING

INTRODUCTION

The present disclosure generally relates to communication systems, and more particularly, to wireless communication systems involving direct communication between wireless devices.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For example, some aspects of wireless communication include direct communication between devices, such as device-to-device (D2D), vehicle-to-everything (V2X), and the like. There exists a need for further improvements in such direct communication between devices. Improvements related to direct communication between devices may be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, an apparatus for wireless communication is provided. The apparatus includes a processor, and memory coupled with the processor. The processor is configured to provide a first machine learning (ML) model information update and a measurement associated with the first ML model information update. The processor is also configured to obtain an aggregated ML model information update. The aggregated ML model information update includes an aggregation of the first ML model information update with a second ML model information update of one of: a first network node in a first federated learning (FL) cluster including the apparatus, or a second network node in a second FL cluster. The processor is further configured to provide a sidelink communication parameter in sidelink control information (SCI) to a network node. The sidelink communication parameter is an output of an ML model associated with the aggregated ML model information update.

In an aspect of the disclosure, a method for wireless communication at a network entity is provided. The method includes: providing a first ML model information update and a measurement associated with the first ML model information update; obtaining an aggregated ML model information update, wherein the aggregated ML model information update includes an aggregation of the first ML model information update with a second ML model information update of one of: a first network node in a first FL cluster including the network entity, or a second network node in a second FL cluster; and providing a sidelink communication parameter in SCI to a network node, wherein the sidelink communication parameter is an output of an ML model associated with the aggregated ML model information update.

In an aspect of the disclosure, an apparatus for wireless communication is provided. The apparatus includes means for providing a first ML model information update and a measurement associated with the first ML model information update; means for obtaining an aggregated ML model information update, wherein the aggregated ML model information update includes an aggregation of the first ML model information update with a second ML model information update of one of: a first network node in a first FL cluster including the network entity, or a second network node in a second FL cluster; and wherein the means for providing is further configured to provide a sidelink communication parameter in SCI to a network node, wherein the sidelink communication parameter is an output of an ML model associated with the aggregated ML model information update.

In an aspect of the disclosure, a non-transitory computer-readable medium storing computer-executable code is provided. The code when executed by a processor cause the processor to provide a first ML model information update and a measurement associated with the first ML model information update; obtain an aggregated ML model information update, wherein the aggregated ML model information update includes an aggregation of the first ML model information update with a second ML model information update of one of: a first network node in a first FL cluster including the network entity, or a second network node in a second FL cluster; and provide a sidelink communication parameter in SCI to a network node, wherein the sidelink communication parameter is an output of an ML model associated with the aggregated ML model information update.

In another aspect of the disclosure, an apparatus for wireless communication is provided. The apparatus includes a processor, and memory coupled with the processor. The processor is configured to obtain a first ML model information update and a measurement associated with the first ML model information update. The processor is further configured to provide an aggregated ML model information update. The aggregated ML model information update includes an aggregation of the first ML model information update with a second ML model information update of one of: a first network node in a first FL cluster including the apparatus, or a second network node in a second FL cluster. A sidelink communication parameter in SCI of a network node is an output of an ML model associated with the aggregated ML model information update.

In an aspect of the disclosure, the processor is configured to provide a first message including first FL information of the apparatus to the first network node, and obtain a second message including second FL information of the first network node, wherein the first network node is in a first FL cluster based on the first FL information and the second FL information.

In an aspect of the disclosure, the first FL information includes at least one of: a machine learning task of the apparatus, information associated with an available sensor coupled to the apparatus for the machine learning task, an available ML model associated with the machine learning task, or an available computation resource of the apparatus for the machine learning task.

In an aspect of the disclosure, the machine learning task includes at least one of: a reinforcement learning task, an object detection task, or a classification task.

In an aspect of the disclosure, the processor is configured to obtain a message indicating a FL cluster leader of a first FL cluster including the apparatus.

In an aspect of the disclosure, the processor is further configured to provide a message indicating the apparatus is a FL cluster leader of the first FL cluster.

In an aspect of the disclosure, the first network node and the second network node are a same network node or different network nodes.

In an aspect of the disclosure, the first FL cluster and the second FL cluster are a same FL cluster or different FL clusters.

In an aspect of the disclosure, the first ML model information update includes at least one of: a weight, a gradient, or a scaling factor, the scaling factor being a multiplicand or a summand.

In an aspect of the disclosure, a method for wireless communication at a network entity is provided. The method includes: obtaining a first ML model information update and a measurement associated with the first ML model information update; providing an aggregated ML model information update, wherein the aggregated ML model information update includes an aggregation of the first ML model information update with a second ML model information update of one of: a first network node in a first FL cluster including the network entity, or a second network node in a second FL cluster; and wherein a sidelink communication parameter in SCI of a network node is an output of an ML model associated with the aggregated ML model information update.

In an aspect of the disclosure, an apparatus for wireless communication is provided. The apparatus includes means for obtaining a first ML model information update and a measurement associated with the first ML model information update; means for providing an aggregated ML model information update, wherein the aggregated ML model information update includes an aggregation of the first ML model information update with a second ML model information update of one of: a first network node in a first FL cluster including the network entity, or a second network node in a second FL cluster; and wherein a sidelink communication parameter in SCI of a network node is an output of an ML model associated with the aggregated ML model information update.

In an aspect of the disclosure, a non-transitory computer-readable medium storing computer-executable code is provided. The code when executed by a processor cause the processor to: obtain a first ML model information update and a measurement associated with the first ML model information update; provide an aggregated ML model information update, wherein the aggregated ML model information update includes an aggregation of the first ML model information update with a second ML model information update of one of: a first network node in a first FL cluster including the network entity, or a second network node in a second FL cluster; and wherein a sidelink communication parameter in SCI of a network node is an output of an ML model associated with the aggregated ML model information update.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 3 illustrate example aspects of a sidelink slot structure.

FIG. 29 is a flowchart of a method of wireless communication at a FL parameter network entity.

DETAILED DESCRIPTION

Figure 1:
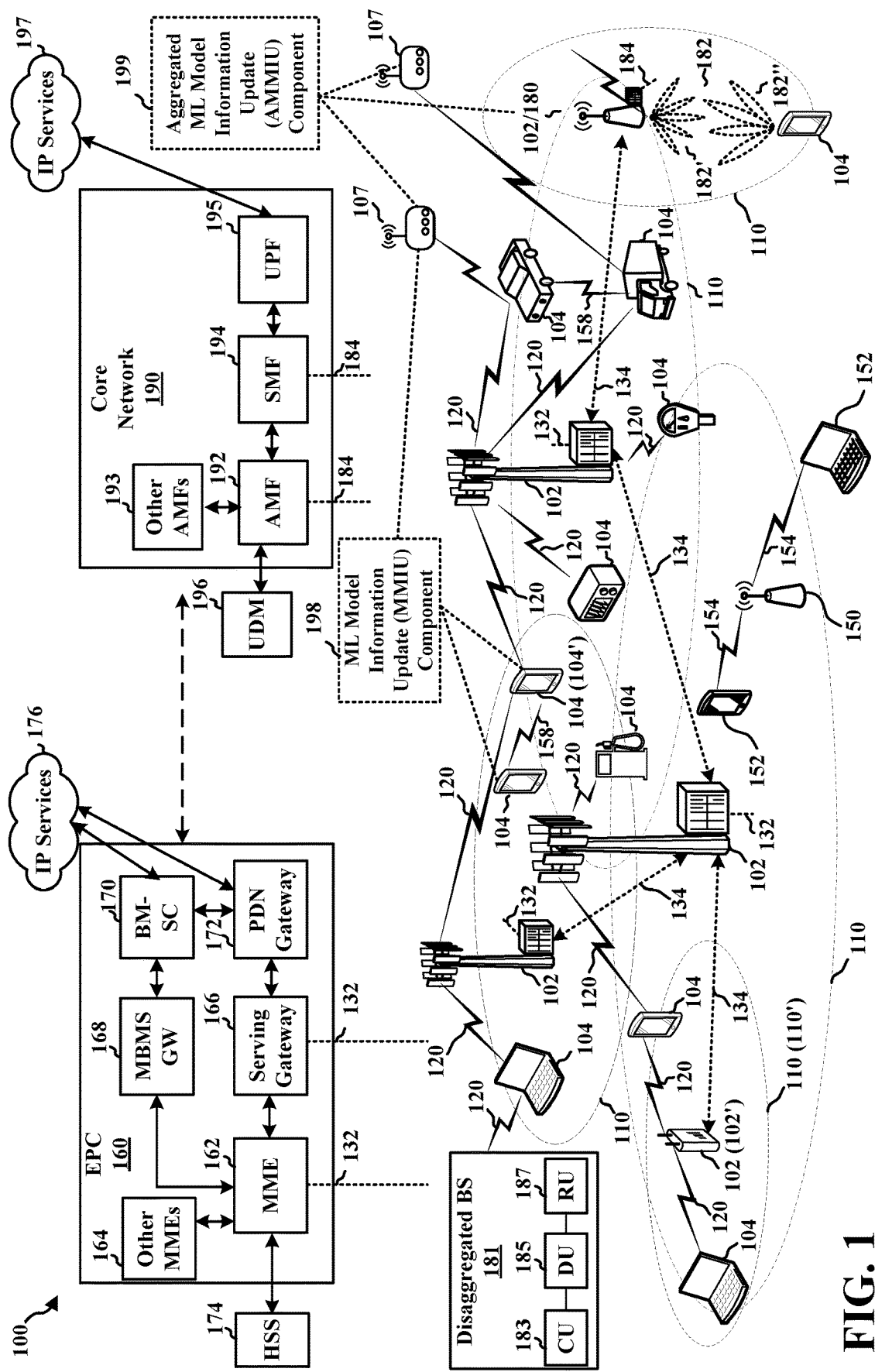
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In sidelink communications, a transmitting (Tx) UE initially achieves sidelink synchronization with a receiving (Rx) UE. Following synchronization, the Tx UE may obtain an allocation of time-frequency resources in which to transmit sidelink data to the Rx UE. According to one or more examples, resource allocation may be scheduled by a base station in downlink control information (in a mode 1 resource allocation), or the resource allocation may be determined through a sensing procedure conducted autonomously by the Tx UE (in a mode 2 resource allocation). After determining the resources, the Tx UE may send sidelink control information (SCI) including the resource allocation to the Rx UE.

In one or more examples, numerous SCI parameters may be applied for sidelink communication between different Tx UEs and Rx UEs. Although in mode 1 resource allocation, the base station may select these parameters to coordinate sidelink transmissions and receptions between different pairs of UEs, in mode 2 resource allocation, the UEs independently select the parameters themselves. For example, one Tx UE may select one communication range for groupcast non-acknowledgment (NACK) feedback, one quantity of reserved resources for retransmissions, or one modulation and coding scheme (MCS) to optimize one application-dependent metric (e.g., minimal latency), while another Tx UE may select a different communication range for groupcast NACK feedback, a different quantity of reserved resources for retransmissions, or a different MCS to optimize a different application-dependent metric (e.g., maximized packet reliability). As a result, in mode 2 resource allocation, coordination between the UEs may be lacking in selection of SCI parameters, possibly leading to sub-optimal network performance. For example, a Tx UE that independently selects a significantly large Tx-Rx distance for groupcast NACK feedback may cause significant congestion due to numerous NACK feedbacks from respective Rx UEs that are too far away from the Tx UE to successfully decode the sidelink data transmission. This congestion, in turn, may increase the channel busy ratio (CBR) or channel occupancy ratio (CR) metrics measured by other Tx UEs. On the other hand, if the Tx UE selects its Tx-Rx distance for groupcast NACK feedback in coordination with other UEs, these other Tx UEs may efficiently increase their MCS, quantity of re-transmissions, or other transmission parameters leading to improved system performance. Therefore, providing coordination among UEs in sidelink communication can improve the overall network performance (e.g., by allowing UEs to efficiently improve MCS or other transmission parameters due to coordinated selection of SCI parameters by other UEs), particularly in automated use cases employing artificial intelligence or machine learning (AI/ML) in artificial neural networks (ANNs).

UEs, base stations, or other network nodes may be configured to perform AI/ML tasks using ANNs. An AI/ML task is a problem that AI/ML aims to solve using training data or other input data, which may include tasks such as classification (e.g., categorizing information based on labeled data), image recognition (e.g., identifying objects based on labeled images), reinforcement learning (e.g., learning to navigate an environment using a system of rewards and penalties), and the like. ANNs may be used for solving AI/ML tasks. ANNs, or simply neural networks, are computational learning systems that use a network of functions to translate a data input of one form into a desired output, usually in another form. ANNs include layered architectures in which the output of one layer of neurons is input to a second layer of neurons (via connections or synapses), the output of the second layer of neurons becomes an input to a third layer of neurons, and so forth.

These neural networks may be trained to recognize a hierarchy of features and thus have increasingly been used in object recognition applications. For instance, neural networks may employ supervised learning tasks such as classification which incorporates a ML model such as logistic regression, support vector machines, boosting, or other classifiers to perform object detection and provide bounding boxes of a class or category in an image. Moreover, these multi-layered architectures may be fine-tuned using back-propagation or gradient descent to result in more accurate predictions.

One technique that may be applied to achieve coordination between network nodes applying AI/ML tasks to obtain sidelink communication parameters is federated learning (FL). FL refers to a distributed machine learning technique in which multiple decentralized nodes holding local data samples may train a global ML model (e.g., a classifier, a navigation system recommendation system, a digital assistant, a diagnostic system, or other model applied by multiple network nodes) without exchanging the data samples themselves between nodes to perform the training. An FL framework includes multiple network nodes or entities, namely a centralized aggregation server and participating FL devices (i.e., participants or nodes such as UEs). In one aspect or implementation, the FL framework enables the FL devices to learn a global ML model by allowing for the passing of messages among the devices through the central aggregation server or coordinator (also referred to throughout this disclosure as an FL parameter server), which may be configured to communicate with the various FL devices and coordinate the learning framework. Nodes in the FL environment may process their own datasets and perform local updates to the global ML model, and the central server may aggregate the local updates and provide an updated global ML model to the nodes for further training or predictions.

However, FL architectures rely on a centralized server to create, aggregate, and refine a global ML model for participating nodes, thus necessitating the transmission of updates based on locally trained ML models from participating nodes to the server during an FL iteration. This centralized approach to FL may have various characteristics. In one example, since the centralized server is the sole aggregator for the participating nodes, the centralized server may singularly serve the FL system. Comparatively if the ML model aggregator role was distributed outside of the centralized server, this may facilitate advancement of the FL process. In another example, a participant sends numerous local model updates to the centralized server. Thus, distributing the entities to which the participant sends such updates may minimize communication overhead in applications where numerous updates are applied. In further examples, FL architectures include heterogeneity of computational resources existing for different participants, heterogeneity of training data available to participants, and heterogeneity of training tasks and associated models configured for different participants. In comparison FL architectures with homogeneity of such computational resources, training data, training tasks, and associated models, may provide statistical simplicity in model training. In another example, even though raw data is not directly communicated between nodes in FL, an exchange of ML model parameters with distributed ML model aggregators may minimize leakage of information about underlying data samples, improving security and privacy of ML model information.

To improve FL architectures, a clustered or hierarchical approach to FL may be applied in which learning nodes working towards a common learning (AI/ML) task are grouped together into clusters. In one example, UEs may group together to form clusters and designate cluster leaders (e.g., other UEs). The designated cluster leader for a cluster, rather than the central aggregation server or coordinator directly (also referred to throughout this disclosure as an FL parameter server), coordinates the learning task (the AI/ML task) including local ML model training and updates within that cluster. According to one example, this coordination is referred to as intra-cluster FL. After clusters are formed, the centralized FL parameter server may coordinate the learning task including global ML model training and updates among clusters. In one aspect, this coordination is referred to as inter-cluster FL. The cluster leaders may thus act as intermediaries between the learning nodes and the FL parameter server for coordinating neural network training and optimization between different clusters. As a result, artificial neural network training may be achieved in a distributed manner using clustered FL with facilitated FL process advancement, minimized communication overhead, statistical simplicity in model training due to homogeneity of computational resources, training data, training tasks, or associated ML models, and improved security and privacy for ML model information.

FL could also be improved using a peer-to-peer FL architecture. In the peer-to-peer approach, collaborative ML model training between participating nodes may be provided without a designated and centralized server for coordinating the training. Rather, participating nodes directly communicate with other participating nodes to coordinate and schedule artificial neural network training, individual model updates, and aggregation of the individually updated models. As a result, artificial neural network training may similarly be achieved in a distributed manner using peer-to-peer FL with facilitated FL process advancement, minimized communication overhead, statistical simplicity in model training due to homogeneity of computational resources, training data, training tasks, or associated ML models, and improved security and privacy for ML model information.

A clustered FL architecture or a peer-to-peer FL architecture may assist UEs in coordinating sidelink parameters derived from ML models. For instance, participant nodes in a cluster or peer-to-peer network may respectively apply updated ML models aggregated from information of other participant nodes to derive a required communication range for groupcast NACK feedback or other common sidelink parameter. Moreover, participant nodes with similar channel conditions, congestion levels, traffic statistics, or other attributes may be grouped together into a cluster or included in an exchange of updated ML model information. This grouping allows participant nodes with similar datasets (e.g., channel busy ratios, channel occupancy ratios, packet reception rates, or other observed metrics) to obtain similar updated ML models, resulting in a higher likelihood of a common SCI parameter output. As a result, participant nodes in the same cluster or peer-to-peer network may derive common SCI parameters from their updated ML models to apply in sidelink communications, thereby leading to maximized packet reception rate, maximized throughput, or minimized latency for mode 2 resource allocation.

As an example, vehicle UEs (VUEs) on a street with high congestion may experience one relationship between packet reception rates (PRRs) and Tx-Rx distances for different communication ranges between Tx UEs and Rx UEs, while VUEs on a different street with low or no congestion may experience a different relationship between PRRs and Tx-Rx distances for different communication ranges between Tx UEs and Rx UEs. Here, higher congestion streets refer to streets with a higher density of UEs, while lower congestion streets refer to streets with a lower density of UEs. Moreover, PRR may be defined as a percentage of nodes (e.g., Rx UEs) that successfully receive a packet from another node (e.g., a Tx UE) among evaluated Rx UEs at the time that the packet is transmitted. Thus, in high congestion streets (e.g., streets with higher densities of UEs), VUEs may observe that higher PRRs at large Tx-Rx distances may be achieved using smaller communication ranges for groupcast NACK feedback, while in low or no congestion streets, higher PRRs at larger Tx-Rx distances may be achieved using larger communication ranges for groupcast NACK feedback.

Therefore, to provide optimized sidelink parameter coordination among UEs, the UEs observing similar high congestion levels on one street may be grouped into one cluster or peer-to-peer network, while the UEs observing similar low congestion levels on the other street may be grouped into a different cluster or peer-to-peer network. Respective groups of the UEs may locally train their ML models using intra-cluster or peer-to-peer FL, and in the case of clustered FL, the FL parameter server, base station, or other network node may control a dynamic evolution of the learning process using inter-cluster FL. In one example, respective groups of UEs may apply their ML models to obtain an optimal communication range for groupcast NACK feedback which is common to the UEs in the respective group, and the UEs may include this communication range in respective SCIs for optimizing sidelink data communications.

To perform sidelink parameter optimization using clustered FL or peer-to-peer FL, one or more signaling procedures may be provided which allow network nodes (e.g., UEs) to discover and form clusters or peer-to-peer networks with other network nodes, to elect or select leaders for clusters or peer-to-peer networks, or to otherwise implement clustered FL or peer-to-peer FL. These signaling procedure(s) may include, for example: (1) a neighbor discovery procedure in which nodes (e.g., UEs) may discover other nodes (e.g., other UEs, or the FL parameter server) in proximity to or neighboring each other that may participate in a ML training task; (2) a signaling procedure for cluster formation and leader election in which nodes participating in the ML training tasks may form clusters with other discovered nodes and elect cluster leaders for respective clusters; (3) a combined signaling procedure for neighbor discovery and cluster formation and leader election or selection in which nodes participating in the ML training tasks may join clusters led by other nodes in response to respective requests from the other nodes; (4) a signaling procedure for cluster formation and leader selection in which nodes participating in the ML training tasks are grouped together into clusters with other nodes led by selected cluster leaders for respective clusters; and (5) a signaling procedure for leader election in a peer-to-peer FL setting in which nodes participating in the ML training tasks may elect a leader among other discovered nodes. Following these signaling procedure(s), network nodes having a similar distribution of observed data may be grouped into clusters, thereby maintaining homogeneity of data within respective clusters. For instance, UEs which respectively train local ML models based on individually collected data, such as temporal sequences of CBR measurements, achieved throughput, or other metrics, and which are affected by similar congestion levels, may be grouped with other UEs into respective clusters led by designated cluster leaders.

Upon completion of cluster formation and leader election or leader selection, network nodes may achieve sidelink parameter coordination in mode 2 resource allocation configurations through one or more signaling procedures which dynamically coordinate clustered FL (intra-cluster or inter-cluster) or peer-to-peer FL. The signaling procedure(s) may include signaling from participant nodes (e.g., UEs) to leaders (e.g., UEs, RSUs, edge servers, a local FL server, or other network node), signaling from leaders to a FL parameter network entity (e.g., a base station, a FL parameter server, or other network node), signaling from the FL parameter network entity to the leaders, or signaling from the leaders to the participant nodes. For example, these signaling procedure(s) may include: (1) signaling for clustered FL training in which nodes perform intra-FL training coordinated by a cluster leader within a respective cluster through message passing between learning nodes and the cluster leader; (2) signaling for clustered FL training in which nodes perform inter-FL training coordinated by an FL parameter server across different clusters through message exchanges between respective cluster leaders and the FL parameter server; (3) signaling for peer-to-peer FL training in which the leader coordinates FL training among peer nodes; (4) signaling for peer-to-peer FL training in which peer nodes synchronously coordinate FL training among other peer nodes; and (5) signaling for peer-to-peer FL training in which peer nodes asynchronously coordinate FL training among other peer nodes.

As a result, participant nodes may perform FL training within a cluster and across clusters, or within a peer-to-peer network. For instance, cluster or peer-to-peer networks may be assigned leaders that are responsible for coordinating an FL process within their respective cluster or peer-to-peer network. The leaders may respectively aggregate local ML models reported by individual participant nodes observing similar traffic statistics, and cluster leaders may communicate this information to the FL parameter network entity along with summary statistics associated with their respective cluster. The FL parameter network entity may dynamically control the evolution of the FL process among the clusters. For instance, the FL parameter network entity may aggregate ML models across clusters which observe similar distributions of data with respect to some measure, and the FL parameter network entity may dynamically assign participant nodes to different clusters based on the aggregated information. The FL parameter network entity may dynamically assign to different clusters those participant nodes which a leader determined to be outliers in the cluster or peer-to-peer network led or utilized by that leader node. An outlier UE may be, for example, a UE which observed traffic statistics having significantly different values, or a different distribution of values, than that of the summary statistics associated with its respective cluster or network (e.g., CBR values at least three standard deviations away from a total average CBR across multiple UEs in the cluster or network). The FL parameter network entity may communicate the inter-cluster aggregations and dynamic cluster assignments to cluster leaders, which in turn communicate this information to participant nodes. Leaders of peer-to-peer networks may similarly communicate aggregated ML model information of participant nodes to the various participant nodes. The participant nodes in a cluster or peer-to-peer network may apply the aggregated ML models to their respective datasets to derive a common SCI parameter among participant nodes in the cluster or peer-to-peer network. As a result, sidelink communication performance may be improved between network nodes with similar congestion levels, traffic statistics, or similar attributes.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations (BS) 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. The MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. The AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a BS, or one or more units (or one or more components) performing base station functionality, may be implemented in an aggregated or disaggregated architecture. For example, a BS (such as a Node B (NB), eNB, NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station 181 may be configured to utilize a protocol stack that is physically or logically distributed among two or more units (such as one or more central units (CU), one or more distributed units (DUs), or one or more radio units (RUs)). In some aspects, a CU 183 may be implemented within a RAN node, and one or more DUs 185 may be co-located with the CU, or alternatively, may be geographically or virtually distributed throughout one or multiple other RAN nodes. The DUs may be implemented to communicate with one or more RUs 187. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or D2D may also be transmitted and received by other transmitting and receiving devices, such as Road Side Unit (RSU) 107, etc. Aspects of the communication may be based on PC5 or sidelink communication, e.g., as described in connection with the example in FIG. 3.

Referring again to FIG. 1, a first network entity (e.g., the UE 104, the RSU 107) may include an ML model information update (MMIU) component 198. The MMIU component 198 is configured to provide a first ML model information update and a measurement associated with the first ML model information update; obtain an aggregated ML model information update, where the aggregated ML model information update includes an aggregation of the first ML model information update with a second ML model information update of one of: a first network node in a first FL cluster including the network entity, or a second network node in a second FL cluster; and provide a sidelink communication parameter in SCI to a network node, wherein the sidelink communication parameter is an output of an ML model associated with the aggregated ML model information update. The UE 104 including MMIU component 198 may a transmitting device in uplink or sidelink communication such as a VUE, an IoT device, or other UE, or a receiving device in downlink or sidelink communication such as another VUE, another IoT device, or other UE. The RSU 107 including MMIU component 198 may be a transmitting device in uplink or sidelink communication, or a receiving device in downlink or sidelink communication. The first network node and the second network node may be UEs 104, RSUs 107, edge servers, or other network nodes. The network node to which the sidelink communication parameter in SCI is provided may be a same network node as the first network node and the second network node, or a different network node.

Still referring to FIG. 1, a second network entity (e.g., the RSU 107 or the base station 102/180) may include an aggregated ML model information update (AMMIU) component 199. The AMMIU component 199 is configured to obtain a first ML model information update and a measurement associated with the first ML model information update; and provide an aggregated ML model information update, where the aggregated ML model information update includes an aggregation of the first ML model information update with a second ML model information update of one of: a first network node in a first federated learning (FL) cluster including the apparatus, or a second network node in a second FL cluster. A sidelink communication parameter in SCI of a network node is an output of an ML model associated with the aggregated ML model information update. The RSU 107 including AMMIU component 199 may a transmitting device in uplink or sidelink communication, or a receiving device in downlink or sidelink communication. The base station 102/180 including AMMIU component 199 may a transmitting device in downlink communication, or a receiving device in uplink communication. The first network node and the second network node may be UEs 104, RSUs 107, edge servers, or other network nodes. The network node with which the sidelink communication parameter in SCI is associated may be a same network node as the first network node and the second network node, or a different network node.

The concepts and various aspects described herein may be applicable to vehicle-to-everything (V2X) or other similar areas, such as D2D communication, IoT communication, Industrial IoT (IIoT) communication, and/or other standards/protocols for communication in wireless/access networks. Additionally or alternatively, the concepts and various aspects described herein may be applicable to vehicle-to-pedestrian (V2P) communication, pedestrian-to-vehicle (P2V) communication, vehicle-to-infrastructure (V2I) communication, and/or other frameworks/models for communication in wireless/access networks. Additionally, the concepts and various aspects described herein may be applicable to NR or other similar areas, such as LTE, LTE-Advanced (LTE-A), Code Division Multiple Access (CDMA), Global System for Mobile communications (GSM), or other wireless/radio access technologies. Additionally, the concepts and various aspects described herein may be applicable for use in aggregated or disaggregated base station architectures, such as Open-Radio Access Network (O-RAN) architectures.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kilohertz (kHz), where µ is the numerology 0 to 4. As such, the numerology 1.1=0 has a subcarrier spacing of 15 kHz and the numerology 1.1=4 has a subcarrier spacing of 240 kHz. The symbol length/duration is inversely related to the subcarrier spacing. FIGS. 2A-2D provide an example of slot configuration 0 with 14 symbols per slot and numerology 1.1=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

FIG. 3 illustrates example diagrams 300 and 310 illustrating example slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include, for example, 7, 4, or 2 symbols. Each slot may include 7 or 14 symbols, depending on the slot configuration. For slot configuration 0, each slot may include 14 symbols, and for slot configuration 1, each slot may include 7 symbols. Diagram 300 illustrates a single slot transmission, e.g., which may correspond to a 0.5 ms transmission time interval (TTI). Diagram 310 illustrates an example two-slot aggregation, e.g., an aggregation of two 0.5 ms TTIs. Diagram 300 illustrates a single RB, whereas diagram 310 illustrates N RBs. In diagram 310, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 3, some of the REs may comprise control information, e.g., along with demodulation RS (DMRS). FIG. 3 also illustrates that symbol(s) may comprise CSI-RS. The symbols in FIG. 3 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 3. Multiple slots may be aggregated together. FIG. 3 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 4:
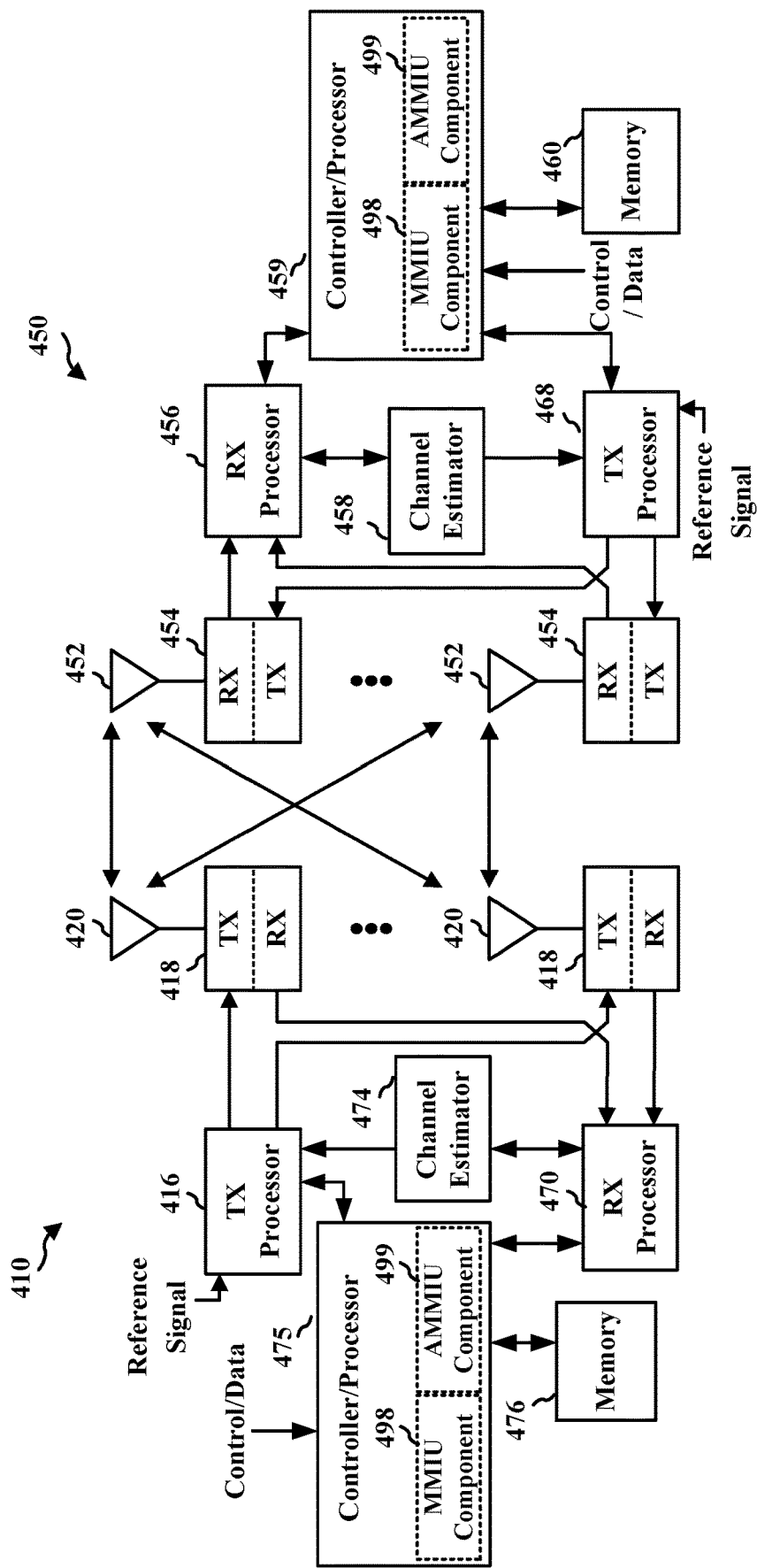
FIG. 4 is a diagram illustrating an example of a first device and a second device involved in wireless communication based, e.g., on sidelink communication.

FIG. 4 is a block diagram of a first wireless communication device 410 in communication with a second wireless communication device 450, e.g., via V2V/V2X/D2D communication or in an access network. The device 410 may comprise a transmitting device communicating with a receiving device, e.g., device 450, via V2V/V2X/D2D communication. The communication may be based, e.g., on sidelink, downlink, or uplink. The transmitting device 410 may comprise a UE, a base station, an RSU, etc. The receiving device 450 may comprise a UE, a base station, an RSU, etc.

IP packets from the EPC 160 may be provided to a controller/processor 475. The controller/processor 475 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the device 450. Each spatial stream may then be provided to a different antenna 420 via a separate transmitter 418TX. Each transmitter 418TX may modulate an RF carrier with a respective spatial stream for transmission.

At the device 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the device 450. If multiple spatial streams are destined for the device 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the device 410. These soft decisions may be based on channel estimates computed by the channel estimator 458. The soft decisions are then decoded and deinterleaved to recover the data and control signals that were originally transmitted by the device 410 on the physical channel. The data and control signals are then provided to the controller/processor 459, which implements layer 3 and layer 2 functionality.

The controller/processor 459 can be associated with a memory 460 that stores program codes and data. The memory 460 may be referred to as a computer-readable medium. The controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the device 410, the controller/processor 459 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by device 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The transmission is processed at the device 410 in a manner similar to that described in connection with the receiver function at the device 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. The controller/processor 475 provides demultiplexing between transport and logical channels, packet reassembly, deciphering, header decompression, control signal processing to recover IP packets from the device 450. IP packets from the controller/processor 475 may be provided to the EPC 160. The controller/processor 475 is also responsible for error detection using an ACK and/or NACK protocol to support HARQ operations.

At least one of the TX processor 416, 468, the RX processor 456, 470, and the controller/processor 459, 475 may be configured to perform aspects in connection with MMIU component 198 of FIG. 1. For example, the controller/processor 459, 475 may include an ML model information update (MMIU) component 498 which is configured to provide a first ML model information update and a measurement associated with the first ML model information update; obtain an aggregated ML model information update, where the aggregated ML model information update includes an aggregation of the first ML model information update with a second ML model information update of one of: a first network node in a first FL cluster including the apparatus, or a second network node in a second FL cluster; and provide a sidelink communication parameter in SCI to a network node, wherein the sidelink communication parameter is an output of an ML model associated with the aggregated ML model information update.

In one example, the MMIU component 498 of controller/processor 475 in device 410 may provide the first ML model information update and measurement to device 450 via TX processor 416, which may transmit the first ML model information update and measurement via antennas 420 to device 450. The MMIU component 498 of controller/processor 475 in device 410 may obtain the aggregated ML model information update from device 450 via RX processor 470, which may receive the aggregated ML model information update from device 450 via antennas 420. The MMIU component 498 of controller/processor 475 in device 410 may provide the sidelink communication parameter to device 450 via TX processor 416, which may transmit the sidelink communication parameter via antennas 420 to device 450.

In another example, the MMIU component 498 of controller/processor 459 in device 450 may provide the first ML model information update and measurement to device 410 via TX processor 468, which may transmit the first ML model information update and measurement via antennas 452 to device 410. The MMIU component 498 of controller/processor 459 in device 450 may obtain the aggregated ML model information update from device 410 via RX processor 456, which may receive the aggregated ML model information update from device 410 via antennas 452. The MMIU component 498 of controller/processor 459 in device 450 may provide the sidelink communication parameter to device 410 via TX processor 468, which may transmit sidelink communication parameter via antennas 452 to device 410.

Moreover, at least one of the TX processor 416, 468, the RX processor 456, 470, and the controller/processor 459, 475 may be configured to perform aspects in connection with AMMIU component 199 of FIG. 1. For example, the controller/processor 459, 475 may include an aggregated ML model information update (AMMIU) component 499 which is configured to obtain a first ML model information update and a measurement associated with the first ML model information update; and provide an aggregated ML model information update, where the aggregated ML model information update includes an aggregation of the first ML model information update with a second ML model information update of one of: a first network node in a first FL cluster including the apparatus, or a second network node in a second FL cluster, where a sidelink communication parameter in SCI of a network node is an output of an ML model associated with the aggregated ML model information update.

In one example, the AMMIU component 499 of controller/processor 475 in device 410 may obtain the first ML model information update and measurement from device 450 via RX processor 470, which may obtain the first ML model information update and measurement from device 450 via antennas 420. The AMMIU component 499 of controller/processor 475 in device 410 may provide the aggregated ML model information update to device 450 via TX processor 416, which may transmit the aggregated ML model information update via antennas 420 to device 450.

In another example, the AMMIU component 499 of controller/processor 459 in device 450 may obtain the first ML model information update and measurement from device 410 via RX processor 456, which may receive the first ML model information update and measurement from device 410 via antennas 452. The AMMIU component 499 of controller/processor 459 in device 450 may provide the aggregated ML model information update to device 410 via TX processor 468, which may transmit the aggregated ML model information update via antennas 452 to device 410.

Figure 5:
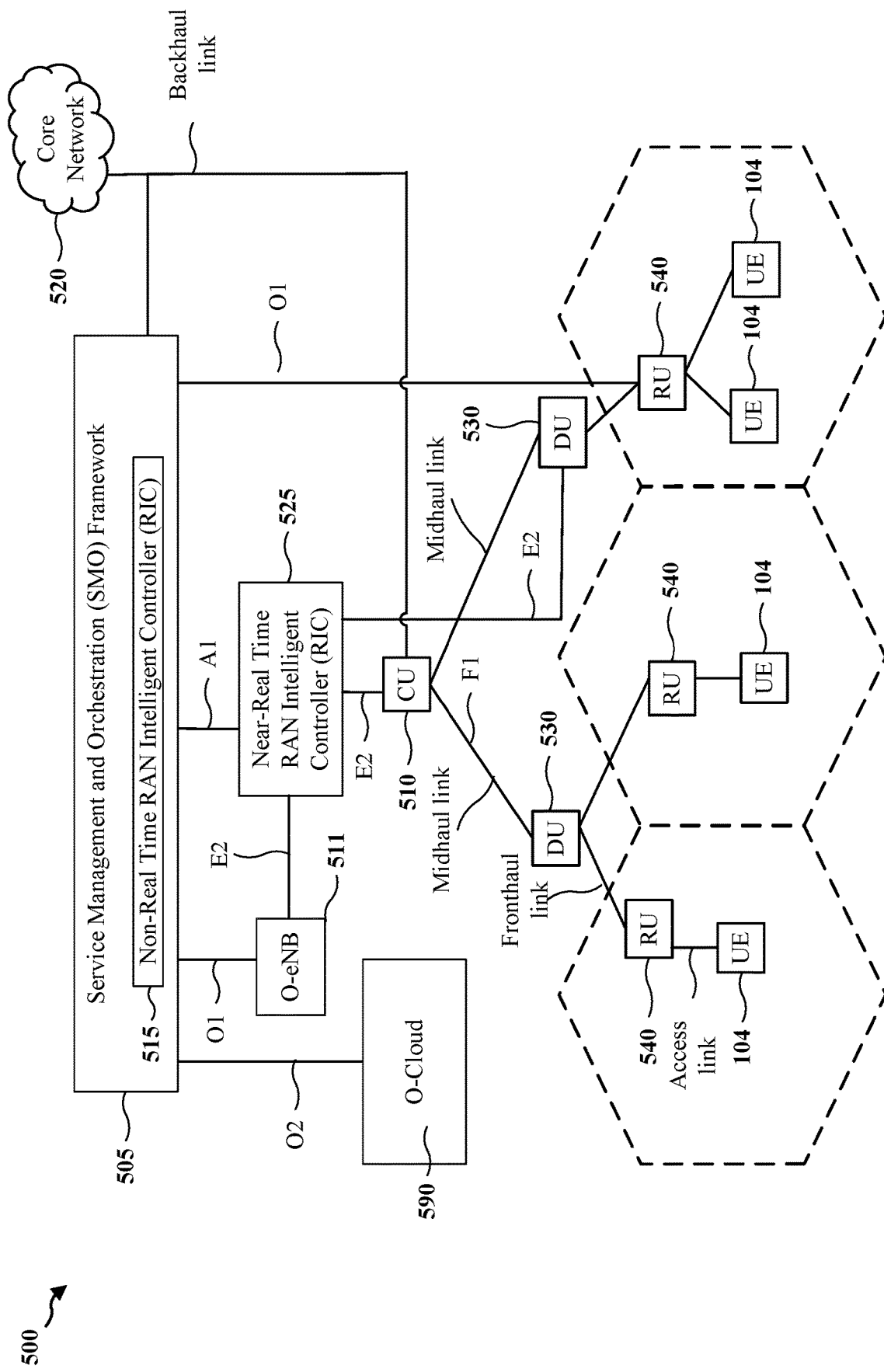
FIG. 5 is a conceptual diagram of an example Open Radio Access Network architecture.

FIG. 5 shows a diagram illustrating an example disaggregated base station 500 architecture. The disaggregated base station 500 architecture may include one or more CUs 510 (e.g., CU 183 of FIG. 1) that can communicate directly with a core network 520 via a backhaul link, or indirectly with the core network 520 through one or more disaggregated base station units (such as a Near-Real Time RIC 525 via an E2 link, or a Non-Real Time RIC 515 associated with a Service Management and Orchestration (SMO) Framework 505, or both). A CU 510 may communicate with one or more DUs 530 (e.g., DU 185 of FIG. 1) via respective midhaul links, such as an F1 interface. The DUs 530 may communicate with one or more RUs 540 (e.g., RU 187 of FIG. 1) via respective fronthaul links. The RUs 540 may communicate respectively with UEs 104 via one or more radio frequency (RF) access links. In some implementations, the UE 104 may be simultaneously served by multiple RUs 540.

Each of the units, i.e., the CUs 510, the DUs 530, the RUs 540, as well as the Near-RT RICs 525, the Non-RT RICs 515 and the SMO Framework 505, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 510 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 510. The CU 510 may be configured to handle user plane functionality (i.e., Central Unit-User Plane (CU-UP)), control plane functionality (i.e., Central Unit-Control Plane (CU-CP)), or a combination thereof. In some implementations, the CU 510 can be logically split into one or more CU-UP units and one or more CU-CP units. The CU-UP unit can communicate bidirectionally with the CU-CP unit via an interface, such as the E1 interface when implemented in an O-RAN configuration. The CU 510 can be implemented to communicate with the DU 530, as necessary, for network control and signaling.

The DU 530 may correspond to a logical unit that includes one or more base station functions to control the operation of one or more RUs 540. In some aspects, the DU 530 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 530 may further host one or more low PHY layers. Each layer (or module) can be implemented with an interface configured to communicate signals with other layers (and modules) hosted by the DU 530, or with the control functions hosted by the CU 510.

Lower-layer functionality can be implemented by one or more RUs 540. In some deployments, an RU 540, controlled by a DU 530, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 540 can be implemented to handle over the air (OTA) communication with one or more UEs 120. In some implementations, real-time and non-real-time aspects of control and user plane communication with the RU(s) 540 can be controlled by the corresponding DU 530. In some scenarios, this configuration can enable the DU(s) 530 and the CU 510 to be implemented in a cloud-based RAN architecture, such as a vRAN architecture.

The SMO Framework 505 may be configured to support RAN deployment and provisioning of non-virtualized and virtualized network elements. For non-virtualized network elements, the SMO Framework 505 may be configured to support the deployment of dedicated physical resources for RAN coverage requirements, which may be managed via an operations and maintenance interface (such as an O1 interface). For virtualized network elements, the SMO Framework 505 may be configured to interact with a cloud computing platform (such as an open cloud (O-Cloud) 590) to perform network element life cycle management (such as to instantiate virtualized network elements) via a cloud computing platform interface (such as an O2 interface). Such virtualized network elements can include, but are not limited to, CUs 510, DUs 530, RUs 540 and Near-RT RICs 525. In some implementations, the SMO Framework 505 can communicate with a hardware aspect of a 4G RAN, such as an open eNB (O-eNB) 511, via an O1 interface. Additionally, in some implementations, the SMO Framework 505 can communicate directly with one or more RUs 540 via an O1 interface. The SMO Framework 505 also may include the Non-RT RIC 515 configured to support functionality of the SMO Framework 505.

The Non-RT RIC 515 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 525. The Non-RT RIC 515 may be coupled to or communicate with (such as via an A1 interface) the Near-RT RIC 525. The Near-RT RIC 525 may be configured to include a logical function that enables near-real-time control and optimization of RAN elements and resources via data collection and actions over an interface (such as via an E2 interface) connecting one or more CUs 510, one or more DUs 530, or both, as well as an O-eNB, with the Near-RT RIC 525.

In some implementations, to generate AI/ML models to be deployed in the Near-RT RIC 525, the Non-RT RIC 515 may receive parameters or external enrichment information from external servers. Such information may be utilized by the Near-RT RIC 525 and may be received at the SMO Framework 505 or the Non-RT RIC 515 from non-network data sources or from network functions. In some examples, the Non-RT RIC 515 or the Near-RT RIC 525 may be configured to tune RAN behavior or performance. For example, the Non-RT RIC 515 may monitor long-term trends and patterns for performance and employ AI/ML models to perform corrective actions through the SMO Framework 505 (such as reconfiguration via O1) or via creation of RAN management policies (such as A1 policies).

UEs 104 including at least the controller/processor 459, 475 of device 410, 450, base stations 102/180 including aggregated and disaggregated base stations 181, or other network nodes, may be configured to perform AI/ML tasks using artificial neural networks (ANNs). ANNs, or simply neural networks, are computational learning systems that use a network of functions to translate a data input of one form into a desired output, usually in another form. Examples of ANNs include multilayer perceptrons (MLPs), convolutional neural networks (CNNs), deep neural networks (DNNs), deep convolutional networks (DCNs), and recurrent neural networks (RNNs), as well as other neural networks. ANNs include layered architectures in which the output of one layer of neurons is input to a second layer of neurons (via connections or synapses), the output of the second layer of neurons becomes an input to a third layer of neurons, and so forth. These neural networks may be trained to recognize a hierarchy of features and thus have increasingly been used in object recognition applications. For instance, neural networks may employ supervised learning tasks such as classification which incorporates a ML model such as logistic regression, support vector machines, boosting, or other classifiers to perform object detection and provide bounding boxes of a class or category in an image. Moreover, these multi-layered architectures may be fine-tuned using backpropagation or gradient descent to result in more accurate predictions.

Figure 6:
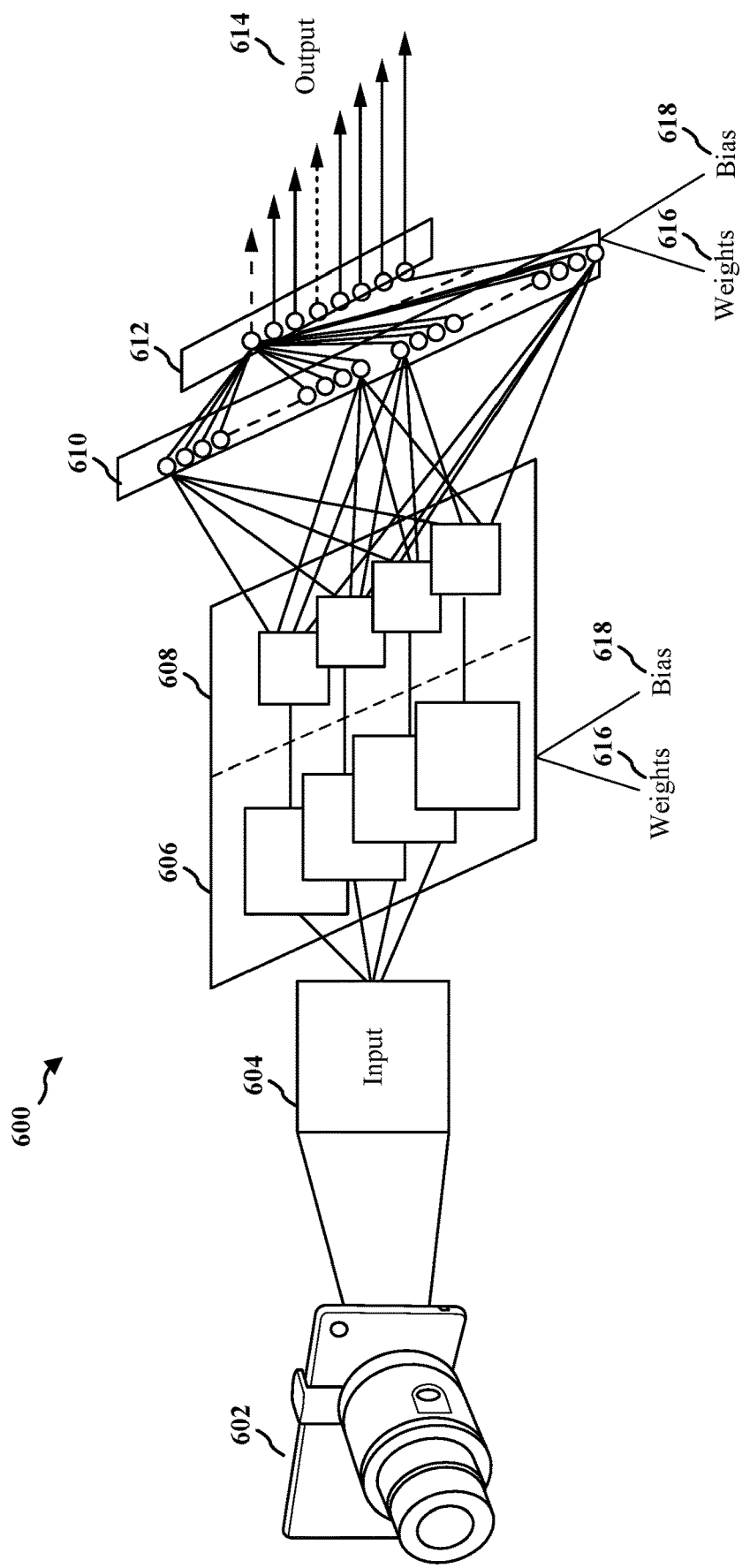
FIG. 6 is a diagram illustrating an example of a neural network.

FIG. 6 illustrates an example of a neural network 600, specifically a CNN. In the example of FIG. 6, the CNN may be designed to detect objects sensed from a camera 602, such as a vehicle-mounted camera, or other sensor. Thus, neural network 600 may be applied for image recognition or object detection in this example. In another example, the CNN may be designed to recognize an ideal action a computational agent may take in any given state, such as a direction a vehicle may move in any given location when navigating to a specific destination. Thus, neural network 600 may be applied for reinforcement learning in this other example.

The neural network 600 may initially receive an input 604, for instance an image such as a speed limit sign having a size of 32×32 pixels (or other object or size). During a forward pass, the input image is initially passed through a convolutional layer 606 including multiple convolutional kernels (e.g., six kernels of size 5×5 pixels, or some other quantity or size) which slide over the image to detect basic patterns or features such as straight edges and corners. The images output from the convolutional layer 606 (e.g., six images of size 28×28 pixels, or some other quantity or size) are passed through an activation function such as a rectified linear unit (ReLU), and then as inputs into a subsampling layer 608 which scales down the size of the images for example by a factor of two (e.g., resulting in six images of size 14×14 pixels, or some other quantity or size). These downscaled images output from the subsampling layer 608 may similarly be passed through an activation function (e.g., ReLU or other function), and similarly as inputs through subsequent convolutional layers, subsampling layers, and activation functions (not shown) to detect more complex features and further scale down the image or kernel sizes. These outputs are eventually passed as inputs into a fully connected layer 610 in which each of the nodes output from the prior layer are connected to all of the neurons in the current layer. The output from this layer may similarly be passed through an activation function and potentially as inputs through one or more other fully connected layers (not shown). Afterwards, the outputs are passed as inputs into an output layer 612 which transforms the inputs into an output 614 such as a probability distribution (e.g., using a softmax function). The probability distribution may include a vector of confidence levels or probability estimates that the inputted image depicts a predicted feature, such as a sign or speed limit value (or other object).

During training, an ML model (e.g., a classifier) is initially created with weights 616 and bias(es) 618 respectively for different layers of neural network 600. For example, when inputs from a training image (or other source) enter a given layer of a MLP or CNN, a function of the inputs and weights, summed with the bias(es), may be transformed using an activation function before being passed to the next layer. The probability estimate resulting from the final output layer may then be applied in a loss function which measures the accuracy of the ANN, such as a cross-entropy loss function. Initially, the output of the loss function may be significantly large, indicating that the predicted values are far from the true or actual values. To reduce the value of the loss function and result in more accurate predictions, gradient descent may be applied.

In gradient descent, a gradient of the loss function may be calculated with respect to each weight of the ANN using backpropagation, with gradients being calculated for the last layer back through to the first layer of the neural network 600. Each weight may then be updated using the gradients to reduce the loss function with respect to that weight until a global minimization of the loss function is obtained, for example using stochastic gradient descent. For instance, after each weight adjustment, a subsequent iteration of the aforementioned training process may occur with the same or new training images, and if the loss function is still large (even though reduced), backpropagation may again be applied to identify the gradient of the loss function with respect to each weight. The weights may again be updated, and the process may continue to repeat until the differences between predicted values and actual values are minimized.

UEs 104 may apply ANNs such as the neural network 600 of FIG. 6 to perform AI/ML tasks in various applications, such as autonomous driving (e.g., using self-driving cars) and industry automation (e.g., using learning-based robots). One such task is reinforcement learning, in which a computational agent of a UE constructs a ML model that maps inputs (states in a state space) to outputs (actions in an action space) through application of a system of rewards and penalties to maximize a reward function. For instance, an autonomous vehicle may apply reinforcement learning to meet speed limits and avoid collisions with other vehicles, while a manufacturing robot may apply reinforcement learning to minimize energy spending. These applications and other use cases of automation may involve UE sharing of data with other UEs 104 in sidelink communication, such as sensor data or driving intentions in V2X communication, to result in improved safety, traffic efficiency, environment perception, or other benefits of automation.

According to one or more examples, in sidelink communications, first wireless communication device 410 (e.g., a Tx UE) initially achieves sidelink synchronization with second wireless communication device 450 (e.g., a Rx UE). Following synchronization, the Tx UE may obtain an allocation of time-frequency resources, e.g., one or more slots, RBs, or subchannels in a resource pool, in which to transmit sidelink data to the Rx UE. In an example, the resource allocation may be scheduled by a base station in downlink control information (DCI) (in a mode 1 resource allocation), or the resource allocation may be determined through a sensing procedure conducted autonomously by the Tx UE (in a mode 2 resource allocation). After determining the resources, the Tx UE may send sidelink control information (SCI) including the resource allocation in a physical sidelink control channel (PSCCH) to the Rx UE.

The Tx UE may transmit the SCI in two stages, including a first-stage SCI carried on PSCCH, and a second-stage SCI carried on a physical sidelink shared channel (PSSCH). First-stage SCI may contain information about the resource allocation, such as a frequency domain resource allocation (FDRA) and a time domain resource allocation (TDRA) indicating the sub-channel(s) and slot(s) which are selected for carrying a transmission of the sidelink data transmission and reserved for up to two further retransmissions of the sidelink data transmission. The first-stage SCI may also include a resource reservation period for semi-persistently reserved resources, a time pattern and number of ports for PSSCH DMRS, a size and format of second-stage SCI, or other SCI parameters. Second-stage SCI may carry information for identifying and decoding the sidelink data, such as a source identifier (source ID) and destination identifier (destination ID) of a sidelink packet carried in the PSSCH, a hybrid automatic repeat request (HARQ) process ID, new data indicator, redundancy version, or other SCI parameters. The second-stage SCI may also include (e.g., in SCI format 2-B) a required communication range for groupcast HARQ feedback and the Tx UE's zone ID indicating a zone in which the Tx UE is located. The Tx UE may transmit the sidelink data in the PSSCH to the Rx UE in the allocated resources.

Upon receiving the sidelink transmission, the Rx UE may attempt to blindly decode the PSCCH in all of the allocated subchannels of the resource pool. If the Rx UE successfully decodes the PSCCH, the UE may also attempt to decode the PSSCH scheduled by the PSCCH for the sidelink data. Depending on the decoding result, the Rx UE may provide hybrid automatic repeat request (HARQ) acknowledgment/negative acknowledgment (ACK/NACK) feedback to the Tx UE in a physical sidelink feedback channel (PSFCH). If the sidelink data transmission was unicast, the Rx UE may provide ACK to the Tx UE if the sidelink data was successfully decoded or provide NACK to the Tx UE if the Rx UE failed to decode the sidelink data. If the sidelink data transmission was groupcast, the Rx UE may have two options for sending the HARQ feedback to the Tx UE: groupcast option 1 and groupcast option 2. In groupcast option 1, the Rx UE may send NACK feedback (but not ACK feedback) if the Rx UE is within a specified communication distance from the Tx UE (the required communication range or Tx-Rx distance indicated in second-stage SCI). In groupcast option 2, the Rx UE may send ACK/NACK feedback notwithstanding the Tx-Rx distance. In either unicast or groupcast cases, if the Tx UE receives NACK from the Rx UE, the Tx UE may retransmit the sidelink data. Otherwise, if the Tx UE receives ACK from the Rx UE (or receives no reply in groupcast option 1), the Tx UE may transmit new data to the Rx UE, or transmit data to a different Rx UE.

Thus, numerous SCI parameters may be applied for sidelink communication between different Tx UEs and Rx UEs (e.g., FDRA, TDRA, quantity of reserved resources, resource reservation period, PSSCH DMRS time pattern and ports, second-stage SCI size and format, source ID, destination ID, HARQ process ID, new data indicator, redundancy version, required communication range for groupcast HARQ feedback, Tx UE zone ID, MCS, etc.). Although in mode 1 resource allocation, the base station may select the parameters to coordinate sidelink transmissions and receptions between different pairs of UEs, in mode 2 resource allocation, the UEs independently select multiple parameters themselves. For example, one Tx UE may select one communication range for groupcast option 1 feedback, one quantity of reserved resources for retransmissions, or one MCS to optimize one application-dependent metric (e.g., minimal latency), while another Tx UE may select a different communication range for groupcast option 1 feedback, a different quantity of reserved resources for retransmissions, or a different MCS to optimize a different application-dependent metric (e.g., maximized packet reliability). Moreover, while some UEs may select pre-configured values for these parameters, other UEs may select values for these parameters based on independent measurements, such as a channel busy ratio (CBR), channel occupancy ratio (CR), or other metric for congestion control. For instance, a UE may employ AI/ML in a neural network (e.g., neural network 600 of FIG. 6) to output a value the UE may apply for a sidelink communication parameter in response to an input from an observed dataset independent to that UE. For example, a UE may apply reinforcement learning to derive an optimal communication range for groupcast option 1 based on a system of rewards and penalties measurable by the UE (e.g., throughput) in response to observed CBRs, packet reception rates, or other metrics.

As a result, if the UEs selected such parameters independently in mode 2 resource allocation, the lack of coordination between the UEs may result in sub-optimal network performance. For example, a Tx UE that independently selects a significantly large Tx-Rx distance for groupcast option 1 may cause significant congestion due to numerous NACK feedbacks from respective Rx UEs that are too far away from the Tx UE to successfully decode the sidelink data transmission. This congestion, in turn, may increase the CBR or CR metrics measured by other Tx UEs, resulting in these other Tx UEs inefficiently reducing their MCS, quantity of re-transmissions, or other transmission parameters leading to reduced system performance. Moreover, as many of these sidelink communication parameters may be applied for automated use cases such as autonomous driving, the reduced system performance may undesirably impact safety or other aspects of automation. Therefore, it would be helpful to provide coordination among UEs in sidelink communication to improve the overall network performance, particularly in automated use cases employing AI/ML in neural networks.

Figure 7:
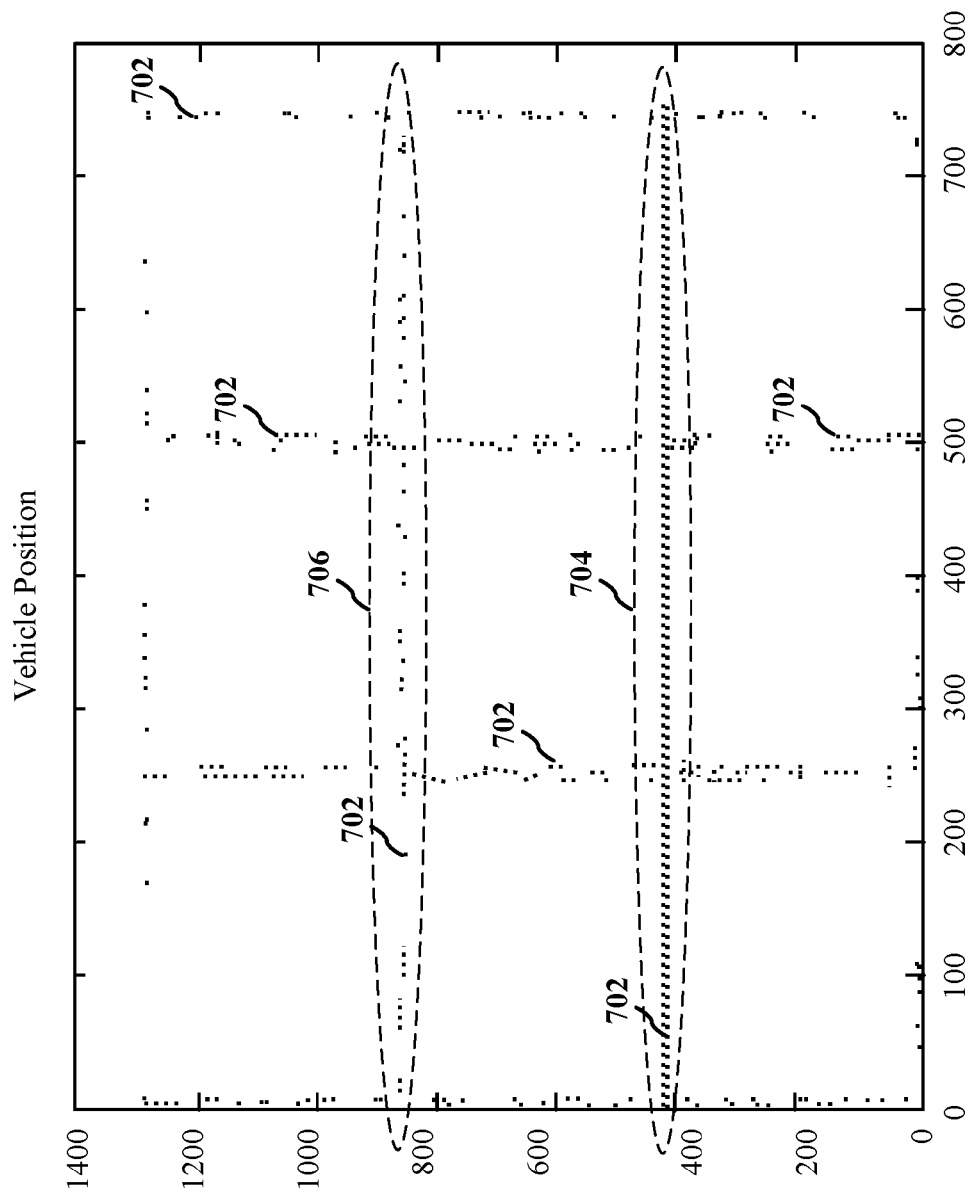
FIG. 7 is a diagram illustrating an example of a chart showing different levels of congestion observed by UEs in an urban setting.

FIG. 7 illustrates an example 700 of a UE position chart showing different levels of congestion observed by UEs 702 in an urban setting. While the distribution of UEs 702 in the illustrated example is particularly suitable for VUEs (UEs in vehicles), the UEs here are not limited to VUEs but may for example be pedestrian UEs arranged in a different distribution than that shown in FIG. 7. In this example, the chart shows x-y coordinates of UEs 702 relative to a point of origin (0,0) in a grid representing intersecting streets. As illustrated in the example chart, different streets may have different densities of UEs 702 and thus different levels of congestion. For example, street 704 may have high congestion while street 706 may have low congestion. UEs 702 on streets with different levels of congestion may observe different packet reception rates (PRRs), latency, or other metrics (e.g., Tx-Rx distances), and thus during mode 2 sidelink resource allocation, the UEs may select different sidelink communication parameters (e.g., groupcast option 1 communication ranges output from ML models based on different measured CBRs or CRs). Moreover, UEs performing congestion control on a same street as other UEs may select different sidelink communication parameters (e.g., channel-based versus pre-configured). Thus, without coordination between UEs 702, network performance may be impacted.

Figure 8A:
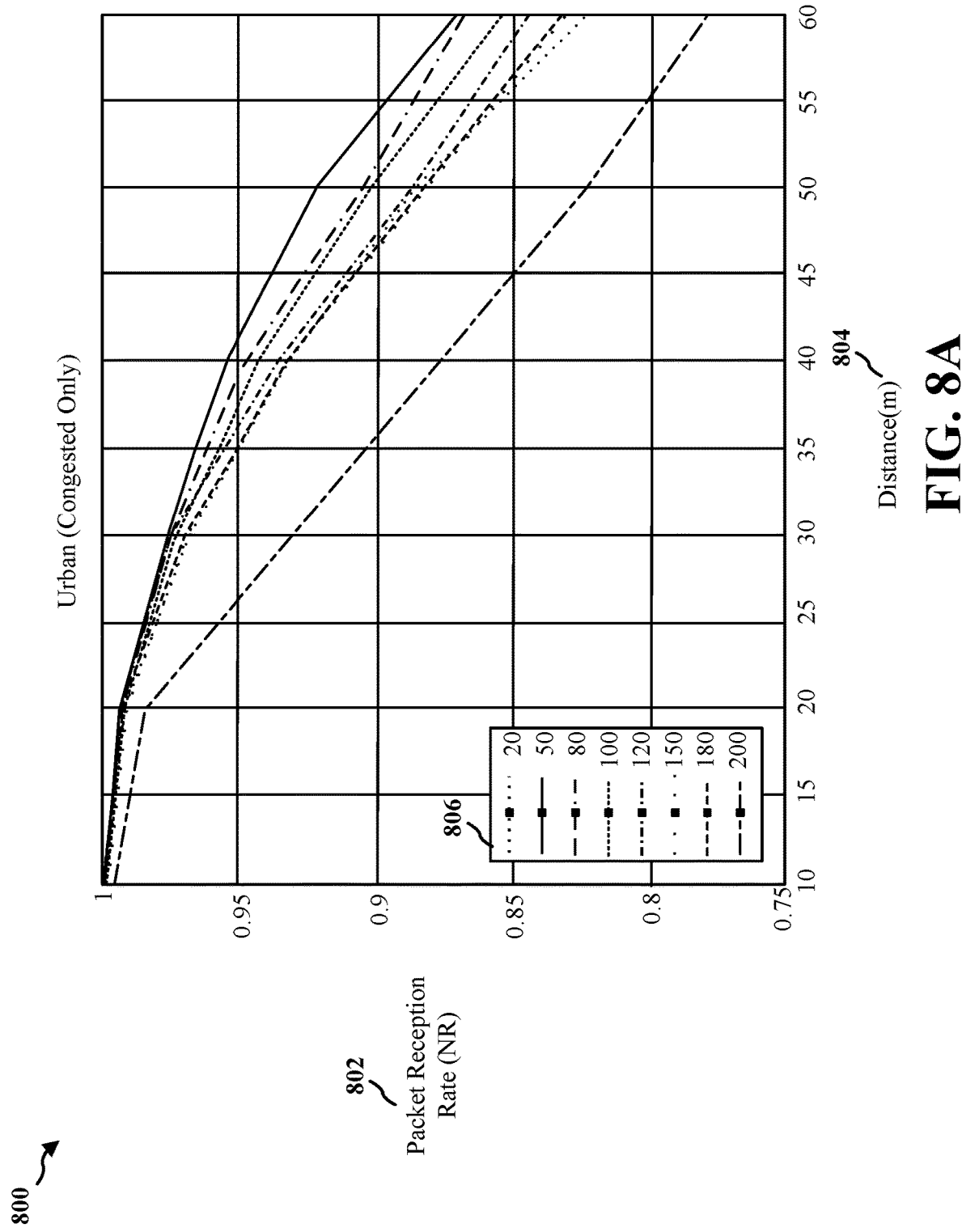
FIGS. 8A-8B are diagrams illustrating examples of relationships between packet reception rates and transmitter-receiver distances of vehicle UEs in congested and non-congested urban environments.
Figure 8B:
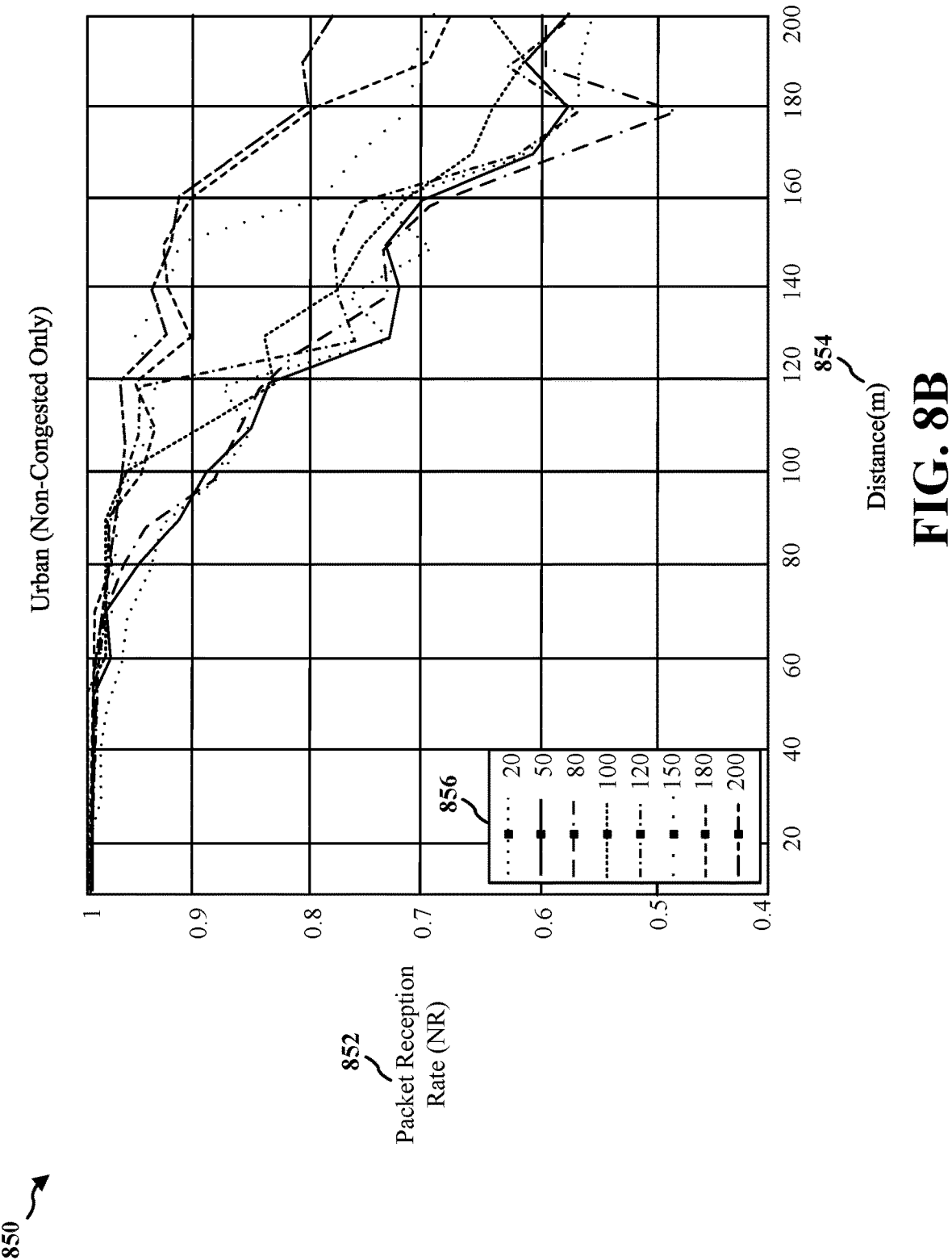

FIGS. 8A-8B are diagrams illustrating examples 800, 850 of relationships between PRRs 802, 852 and Tx-Rx distances 804, 854 of UEs in congested and non-congested urban environments, respectively, for different communication ranges 806, 856 in groupcast option 1. As can be seen in the illustrated examples, groupcasting Tx UEs that select different communication ranges 806, 856 within which Rx UEs may provide NACK feedback (e.g., required communication ranges of 20 m, 50 m, 80 m, 100 m, 120 m, 150 m, 180 m, or 200 m) may observe different relationships between PRRs 802, 852 and Tx-Rx distances 804, 854 for different congestion levels (e.g., high congestion or low congestion). For instance, as the Tx-Rx distance 804, 854 increases, the PRR 802, 852 that a Tx UE observes from Rx UEs may decrease at different rates in environments with different congestion levels depending on the required communication range 806, 856 the Tx UE selects for NACK feedback. Thus, it would be helpful for Tx UEs experiencing different levels of congestion to coordinate selection of the required communication range for groupcast option 1 to maximize respective PRRs and improve network performance.

One technique that may be applied to achieve coordination between network nodes applying AI/ML tasks to obtain sidelink communication parameters is federated learning (FL). In contrast to centralized machine learning techniques where local data sets are all uploaded to one server, FL allows for high quality ML models to be generated without the need for aggregating the distributed data. As a result, FL is convenient for parallel processing, significantly reduces costs associated with message exchanges, and preserves data privacy.

In a FL framework, nodes such as UEs may learn a global ML model via the passing of messages between the nodes through the central coordinator. For instance, the nodes may provide weights, biases, gradients, or other ML information to each other (other nodes) through messages exchanged between nodes via the central coordinator (e.g., a base station, RSU, an edge server, etc.).

Each node in a FL environment utilizes a dataset to locally train and update a coordinated global, ML model. The dataset may be a local data set that a node or device may obtain for a certain ML task (e.g., object detection, etc.). The data in a given dataset may be preloaded or may be accumulated throughout a device lifetime. For example, an accumulated dataset may include recorded data that a node observes and locally stores at the device from an on-board sensor such as a camera. The global ML model may be defined by its model architecture and model weights. An example of a model architecture is a neural network, such as the CNN described with respect to FIG. 6, which may include multiple hidden layers, multiple neurons per layer, and synapses connecting these neurons together. The model weights are applied to data passing through the individual layers of the ML model for processing by the individual neurons.

Figure 9:
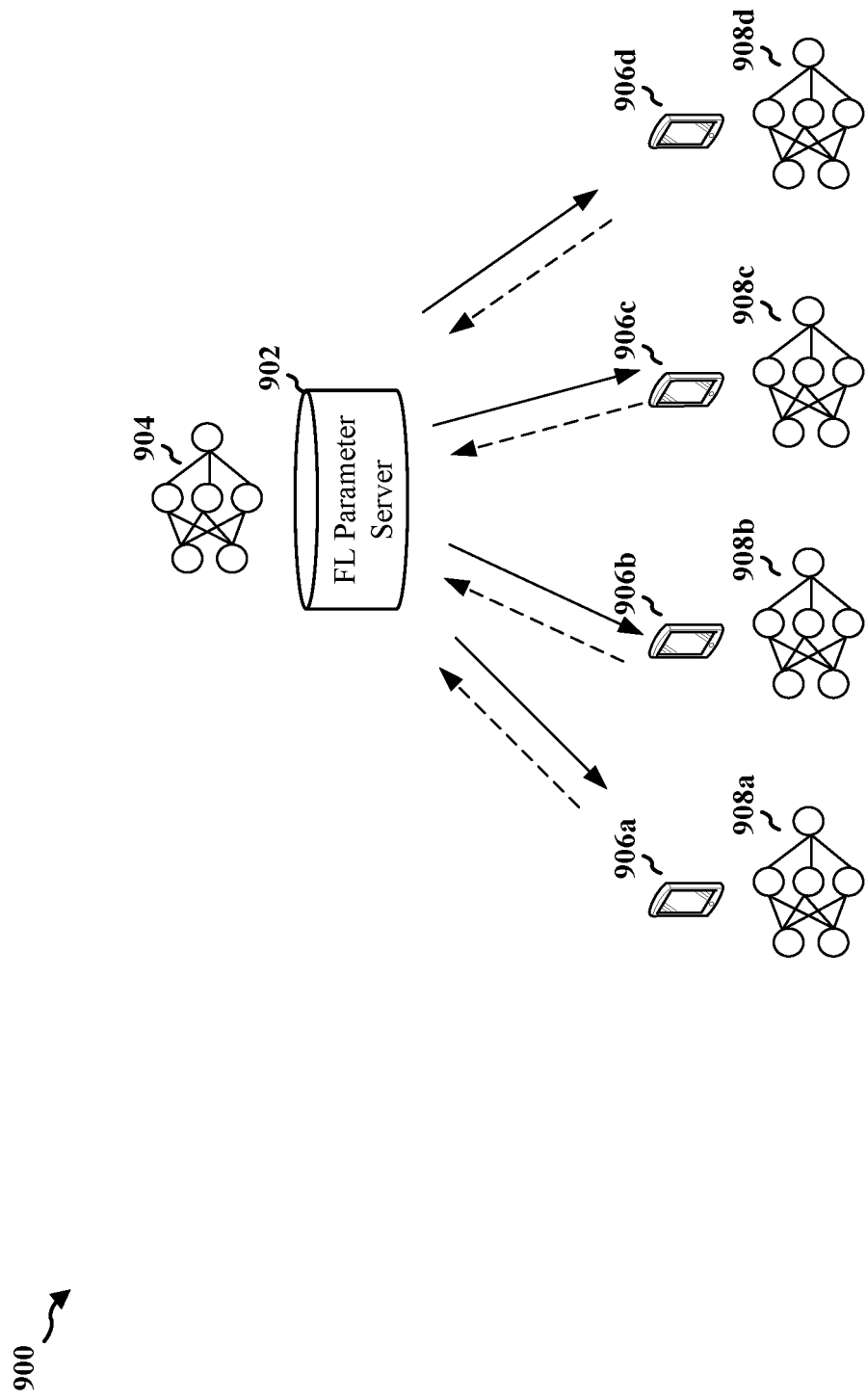
FIG. 9 is a diagram illustrating an example of a FL architecture.

FIG. 9 illustrates an example 900 of a FL architecture. An FL parameter server 902 initializes a global ML model 904 ($W_0^G$) (e.g., a classifier in a pre-configured ML architecture such as the CNN of FIG. 6 with random or default ML weights) and broadcasts the global ML model 904 to participating devices or learning nodes 906 (e.g., UEs). Upon receipt of the global ML model at the learning nodes, an iterative process of FL may begin. For instance, upon receiving the global ML model 904 ($W_t^G$) at a given iteration t, the learning nodes 906 (k nodes 906a, 906b, 906c, 906d) locally train their respective model 908 (models 908a, 908b, 908c, 908d) using their local dataset, which may be a preconfigured data set such as a training set and/or sensed data from the environment. After training, the learning nodes update their respective k-th model $W_t^k$ (e.g., the local weights) until a minimization or optimization of a k-th loss function or cost function $F_k$ ($W_t^k$) for that model is achieved. At this point, the learning nodes may have different local models $W_t^k$ due to having different updated weights.

Afterwards, the learning nodes 906 transmit information corresponding to their local updated models $W_t^k$ to the FL parameter server 902. To reduce transmission traffic, the corresponding information may be, for example, the modified weights, weights that changed more than a threshold, or the multiplicative or additive delta amounts or percentages for those weights. Upon receipt of this corresponding information, the FL parameter server aggregates the respective weights of the respective models 908 (e.g., by averaging the weights or performing some other calculation on the weights). The FL parameter server 902 may thus generate an updated global model $W_{t+1}^G$ including the aggregated weights, after which the aforementioned process may repeat for subsequent iteration t+1. For instance, the FL parameter server 902 may broadcast the updated global model $W_{t+1}^G$ to the learning nodes 906 to again perform training and local updates based on the same dataset or a different local dataset. To reduce transmission traffic, broadcasting the update may comprise transmitting the modified weights, weights that changed more than a threshold, or the multiplicative or additive delta amounts or percentages for those weights. After the nodes receive the broadcasted update and perform the training and local updates, the nodes may again share their respectively updated models to the FL parameter server for subsequent aggregation and global model update. This process may continue to repeat in further iterations and result in further updates to the global model $W_t^G$ until a minimization of a loss function $F_G(W_t^G)$ for the global model is obtained, or until a predetermined number of iterations has been reached.

Figure 10B:
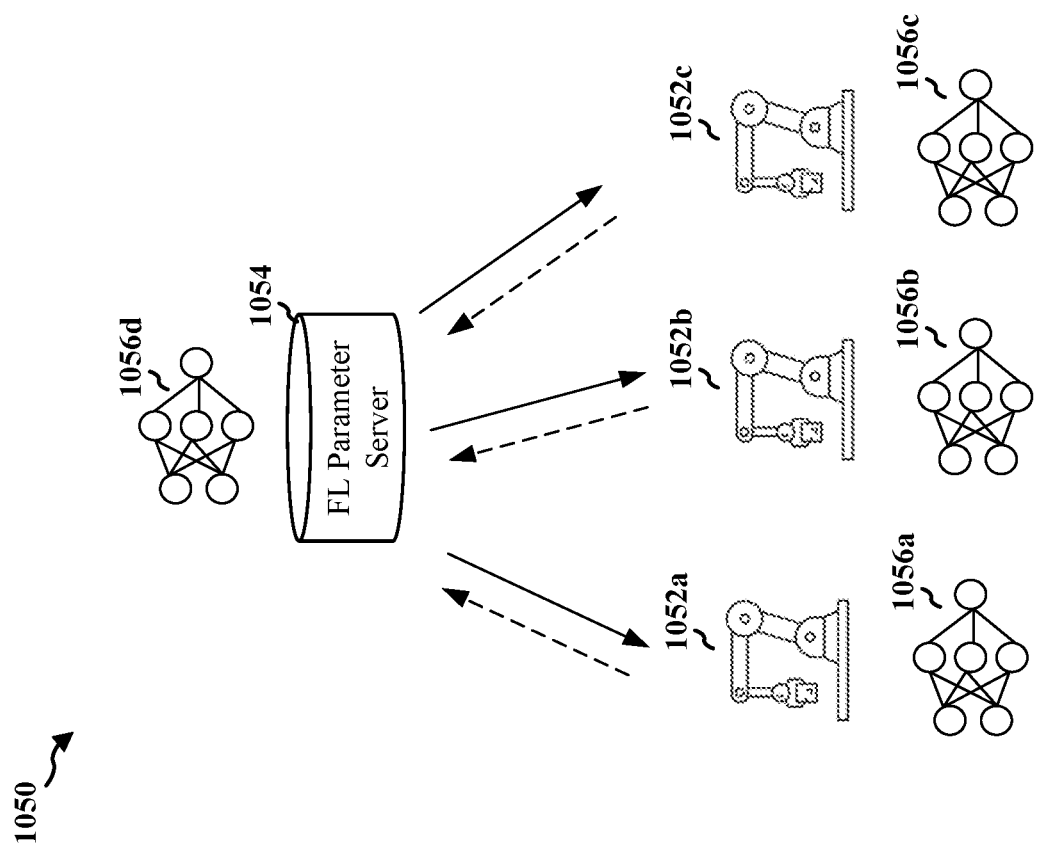
FIGS. 10A and 10B are diagrams illustrating examples of an FL architecture in different applications.
Figure 10A:
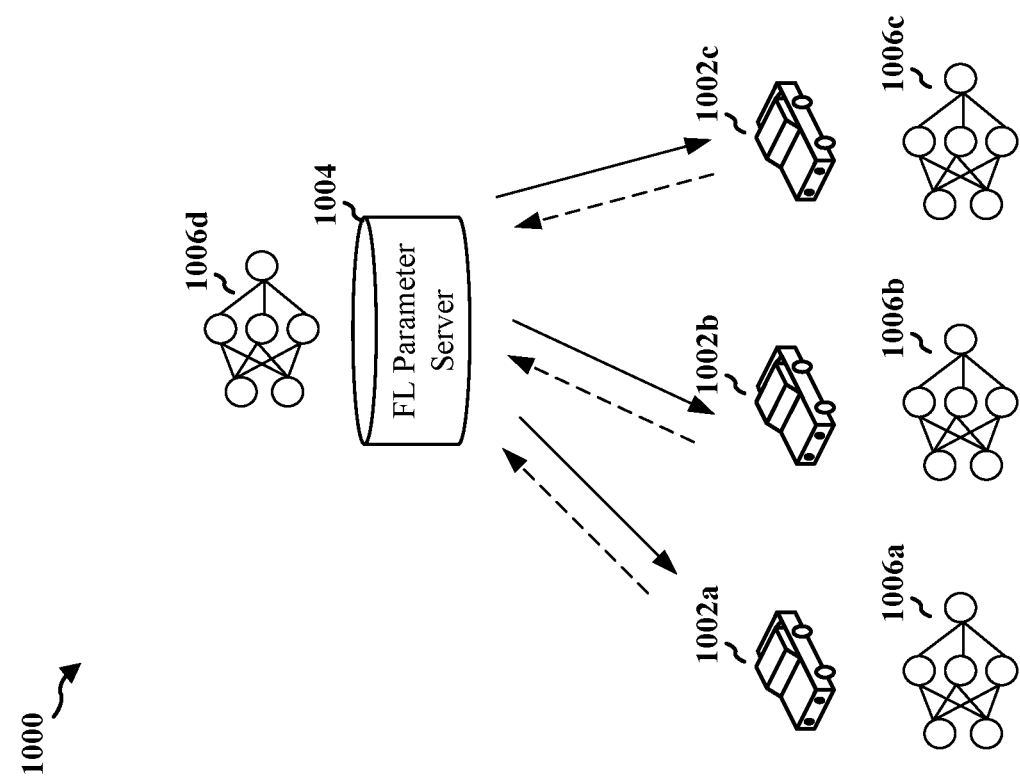

FIGS. 10A and 10B illustrate examples 1000, 1050 of different applications associated with wireless connected devices that may benefit from FL, including connected vehicles for autonomous driving (FIG. 10A) and mobile robots for manufacturing (FIG. 10B). For instance, in the example 1000 of FIG. 10A, network nodes 1002 (nodes 1002a, 1002b, 1002c, e.g., VUEs such as learning nodes 906 in FIG. 9) equipped with vision sensors such as cameras, light detection and ranging (LIDAR), or radio detection and ranging (RADAR), may communicate with a FL parameter server 1004 (e.g., a base station or an RSU) to collaboratively train and enhance the accuracy of a neural network 1006 (neural network 1006a, 1006b, 1006c, 1006d) for detecting objects and object bounding boxes (OBBs) in connection with autonomous driving. Similarly, in the example 1050 of FIG. 10B, network nodes 1052 (nodes 1052a, 1052b, 1052c, e.g., mobile robot UEs such as learning nodes 906 in FIG. 9) equipped with inertial measurement units (IMUs), RADAR, camera, or other sensors in a manufacturing environment may communicate with a FL parameter server 1054 (e.g., a base station) in mmWave frequencies to collaboratively train a neural network 1056 (neural network 1056a, 1056b, 1056c, 1056d) associated with a manufacturing-related task.

However, FL architectures rely on a centralized server (e.g., FL parameter server 902, 1004, 1054) to create, aggregate, and refine a global ML model for participating nodes, thus necessitating the transmission of locally trained ML model information from participating nodes to the server during an FL iteration. To reduce transmission traffic, this information may include for example, modified weights, weights that changed more than a threshold, or multiplicative or additive delta amounts or percentages for those weights. This centralized approach to FL may have various characteristics. In one example, since the centralized server is the sole aggregator for the participating nodes, the centralized server may singularly serve the FL system. Comparatively, if the ML model aggregator role was distributed outside of the centralized server, this may facilitate advancement of the FL process. In another example, a participant sends numerous local model updates to the centralized server. Thus, distributing the entities to which the participant sends such updates may minimize communication overhead in applications where numerous updates are applied. In further examples, FL architectures include heterogeneity of computational resources existing for different participants, heterogeneity of training data available to participants, and heterogeneity of training tasks and associated models configured for different participants. In comparison, FL architectures with homogeneity of such computational resources, training data, training tasks, and associated models, may provide statistical simplicity in model training. In another example, even though raw data is not directly communicated between nodes in FL, an exchange of ML model parameters with distributed ML model aggregators may minimize leakage of information about underlying data samples, improving security and privacy of ML model information.

To improve FL architectures, a clustered or hierarchical approach to FL may be applied in which learning nodes working towards a common learning task are grouped together into clusters. In clustered FL, multiple clusters may be formed from respective groups of learning nodes (e.g., UEs) having a local dataset and sharing a common ML task such as object detection or classification (e.g., detecting an OBB, a vehicle or pedestrian on a road, etc.). In one example, UEs may group together to form clusters and designate cluster leaders (e.g., other UEs) without network assistance (e.g., without involvement of a base station or RSU), although in other examples, the cluster formation and leader identification may be configured with network assistance (e.g., via messages circulated within the network identifying clusters and confirming cluster leaders). For instance, a participating node in a cluster may be elected or designated as a leader by other participating nodes in the cluster, without network involvement, or selected or self-nominated as a leader with network involvement. Cluster leaders may themselves also be learning nodes within a respective cluster.

Moreover, in hierarchical FL the designated cluster leader for each cluster, rather than the FL parameter server directly, coordinates the learning task including local ML model training and updates within that cluster. This coordination is referred to as intra-cluster FL. For instance, individual nodes within a cluster may pass messages including local updates to ML model weights to a cluster leader (e.g., a UE designated with an identifier as the leader of that cluster) to aggregate and send the updated local model back to the individual nodes within that cluster. After clusters are formed, the centralized FL parameter server (e.g., an edge server, RSU, or base station) may coordinate the learning task including global ML model training and updates between clusters. This coordination is referred to as inter-cluster FL. For instance, individual cluster leaders of respective clusters may pass messages including aggregated local updates to ML model weights to the FL parameter server to aggregate and send the updated global ML model back to the individual cluster leaders, which in turn, will pass the updated global model to their respective cluster members to further train and update. The cluster leaders may thus act as intermediaries between the learning nodes and the FL parameter server for coordinating neural network training and optimization between different clusters.

Figure 11:
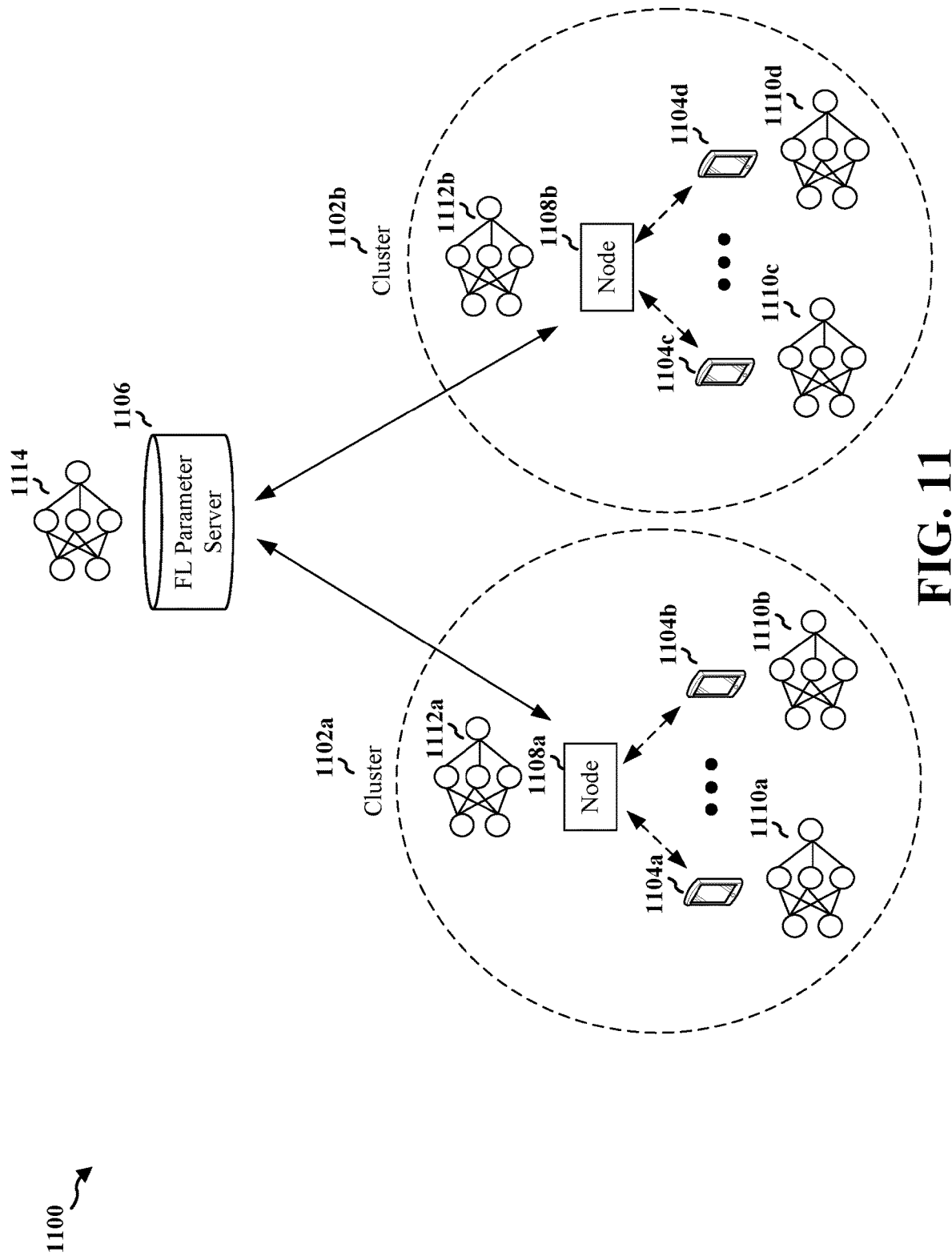
FIG. 11 is a diagram illustrating an example of a clustered FL architecture.

FIG. 11 illustrates an example 1100 of a clustered FL architecture including clusters 1102 (clusters 1102a, 1102b)

of UEs 1104 (UEs 1104a, 1104b, 1104c, 1104d, e.g., vehicle UEs, pedestrian UEs, etc.) in communication with an FL parameter server 1106 (e.g., a base station, a RSU, an edge server, or other network entity). UEs 1104 sharing common learning tasks, models, datasets, or computational resources may be grouped into one or more clusters, and multiple clusters 1102 of such UEs may be formed. A cluster leader 1108 (cluster leader 1108a, 1108b) may be designated for a cluster, with or without network assistance. For example, without network assistance, UEs 1104 may elect or subscribe to one of the UEs as cluster leader 1108 for a given cluster. In an alternative example, with network assistance, the FL parameter server 1106 (e.g., a base station) may designate an RSU, edge server, or other network entity as cluster leader 1108 for a given cluster if that network entity is in communication with UEs 1104 of that respective cluster, as well as designate the UEs 1104 participating in respective clusters. While the example of FIG. 11 illustrates two UEs in communication with cluster leader 1108, it should be understood that the clusters 1102 are not limited to such quantity of UEs and may have a different quantity of UEs in other examples.

UEs 1104 in a given cluster may conduct a similar training process to that of the FL process described with respect to FIG. 9, except that the cluster leader 1108 serves as an aggregator for its respective clusters rather than the FL parameter server, and model training occurs at multiple levels (intra-cluster and inter-cluster). In one example, the cluster leaders 1108 may serve as aggregators for their respective clusters 1102 without themselves participating in model training. For instance, the cluster leader 1108 of a given cluster may groupcast an initialized ML model to the UEs 1104 within the cluster 1102 to perform local training, which UEs in turn send their individually updated ML models 1110 (models 1110a, 1110b, 1110c, 1110d respectively for different UEs) back to the cluster leader 1108 to aggregate into an updated local model 1112 for that cluster. The cluster leader 1108 may then groupcast the updated local model 1112 (model 1112a, 1112b respectively for different cluster leaders) to the UEs 1104 to again perform local training in a next iteration and this intra-cluster process may repeat in further iterations. Additionally, at certain times or in response to certain events, the cluster leaders 1108 may communicate their respective, updated local models to the FL parameter server 1106 to aggregate into an updated global model 1114 for the clusters. The FL parameter server 1106 may then send these aggregated global models back to the cluster leaders 1108 to be circulated within their respective clusters 1102. In another example, the cluster leaders 1108 may themselves participate in model training in addition to serving as aggregators for their respective clusters 1102. In such case, the cluster leaders 1108 may perform the aforementioned functions of aggregator in addition to performing local training and updates similar to UEs 1104. Thus, unlike in FL where learning nodes communicate directly with the FL parameter server for model optimization, here the cluster leaders communicate directly with the FL parameter server, and the learning nodes within a cluster instead communicate directly with the cluster leader. As a result, neural network training may be achieved in a distributed manner using clustered FL with facilitated FL process advancement, minimized communication overhead, statistical simplicity in model training due to homogeneity of computational resources, training data, training tasks, or associated ML models, and improved security and privacy for ML model information.

FL may also be improved using a peer-to-peer FL architecture, rather than a clustered FL architecture such as illustrated in FIG. 11. In the peer-to-peer approach, collaborative ML model training between participating nodes may be provided without a designated and centralized server (e.g., without FL parameter server 1106) for coordinating the training. Rather, participating nodes directly communicate with other participating nodes to coordinate and schedule neural network training, individual model updates, and aggregation of the individually updated models.

Figure 12:
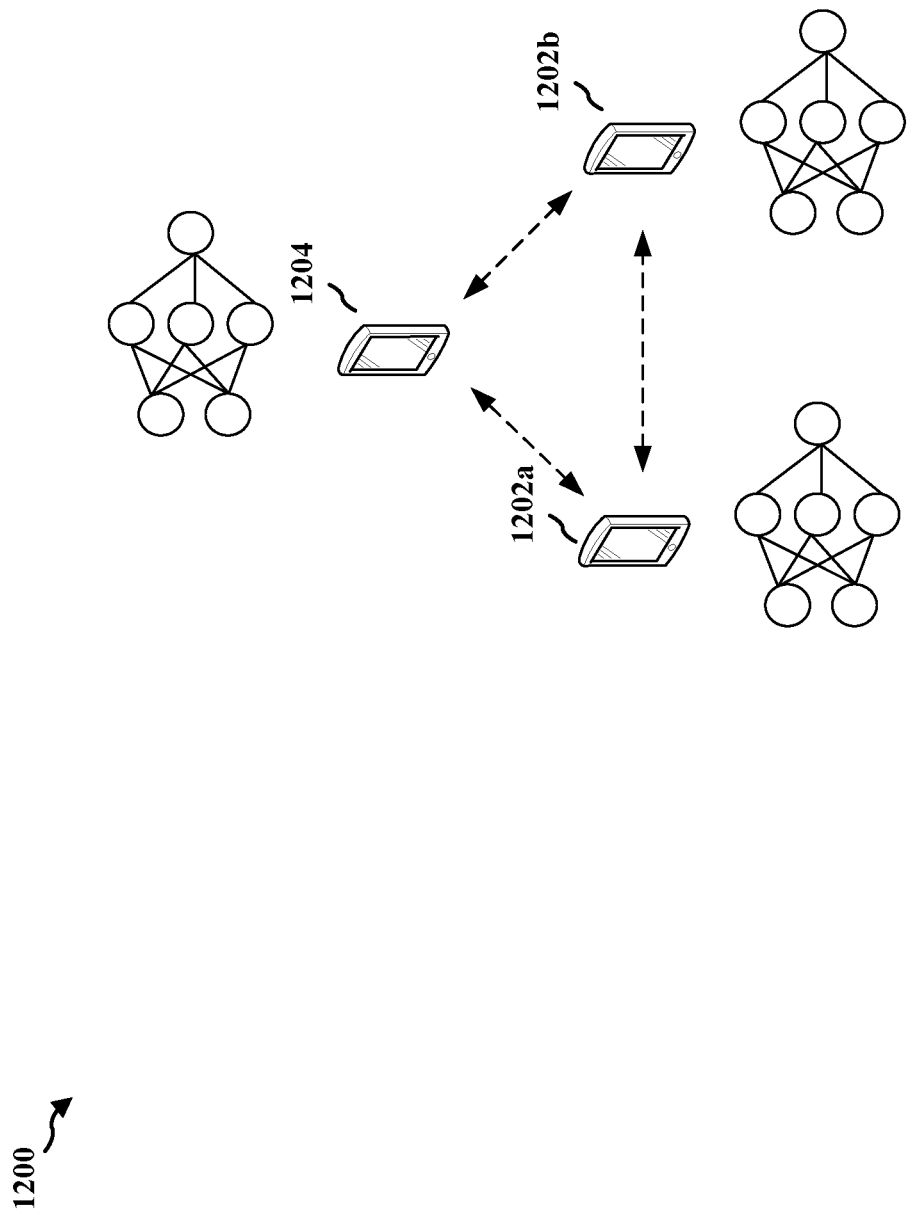
FIG. 12 is a diagram illustrating an example of a peer-to-peer FL architecture.

FIG. 12 illustrates an example 1200 of a peer-to-peer FL architecture including UEs 1202 (UEs 1202a, 1202b, e.g., vehicle UEs, pedestrian UEs, etc.) which directly communicate with other UEs for ML model training. In one example, the UEs 1202 may elect one of the UEs 1202 as a leader 1204 for a duration of time to coordinate ML model training among the UEs 1202. In one example, the leader 1204 may serve as aggregator without itself participating in model training. During training, the leader 1204 may receive and aggregate ML model updates from the UEs 1202, after which the leader may send the aggregated ML model updates back to the UEs 1202 for further training and update. This training process is similar to the intra-cluster approach described with respect to FIG. 11, except where the cluster leader in that example is here replaced by leader 1204. In another example, the leader 1204 may itself participate in model training in addition to serving as aggregators, in which case the leader 1204 may perform the aforementioned functions of aggregator in addition to performing model training and updates similar to UEs 1202. In an alternative example, none of the UEs may be leaders 1204, and the UEs 1202 may instead synchronously or asynchronously aggregate ML model updates of other UEs 1202. As a result, neural network training may similarly be achieved in a distributed manner using peer-to-peer FL with facilitated FL process advancement, minimized communication overhead, statistical simplicity in model training due to homogeneity of computational resources, training data, training tasks, or associated ML models, and improved security and privacy for ML model information. While the example of FIG. 12 illustrates two UEs in communication with leader 1204, it should be understood that the peer-to-peer network is not limited to such quantity of UEs and may have a different quantity of UEs in other examples.

A clustered FL architecture such as described with respect to FIG. 11 or a peer-to-peer FL architecture such as described with respect to FIG. 12 may assist UEs 104, 702, 1104, 1202 or leaders 1204 in coordinating sidelink parameters derived from ML models. For instance, participant nodes in a cluster or peer-to-peer network may respectively apply updated ML models aggregated from information of other participant nodes to derive a required communication range for groupcast option 1 or other common sidelink parameter. Moreover, participant nodes with similar channel conditions, congestion levels, traffic statistics, or other attributes may be grouped together into a cluster or included in an exchange of updated ML model information. This grouping allows participant nodes with similar CBRs, CRs, PRRs, or other observed metrics to obtain similar updated ML models, resulting in a higher likelihood of a common SCI parameter output. As a result, participant nodes in the same cluster or peer-to-peer network may derive common SCI parameters from their updated ML models to apply in sidelink communications, thereby leading to maximized PRR or throughput or minimized latency in deployments using mode 2 resource allocation.

As an example, referring back to FIGS. 7, 8A, and 8B, UEs 702 on street 704 with high congestion may experience the relationships between PRRs 802 and Tx-Rx distances 804 for different communication ranges 806 illustrated in FIG. 8A, while UEs 702 on street 706 with low or no congestion may experience the relationships between PRRs 852 and Tx-Rx distances 854 for different communication ranges 856 illustrated in FIG. 8B. In the example of FIG. 8A (high congestion), higher PRRs at large Tx-Rx distances may be achieved using smaller communication ranges for groupcast option 1, while in the example of FIG. 8B (low or no congestion), higher PRRs at larger Tx-Rx distances may be achieved using larger communication ranges for groupcast option 1. Therefore, to provide optimized sidelink parameter coordination among the UEs 702, the UEs 702 observing similar high congestion levels on street 704 may be grouped into one cluster or peer-to-peer network, while the UEs 702 observing similar low congestion levels on street 706 may be grouped into a different cluster or peer-to-peer network. Respective groups of the UEs 702 may locally train their ML models using intra-cluster or peer-to-peer FL, and in the case of clustered FL, the FL parameter server, base station, or other network node may control a dynamic evolution of the learning process using inter-cluster FL. Afterwards, respective groups of UEs 702 may apply their ML models to obtain an optimal communication range for groupcast option 1 which is common to the UEs in the respective group, and the UEs 702 may include this optimal communication range in respective SCIs for optimizing sidelink data communications.

Figure 13:
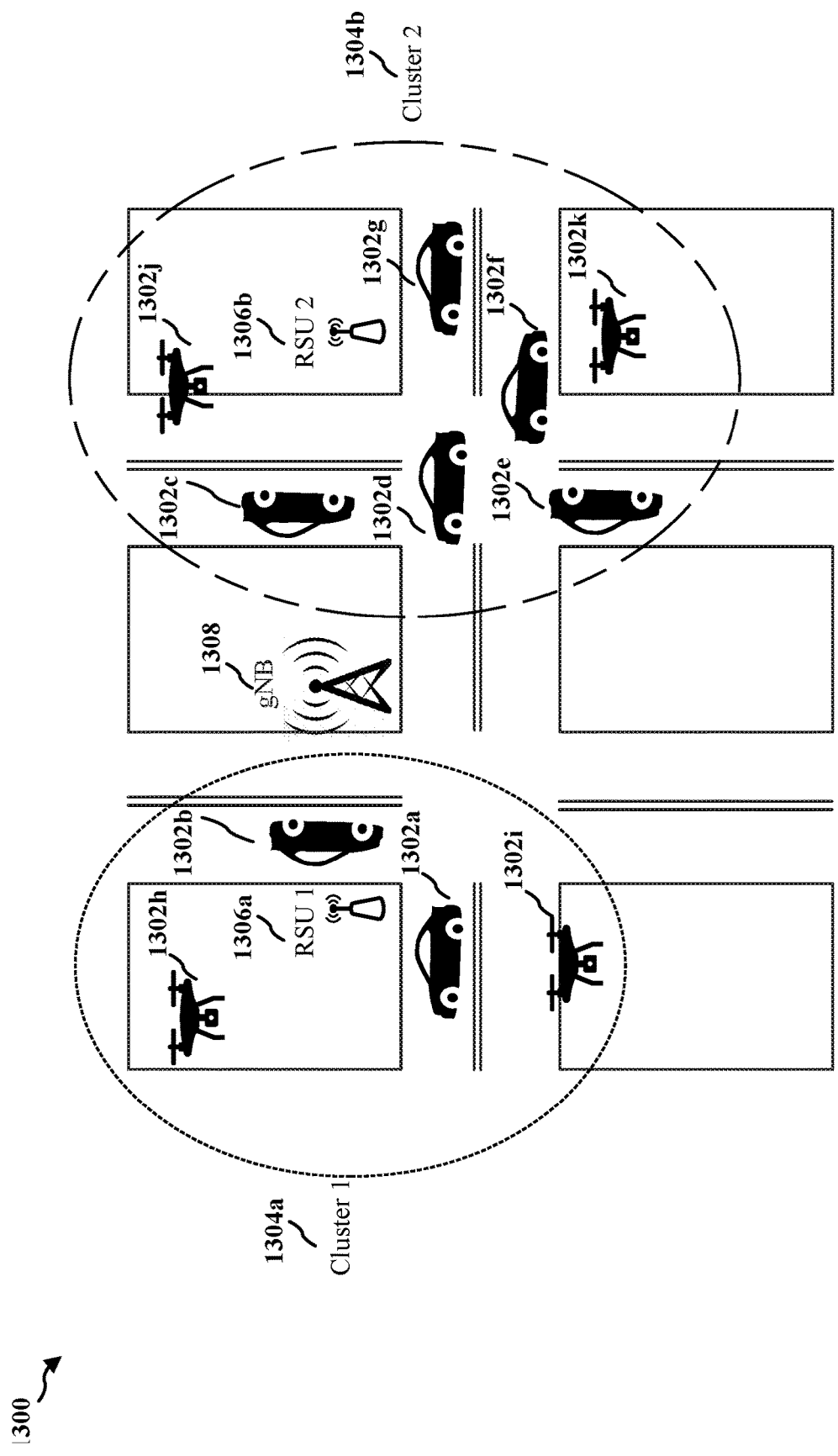
FIG. 13 is a diagram illustrating an example of cluster formation or peer-to-peer networking in an automotive setting including congested and non-congested environments for clustered or peer-to-peer FL.

FIG. 13 is illustrates an example 1300 of cluster formation where UEs 1302 (UEs 1302a, 1302b, 1302c, 1302d, 1302e, 1302f, 1302g, 1302h, 1302i, 1302j, 1302k) in congested and non-congested environments are grouped respectively into different clusters 1304 (clusters 1304a, 1304b) or peer-to-peer networks for clustered or peer-to-peer FL. While the illustrated example specifically shows UEs 1302 being grouped into two clusters or peer-to-peer networks, in other examples, UEs 1302 may be grouped into a different quantity of clusters or peer-to-peer networks (e.g., at least one cluster or peer-to-peer network). In one example, the clusters 1304 may be based on zones. For instance, UEs 1302 in a same intersection may be within a same zone and thus may be assigned to a same cluster. A cluster leader 1306 (cluster leader 1306a, 1306b) which is elected (e.g., as described with respect to FIG. 16 below), selected (e.g., as described with respect to FIG. 18 below), or designated (e.g., as described with respect to FIG. 17 below) for a respective cluster, with or without assistance from base station 1308, may be an RSU or other network node covering a specific geographic area such as an intersection. The UEs 1302 within a respective zone or geographic area covered by an RSU (or other network node) may be grouped into a same cluster if these UEs experience similar congestion levels or other channel conditions. For instance, in the illustrated example, Cluster 1 may have less UEs and lower congestion while Cluster 2 may have more UEs and higher congestion. Moreover, UEs 1302 may be assigned into a same cluster if the UEs run a same ML task (e.g., reinforcement learning, object detection, classification, etc.), allowing these UEs to apply aggregated ML model updates obtained from other UEs in the cluster. While the example of FIG. 13 illustrates two terrestrial UEs (UEs 1302a, 1302b) and two aerial UEs (UEs 1302h, 1302i) in communication with cluster leader 1306 in one of the clusters 1304 and five terrestrial UEs (UEs 1302c, 1302d, 1302e, 1302f, 1302g) and two aerial UEs (UEs 1302j, 1302k) in communication the cluster leader 1306 in another one of the clusters 1304, it should be understood that the clusters 1304 are not limited to these quantities of UEs and may have a different quantities of UEs (terrestrial or aerial) in other examples.

To perform sidelink parameter optimization using clustered FL or peer-to-peer FL, one or more signaling procedures may be provided which allow network nodes (e.g., UEs) to discover and form clusters or peer-to-peer networks with other network nodes, to elect or select leaders for clusters or peer-to-peer networks, or to otherwise implement clustered FL or peer-to-peer FL. These signaling procedure(s) may include, for example: (1) a neighbor discovery procedure in which nodes (e.g., UEs) may discover other nodes (e.g., other UEs, or the FL parameter server) in proximity to or neighboring each other that may participate in a ML training task, e.g., including the signaling described below with respect to FIG. 14 or 15; (2) a signaling procedure for cluster formation and leader election in which nodes participating in the ML training tasks may form clusters with other discovered nodes (without network involvement) and elect cluster leaders (ML model weight aggregators) for respective clusters further based on configured criteria, e.g., including the signaling described below with respect to FIG. 16; (3) a combined signaling procedure for neighbor discovery and cluster formation and leader election or selection in which nodes participating in the ML training tasks may join clusters led by other nodes in response to respective requests from the other nodes, e.g., including the signaling described below with respect to FIG. 18; (4) a signaling procedure for cluster formation and leader selection in which nodes participating in the ML training tasks are grouped together into clusters with other nodes (with network involvement) led by selected cluster leaders (ML model weight aggregators) for respective clusters based on configured criteria, e.g., including the signaling described below with respect to FIG. 17; and (5) a signaling procedure for leader election in a peer-to-peer FL setting in which nodes participating in the ML training tasks may elect a leader for ML model weight aggregation among other discovered nodes based on configured criteria, e.g., including the signaling described below with respect to FIG. 16. The foregoing examples of signaling procedures may apply sidelink communication (for example, over a PC5 interface) between devices such as UEs, downlink/uplink communication (for example, over a Uu interface) between UEs and a network entity such as a base station or RSU, or a combination of sidelink and downlink/uplink communication. Following these signaling procedure(s), network nodes having a similar distribution of observed data may be grouped into clusters, thereby maintaining homogeneity of data within respective clusters. For instance, UEs which respectively train local ML models based on individually collected data, such as temporal sequences of CBR measurements, achieved throughput, or other metrics, and which are affected by similar congestion levels, may be grouped with other UEs into respective clusters led by designated cluster leaders.

Upon completion of cluster formation and leader election (without network involvement) or leader selection (with network involvement), network nodes may achieve sidelink parameter coordination in mode 2 resource allocation configurations through one or more signaling procedures which dynamically coordinate clustered FL (intra-cluster or inter-cluster) or peer-to-peer FL. The signaling procedure(s) may include signaling from participant nodes (e.g., UEs) to leaders (e.g., UEs, RSUs, edge servers, a local FL server, or other network node), signaling from leaders to a FL parameter network entity (e.g., a base station, a FL parameter server, or other network node), signaling from the FL parameter network entity to the leaders, and signaling from the leaders to the participant nodes.

In one example, signaling for clustered FL training may be provided in which nodes may perform intra-FL training coordinated by a cluster leader within a respective cluster through message passing between learning nodes and the cluster leader. In a further example, signaling for clustered FL training may be provided in which nodes may perform inter-FL training coordinated by an FL parameter server across different clusters through message exchanges between respective cluster leaders and the FL parameter server. In a further example, signaling for peer-to-peer FL training may be provided in which the leader coordinates FL training among peer nodes. In another example where none of the peer nodes operate as leaders, signaling for peer-to-peer FL training may be provided in which peer nodes synchronously coordinate FL training among other peer nodes. In a further example where none of the peer nodes operate as leaders, signaling for peer-to-peer FL training may be provided in which peer nodes asynchronously coordinate FL training among other peer nodes. The foregoing examples of signaling procedures may apply sidelink communication (over a PC5 interface) between UEs or other wireless communication devices.

As a result, participant nodes may perform FL training within a cluster and across clusters, or within a peer-to-peer network. For instance, cluster or peer-to-peer networks may be assigned leaders that are responsible for coordinating an FL process within their respective cluster or peer-to-peer network. The leaders may respectively aggregate local ML models reported by individual participant nodes observing similar traffic statistics, and cluster leaders may communicate this information to the FL parameter network entity along with summary statistics associated with their respective cluster. The FL parameter network entity may dynamically control the evolution of the FL process among the clusters. For instance, the FL parameter network entity may aggregate ML models across clusters which observe similar distributions of data with respect to some measure, and the FL parameter network entity may dynamically assign participant nodes to different clusters based on the aggregated information. The FL parameter network entity may communicate the inter-cluster aggregations and dynamic cluster assignments to cluster leaders, which in turn communicate this information to participant nodes. Leaders of peer-to-peer networks may similarly communicate aggregated ML model information of participant nodes to the various participant nodes. The participant nodes in a cluster or peer-to-peer network may apply the aggregated ML models to their respective datasets to derive a common SCI parameter among participant nodes in the cluster or peer-to-peer network. As a result, sidelink communication performance may be improved between network nodes with similar congestion levels, traffic statistics, or similar attributes.

Figure 14:
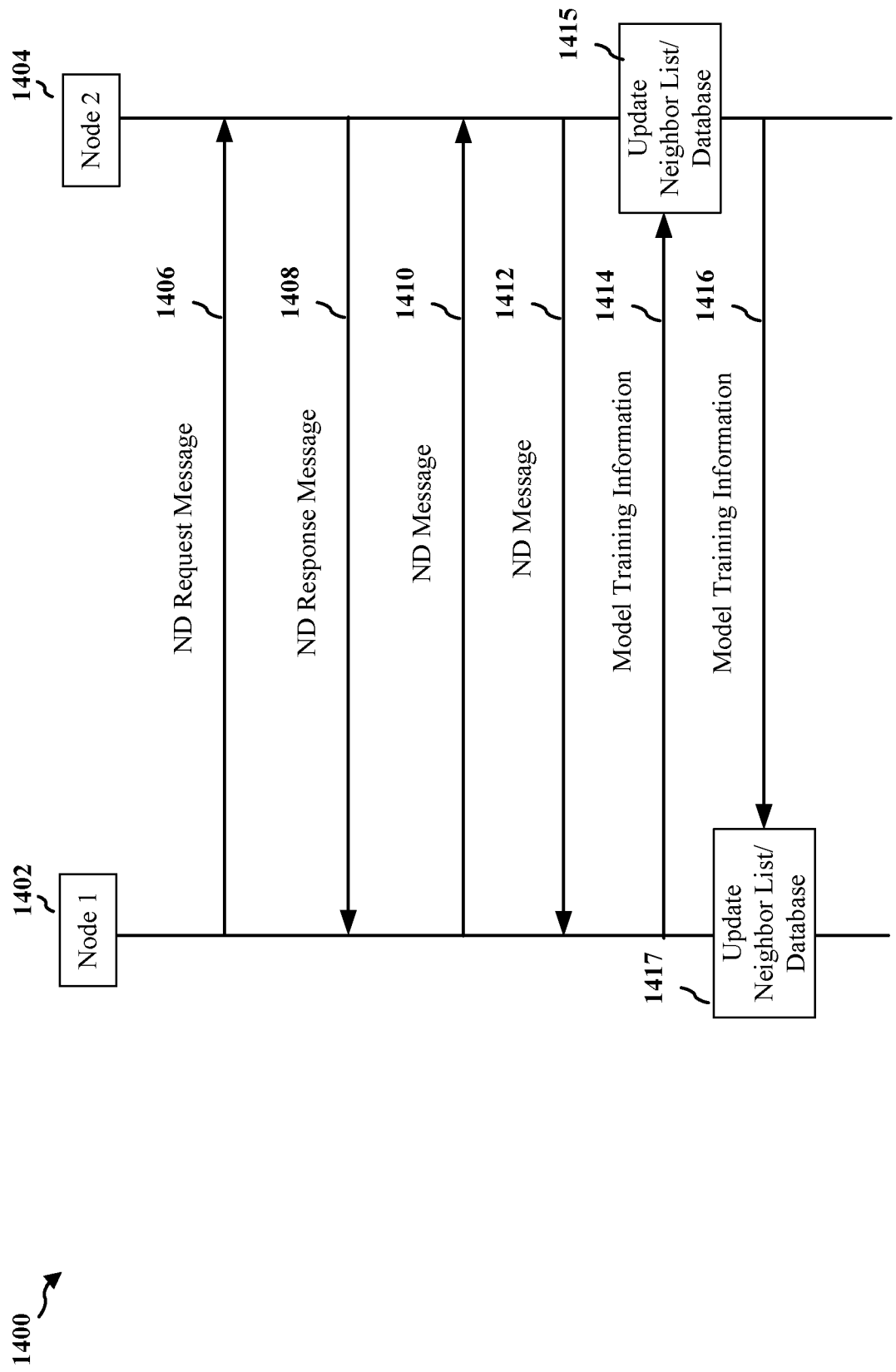
FIG. 14 is a diagram illustrating an example of a signaling procedure for neighbor discovery.

FIG. 14 illustrates an example 1400 of a signaling procedure which allows a first node 1402 (e.g., a UE referred to here as Node 1) to discover potential neighboring nodes such as second node 1404 (e.g., another UE referred to here as Node 2) using sidelink communications. Referring to the previous Figures, Node 1 and Node 2 may be, for example, UE 104, 1104, 1202, 1302 or network node 906, 1002, 1052. Initially, first node 1402 may transmit a neighbor discovery (ND) message 1406 or request. The ND message 1406 may be provided periodically (e.g., with a pre-configured periodicity), or in response to an event. For instance, first node 1402 may be triggered to send the ND message 1406 upon receiving a basic safety message (BSM) indicating the existence of another node (e.g., a neighboring VUE). The ND message 1406 may be broadcast in order to solicit a response from any node (e.g., VUEs) capable of decoding the ND message 1406. Alternatively, the ND message 1406 may be groupcast, for example, to nodes which provided a BSM to first node 1402. The ND message 1406 may also be sent using groupcast option 1 to enhance reliability of the ND message 1406 (e.g., first node 1402 may indicate in second stage SCI a distance within which first node 1402 expects to receive NACKs from other nodes who fail to decode the message). In this example, a node which receives the ND message 1406 from first node 1402 is referred to here as Node 2 (second node 1404).

In response to receiving the ND message 1406 from first node 1402, second node 1404 may add first node 1402 to a neighbor list, communication graph, or other data structure (stored at second node 1404) indicating first node 1402 is an asymmetric neighbor. Second node 1404 may indicate first node 1402 as an "asymmetric" neighbor since, at this time, second node 1404 is aware of its communication capability with first node 1402, but first node 1402 is not yet aware of its communication capability with second node 1404. Second node 1404 may then provide a neighbor discovery response (NDR) message 1408 acknowledging first node 1402 as an asymmetric neighbor of second node 1404. The NDR message 1408 may be provided unicast to first node 1402. In response to receiving the NDR message 1408, first node 1402 may add second node 1404 to a neighbor list, communication graph, or other data structure (stored at first node 1402) indicating second node 1404 is a symmetric neighbor. First node 1402 may indicate second node 1404 as a "symmetric" neighbor since, at this time, both first node 1402 and second node 1404 are aware of their communication capability with the other node. First node 1402 may then provide second node 1404 a message 1410 (e.g., via unicast) acknowledging second node 1404 as a symmetric neighbor of first node 1402. In response to receiving the message 1410, second node 1404 may update the status of first node 1402 in its data structure to similarly indicate that first node 1402 is now a symmetric neighbor. Second node 1404 may then send a message 1412 to first node 1402 (e.g., via unicast) acknowledging first node 1402 has become a symmetric neighbor of second node 1404.

After first node 1402 and second node 1404 have designated each other as a neighbor (i.e., a symmetric neighbor), first node 1402 may transmit a message 1414 indicating model training-related information to second node 1404. This information may include, for example, ML tasks that first node 1402 is participating in or is interested in participating in, available sensors at first node 1402 and their associated data input format, available ML models in training including model status, model architectures, model training parameters, and current performance (e.g., accuracy and loss), and available computation resources (e.g., whether first node 1402 includes a CPU or GPU, information about its clock speed, available memory, etc.). For instance, the message 1414 may indicate that first node 1402 is configured to perform object detection (e.g., to identify OBB s), image classification, reinforcement learning, or other ML task. The message 1414 may indicate that first node 1402 includes a camera, LIDAR, RADAR, IMU, or other sensor, and data format(s) that are readable by the indicated sensor(s). The message 1414 may indicate that first node 1402 is configured with a neural network (e.g., the CNN of FIG. 6, a DNN, a DCN, a RNN, or other ANN), a quantity of neurons and synapses, a logistic regression or classification model, current values for model weights and biases, an applied activation function (e.g., ReLU), a classification accuracy, and a loss function applied for model weight updates (e.g., a cross-entropy loss function). The message 1414 may indicate that a CPU or GPU of first node 1402 (e.g., controller/processor 459 or some other processor of UE 450) applies the indicated neural network(s) and model(s) for the indicated ML task(s), a clock speed of the CPU or GPU, and a quantity of available memory (e.g., memory 460 or some other memory of UE 450) for storing information associated with the ML task, neural network, data, etc. The message 1414 may include any combination of the foregoing, as well as other information.

In response to receiving message 1414 including the model training-related information, at operation 1415, second node 1404 associates this information with first node 1402 in its neighbor list, communication graph, or other data structure. Second node 1404 may consider this information later on during cluster formation if deciding whether or not to form a cluster with first node 1402 to perform a ML task. For example, second node 1404 may determine not to cluster with first node 1402 if this information indicates first node 1402 has a dissimilar ML model or a lower computation capability than that of second node 1404.

Second node 1404 may then send message 1416 indicating model training-related information to first node 1402. This information may include, for example, ML tasks that second node 1404 is participating in or is interested in participating in, available sensors at second node 1404 and their associated data input format, available ML models in training including model status, model architectures, model training parameters, and current performance (e.g., accuracy and loss), and available computation resources (e.g., whether second node 1404 includes a CPU or GPU, information about its clock speed, available memory, etc.). Thus, the message 1416 may include the same type of information as message 1414, but for second node 1404 rather than first node 1402. In response to receiving message 1416 including the model training-related information, at operation 1417, first node 1402 associates this information with second node 1404 in its respective data structure. First node 1402 may similarly consider this information later on during cluster formation if deciding whether or not to form a cluster with second node 1404 to perform a ML task.

Figure 15:
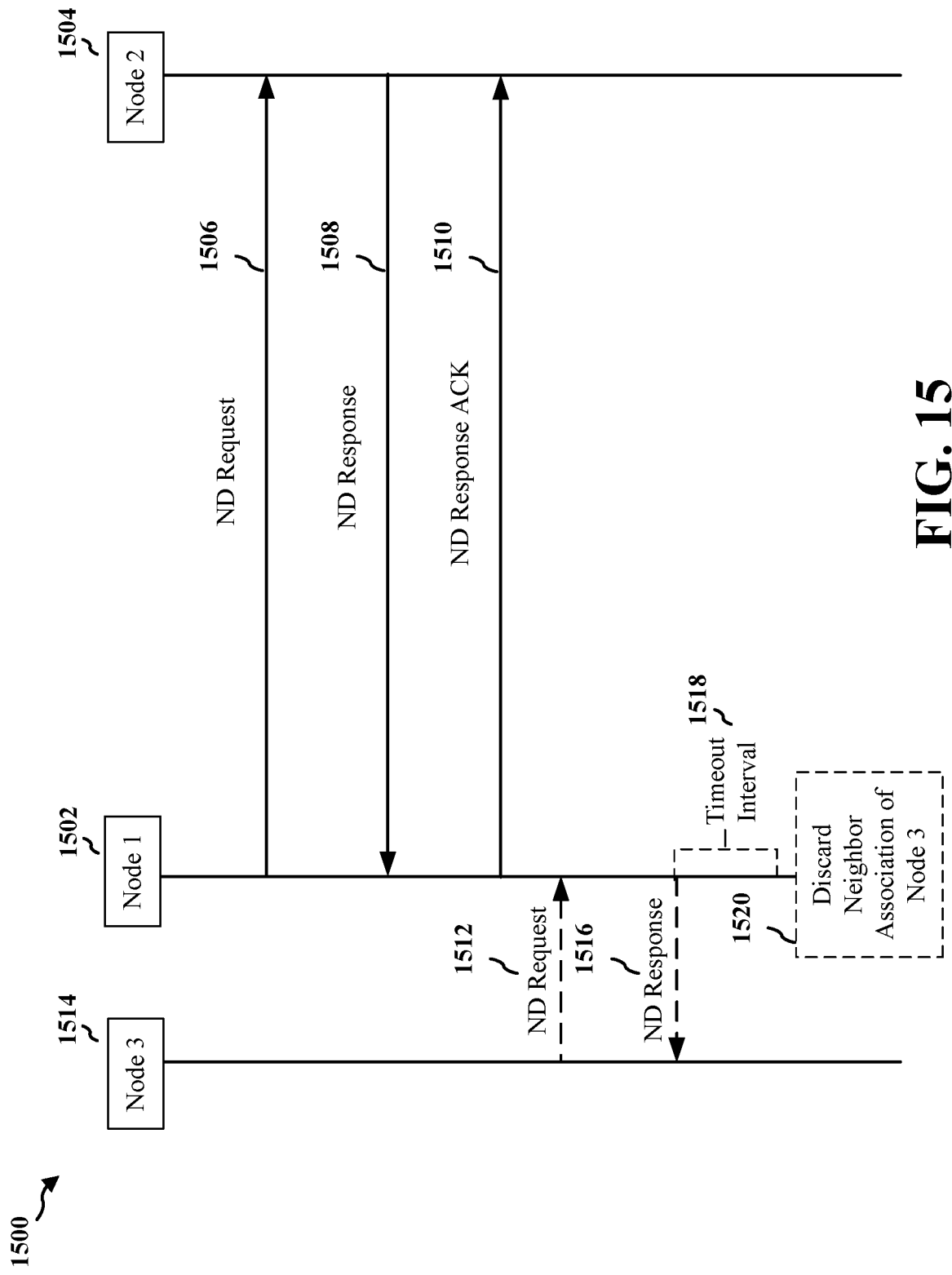
FIG. 15 is a diagram illustrating an example of another signaling procedure for neighbor discovery.

FIG. 15 illustrates an example 1500 of another signaling procedure which allows a first node 1502 (e.g., a UE similarly referred to here as Node 1) to discover potential neighboring nodes such as second node 1504 (e.g., another UE similarly referred to here as Node 2) using sidelink communications. This signaling procedure combines the neighbor discovery and model-related information exchange messages of FIG. 14, thereby resulting in fewer operations but larger message payloads per operation than those of the signaling procedure of FIG. 14. Moreover, this signaling procedure allows each node to determine during neighbor discovery whether to add the other node to its neighbor list or similar data structure, in contrast to the signaling procedure of FIG. 14 which postpones such decision making until the cluster formation process.

Initially, first node 1502 may transmit a neighbor discovery (ND) message 1506 or request, similar to that in FIG. 14. In this example, a node which receives the ND message 1506 from first node 1502 is referred to here as second node 1504, similar to the example of FIG. 14. However, in contrast to the example of FIG. 14, in this example the ND message 1506 further indicates model training-related information to second node 1504. This information may include similar types of information as those provided in message 1414 of FIG. 14.

In response to receiving (e.g., successfully decoding) the ND message 1506 from first node 1502, second node 1504 may determine based on the model training-related information in the ND message 1506 whether or not to add first node 1502 to its neighbor list, communication graph, or other data structure. For example, second node 1504 may determine not to add first node 1502 to its data structure if this information indicates first node 1502 has a dissimilar ML model or a lower computation capability than that of second node 1504 (e.g., if first node 1502 is configured with a Markov model or a small amount of available memory for ML while second node 1504 is configured with a classification model or a high amount of available memory for ML). In such case, second node 1504 may disregard or ignore (and thus not respond to) ND message 1506. Alternatively, second node 1504 may determine to add first node 1502 to its data structure if the information indicates, for example, that first node 1502 has a same or similar ML model (e.g., a classification model) or a same or similar computation capability (e.g., memory) as that of second node 1504. In such case, second node 1504 may add first node 1502 and its associated model training-related information to its neighbor list, communication graph, or similar data structure (stored at second node 1504).

Subsequently, second node 1504 may provide an NDR message 1508 to first node 1502 (e.g., via unicast) which not only acknowledges first node 1502 as a neighbor of second node 1504, but also indicates model training-related information of second node 1504. This information may include the same type of information as ND message 1506, but for second node 1504 rather than first node 1502.

In response to receiving the NDR message 1508 including the model training-related information, first node 1502 may similarly determine based on the model training-related information whether or not to add second node 1504 to its neighbor list, communication graph, or other data structure. For example, first node 1502 may determine not to add second node 1504 to its data structure if this information indicates second node 1504 has a dissimilar ML model or a lower computation capability than that of first node 1502. In such case, first node 1502 may disregard or ignore (and thus not respond to) NDR message 1508. Alternatively, first node 1502 may determine to add second node 1504 to its data structure if the information indicates, for example, that second node 1504 has a same or similar ML model or a same or similar computation capability as that of first node 1502. In such case, first node 1502 may add second node 1504 and its associated model training-related information to its neighbor list, communication graph, or similar data structure (stored at first node 1502). Furthermore, first node 1502 may then provide second node 1504 a message 1510 (e.g., via unicast) acknowledging second node 1504 as a neighbor of first node 1502.

On the other hand, if second node 1504 fails to receive, within a pre-configured timeout interval, an acknowledgement of the NDR message 1508 from first node 1502 (or an acknowledgment that second node 1504 has been added to the neighbor list of first node 1502), such as in the case where first node 1502 disregarded or ignored the NDR message 1508, second node 1504 drops first node 1502 and its associated information from its neighbor list, communication graph, or similar data structure. Similarly, as illustrated in the example of FIG. 12, if first node 1502 previously received a ND request 1512 from another node 1514

(third node 1514), sent a NDR message 1516 in response to the ND request 1512, but failed to receive, within a timeout interval 1518, an acknowledgment of the NDR message 1516 from third node 1514 (such as in the case where third node 1514 disregarded or ignored the NDR message 1516) then at operation 1520, first node 1502 may discard any associated information of third node 1514 from its neighbor list, communication graph, or similar data structure.

Figure 16:
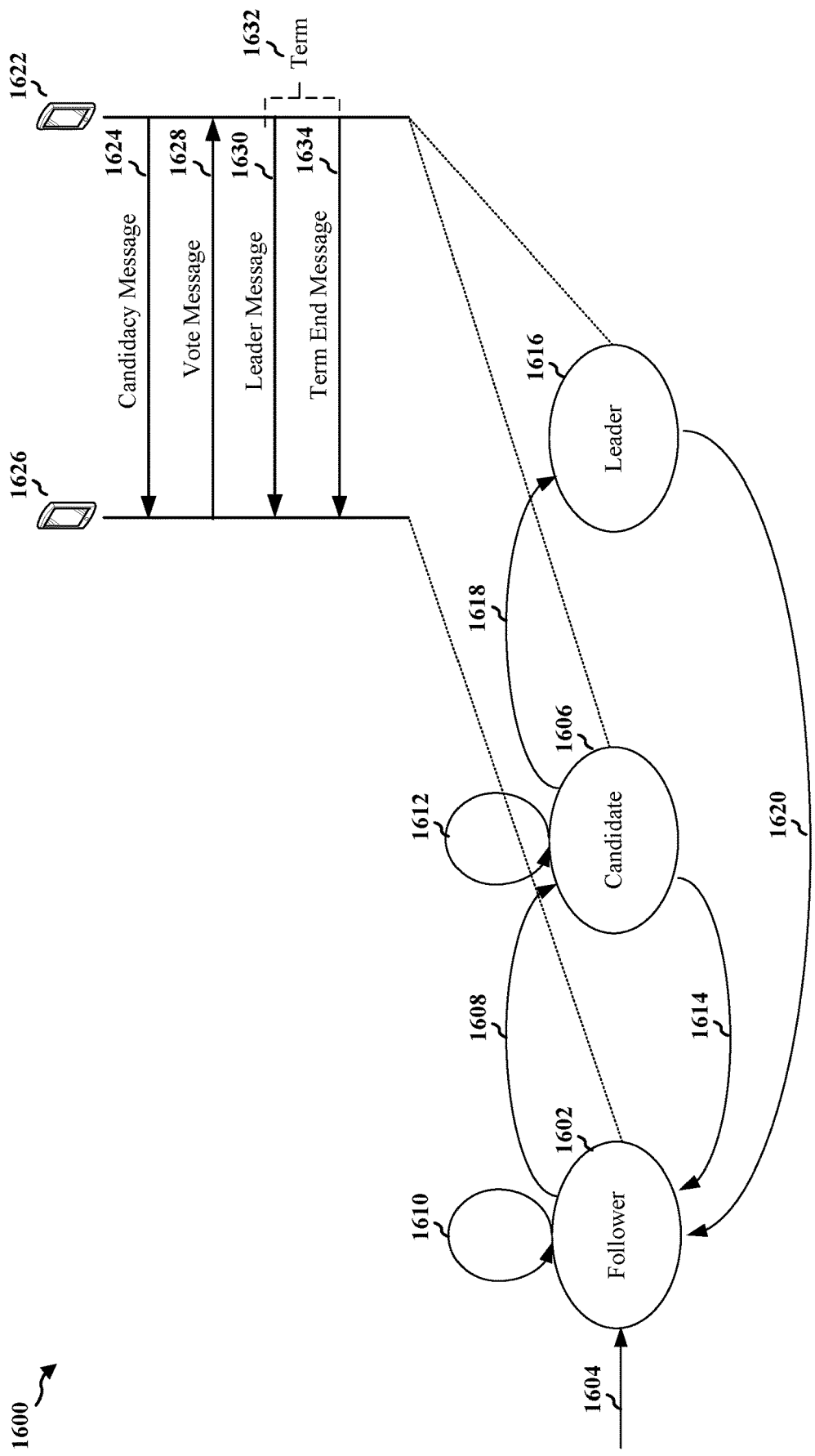
FIG. 16 is a diagram illustrating an example of a node state machine during a cluster formation or leader election process.

FIG. 16 illustrates an example 1600 of a node state machine during a cluster formation or leader election process. The state machine may indicate a state of a network node (e.g., UE) at a given time and the operations the network node may perform in order to transition between states. Different network nodes may have a similar state machine and operate according to this state machine following the neighbor discovery process of FIG. 14 or 15. A network node which includes at least one other node in its neighbor list, communication graph, or similar data structure may operate according to the node state machine of FIG. 16 in order to form clusters with cluster leaders, or to elect leaders for FL in a peer-to-peer network. Moreover, signaling or communications by a node to its neighbor(s) during this cluster formation or leader election process may be broadcast or groupcast.

In the example of FIG. 16, a network node (e.g., UE) may potentially take on any of the following roles: a leader (aggregator), a follower (participant), or a candidate to be a leader. Leader nodes are configured to aggregate ML model updates from follower nodes in FL for a period of time (a timeout period or term for being a leader). In one example, leader nodes may serve as aggregators without themselves participating in learning or model training, while in other examples, leader nodes may themselves participate in model training in addition to serving as aggregators. Leader nodes may be cluster leaders in a clustered FL architecture such as illustrated in FIG. 11, or peer leaders in a peer-to-peer FL architecture such as illustrated in FIG. 12. Follower nodes are participating or learning nodes in FL which train ML models and provide updates to respective leaders. Candidate nodes are network nodes which contest with other candidate nodes in an election to become a leader node.

Initially, during an election cycle, network nodes begin in a follower state 1602, as illustrated by transition 1604. At this state, a node may change to a candidate state 1606 in response to declaring itself as a candidate for a leader election, as illustrated by transition 1608. In one example of a candidacy trigger, a node may declare itself as a candidate if the node fails to receive a candidacy message (e.g., message 1624 below) from another node within a pre-configured timeout period beginning after the node completes neighbor discovery. This timeout period is intended to provide time for the other node to complete its own neighbor discovery and determine whether to declare itself a candidate before the node makes that determination itself. In another example of a candidacy trigger, even if the node does receive a candidacy message (e.g., message 1624 below) from other node(s) within the pre-configured timeout period, the node may still declare itself as a candidate if the node determines that ML model information collected from the other node(s) during neighbor discovery is insufficient to trigger a vote (e.g., message 1628 below) for election from the node. For instance, the node may disregard such candidacy messages if they originate from nodes including a dissimilar ML model or a lower computation capability than that of the node (e.g., if one node is configured with a Markov model or a small amount of available memory for ML, while the other node is configured with a classification model or a high amount of available memory for ML). In a further example of a candidacy trigger, the node may declare itself as a candidate if, upon completion of neighbor discovery and while monitoring a loss function of its local ML model, the node determines that its loss function indicates a low quality ML model. For instance, if the node determines that the value of its loss function falls below a threshold, the node may be incentivized to be elected as a leader to quickly begin an FL session and improve its loss function. Alternatively, the node may remain in the follower state 1602 in response to taking no action, as illustrated by transition 1610.

During an election, nodes in follower states 1602 may vote on nodes in candidate states 1606 (e.g., based on majority rule). If a candidate node loses the election to another node but still determines to remain a candidate for a subsequent leader election, the node may remain in the candidate state 1606, as illustrated by transition 1612. Alternatively, the node may switch back to the follower state 1602, as illustrated by transition 1614.

On the other hand, if a candidate node wins the election (e.g., the node received a majority vote from other nodes during the election), the node may change to a leader state 1616, as illustrated by transition 1618. During ML model training, this leader node may perform aggregation of model updates from follower nodes in a cluster within a clustered FL architecture, such as described with respect to FIG. 11, or perform aggregation of model updates from follower nodes in a peer-to-peer network having a peer-to-peer FL architecture, such as described with respect to FIG. 12. In a clustered FL architecture, the leader node may also group the follower nodes into a cluster served by the leader node and send a message to the FL parameter server indicating its status as a cluster leader. In either FL architecture, the leader node may remain in the leader state 1616 (as a leader) for a timeout period or term, after which the node may change back to the follower state 1602 as illustrated by transition 1620 and a new leader node may be elected. In the case of a tie where none of the candidate nodes receives a majority vote (e.g., each node receives a same quantity of votes), the follower nodes may select one of the candidate nodes to be a leader node based on various tie-breaking factors. For instance, a leader node may be selected randomly among the tied candidate nodes or selected from whichever candidate node has the most available computation resources or communication qualities (e.g., signal-to-noise ratio) of the tied candidate nodes.

In one example of an election, a candidate node 1622 may groupcast or broadcast a message 1624 indicating its candidacy to other nodes in its neighbor list. Candidate node 1622 may initially be in a follower node that declared itself as a candidate to be a leader for election in response to any of the aforementioned candidacy triggers. A follower node 1626 that receives this candidacy message, and potentially other candidacy messages from other candidate nodes, may transmit a message 1628 indicating a vote for one of these candidate nodes. Candidate nodes which receive votes from follower nodes may notify other candidate nodes as to the quantity of votes each candidate node has received. If a candidate node has received a majority of votes from follower nodes out of other candidate nodes, or has received a configured or pre-configured quantity of votes exceeding a threshold in the case where a single candidate node is up for election, that node may win the election. This leader node may become a ML model aggregator of a cluster or peer network including the follower nodes that had provided vote messages to that node. The leader node may also send a message 1630 to the follower nodes and the other candidate nodes indicating its status as a leader node for a period of time or term 1632. Once the term 1632 of the leader node ends, the node may send a message 1634 to the follower nodes in its cluster or peer network indicating the end of its term.

In a clustered FL architecture, other elections may simultaneously occur involving other follower nodes and other candidate nodes, and so multiple clusters and cluster leaders may be formed. For instance, one group of follower nodes voting on one group of candidate nodes in their neighbor lists may participate in one cluster while another group of follower nodes voting on another group of candidate nodes in different neighbor lists may participate in a different cluster. In a peer-to-peer FL architecture, the follower nodes and candidate nodes may be within the neighbor lists or network of other follower nodes and candidate nodes, and therefore one peer group and leader may accordingly be formed from these nodes. This result is equivalent to forming a single cluster encompassing every node in a clustered FL architecture (e.g., a peer group may effectively act as a cluster).

Figure 17:
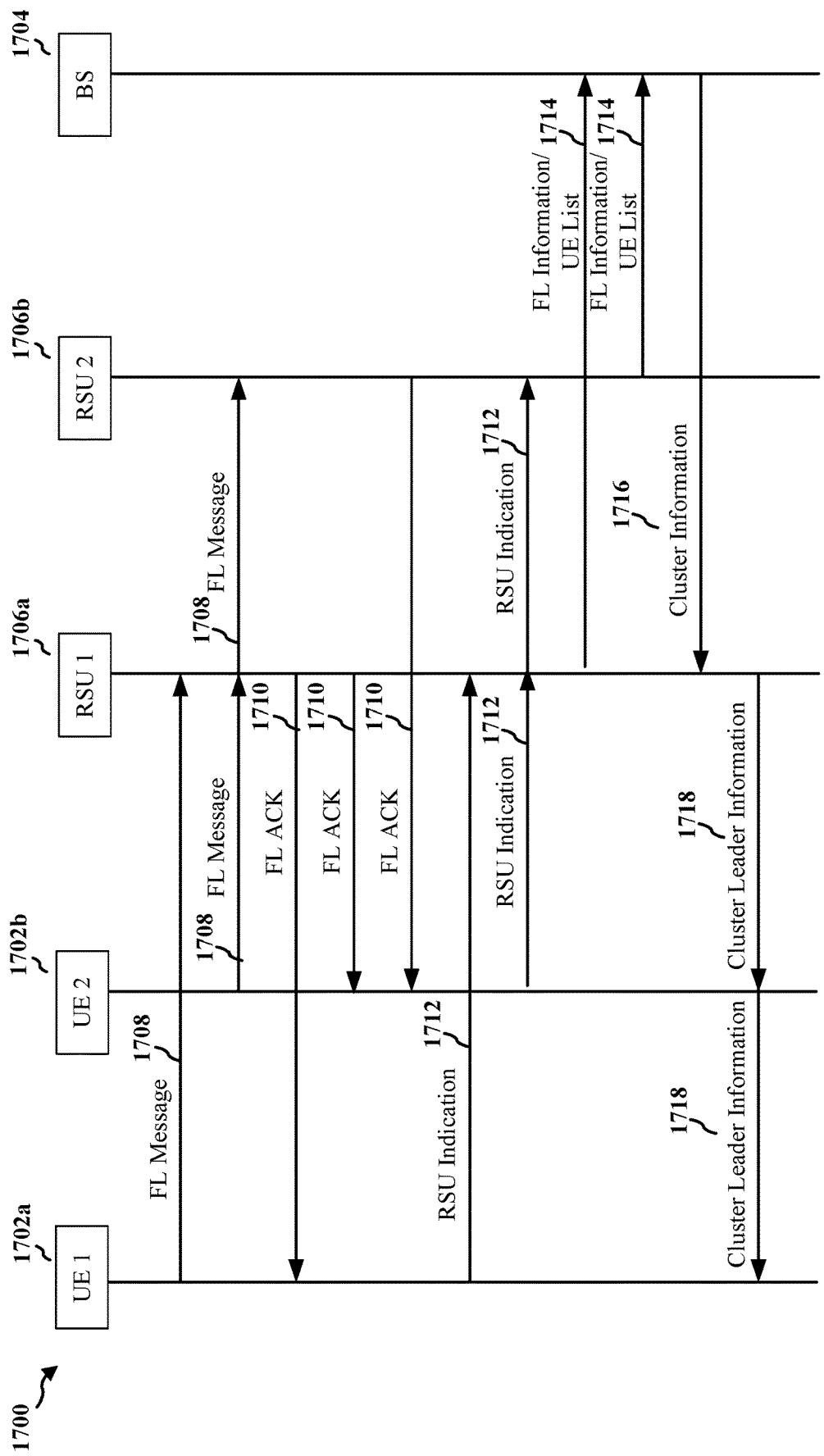
FIG. 17 is a diagram illustrating an example of a signaling procedure for network-assisted cluster formation and leader selection.

FIG. 17 illustrates an example 1700 of a signaling procedure which allows UEs 1702 (UEs 1702*a*, 1702*b*) to form a cluster (e.g., cluster 1102, 1304 in FIGS. 11 and 13) and a base station 1704 to select an RSU 1706 (RSU 1706*a*, 1706*b*) as a cluster leader or model weight aggregator for the UEs 1702 and other FL participants within the cluster. In this procedure, the base station 1704 may form clusters of UEs 1702 based on FL information (e.g., ML model-related information) of these respective UEs, and the base station may designate RSUs which are capable of communication with these UEs as respective cluster leaders. For example, the base station 1704 may select one of multiple RSUs to serve as a model weight aggregator for a group of UEs in communication with the RSU and indicated by the RSU as having an interest in performing a same ML task in FL, having same or similar sensors and input formats for training data in FL, having same or similar quantities of available computational resources for FL, or other parameters. Thus, the base station may cluster UEs having similar FL parameters for maximum efficiency in model training and optimization (e.g., by not grouping UEs together with different ML tasks, different computational capabilities, etc.), as well as select an RSU for cluster leadership that is capable of communication with these UEs for coordinating the model training and optimization. While the illustrated example of FIG. 17 specifically refers to RSUs 1706 as cluster leaders or model weight aggregators, in other examples, edge servers or other network nodes may replace the RSUs as cluster leaders or model weight aggregators. For instance, RSUs may be applied in a vehicle-related application of FL such as illustrated in FIG. 10A, while edge servers may be applied in a manufacturing-related application of FL such as illustrated in FIG. 10B.

Initially, UEs 1702 may respectively transmit an FL message 1708. The FL message 1708 is intended to be received by RSUs 1706, which in this example are prospective cluster leaders. At the time the FL messages 1708 are transmitted, the RSUs are not aware of the UEs 1702 with which the RSUs can respectively communicate (e.g., which UEs are neighbors or proximal to a respective RSU), nor the ML task(s) that these UEs are interested in performing. Thus, the FL messages 1708 may serve as discovery messages in response to which UEs and RSUs may become aware of the other's presence.

The FL message 1708 may be provided periodically (e.g., with a pre-configured periodicity), or in response to an event. In one example of an event, a UE may be triggered to send the FL message 1708 upon entering a service coverage area of an RSU or base station. In another example of an event, the UE may be triggered to send the FL message 1708 in response to a decision by the UE to join an FL cluster to improve the accuracy of its ML model. For instance, the UE may provide FL message 1708 if its classification accuracy or other evaluation metric falls below a threshold.

The FL message 1708 further indicates FL or model training-related information of a respective UE. This information may include, for example, ML tasks that the UE is participating in or is interested in participating in, available sensors at the UE and their associated data input format, available ML models in training including model status, model architectures, model training parameters, and current performance (e.g., accuracy and loss), and available computation resources (e.g., whether the UE includes a CPU or GPU, information about its clock speed, available memory, etc.). For instance, the FL message 1708 may indicate that the UE is configured to perform object detection (e.g., to identify OBB s), image classification, reinforcement learning, or other ML task. The FL message 1708 may indicate that the UE includes a camera, LIDAR, RADAR, IMU, or other sensor, and data format(s) that are readable by the indicated sensor(s). The FL message 1708 may indicate that the UE is configured with a neural network (e.g., the CNN of FIG. 6, a DNN, a DCN, a RNN, or other ANN), a quantity of neurons and synapses, a logistic regression or classification model, current values for model weights and biases, an applied activation function (e.g., ReLU), a classification accuracy, and a loss function applied for model weight updates (e.g., a cross-entropy loss function). The FL message 1708 may indicate that a CPU or GPU of the UE (e.g., controller/processor 459 or some other processor of device 450) applies the indicated neural network(s) and model(s) for the indicated ML task(s), a clock speed of the CPU or GPU, and a quantity of available memory (e.g., memory 460 or some other memory of device 450) for storing information associated with the ML task, neural network, data, etc. The FL message 1708 may include any combination of the foregoing, as well as other information.

The FL message 1708 may be broadcast in order to solicit a response from any RSU capable of decoding the FL message. For instance, in the illustrated example of FIG. 17, RSU 1 may be proximal to (e.g., a neighbor of) both UE 1 and UE 2 and thus successfully decode the FL messages of both UE 1 and UE 2, while RSU 2 may be proximal to UE 2 and thus successfully decode the FL message of UE 2. Thus, one UE may provide an FL message to multiple RSUs, and one RSU may obtain an FL message respectively from multiple UEs.

In response to receiving and decoding the FL message 1708 from a respective UE, an RSU (e.g., RSU 1 or RSU 2) may store the identifier of the UE in memory, store (at least temporarily) the FL information of the UE 1702 in memory, and provide the UE 1702 a FL message acknowledgment 1710 confirming receipt of its FL message. The RSU 1706 may provide the FL message acknowledgment 1710 via unicast to the respective UE. The FL message acknowledgment 1710 may also indicate an identifier of the RSU 1706 so that the UE 1702 receiving the acknowledgment may ascertain the source RSU. For example, if the UE 1702 provided the FL message 1708 to multiple RSUs 1706, the UE will obtain multiple such FL message acknowledgments 1710 including respective identifiers from the respective RSUs. For instance, in the illustrated example of FIG. 17, UE 2 may provide its FL message to both RSU 1 and RSU 2, and therefore UE 2 may obtain an FL message acknowledgment from RSU 1 indicating an identifier of RSU 1 and an FL message acknowledgment from RSU 2 indicating an identifier of RSU 2. Similarly, UE 1 also provided its FL message to RSU 1, and therefore UE 1 may similarly obtain an FL message acknowledgment from RSU 1 indicating an identifier of RSU 1 (but not an acknowledgment from RSU 2, since RSU 2 did not obtain or successfully decode the FL message).

After obtaining the FL message acknowledgement(s) from respective RSU(s) 1706, a UE may ascertain the RSUs in the network which have decoded its FL message. The UE may then select one of these acknowledging RSU(s) to act as its delegate for passing its FL information to the base station 1704 for cluster formation and leader selection. Similarly, other UEs may select a respective acknowledging RSU to act as their respective delegates for passing respective FL information. For instance, in the illustrated example of FIG. 17, UE 1 may select only RSU 1 given its sole acknowledgement of the FL message 1708 from that UE, while UE 2 may select either RSU 1 or RSU 2 given both RSU's acknowledgment of the FL message 1708 from that UE. However, if UE 2 happens to also select RSU 1 in this example, then RSU 1 would end up inefficiently sending the FL information of both UEs to the base station, incurring additional communication overhead at RSU 1 than in the case where RSU 2 happened to be selected. Therefore, to minimize the communication overhead between the RSUs 1706 and the base station 1704, UEs 1702 may be configured to select different RSUs for the FL message passing. For instance, in the aforementioned example, UE 2 may be configured to select RSU 2 in this situation (rather than RSU 1). As a result, inefficient situations may be avoided of an RSU passing to the base station FL information from multiple UEs, or multiple RSUs passing to the base station FL information of a single UE.

After selecting an RSU from the acknowledging RSU(s), the UE 1702 may provide an RSU indication message 1712 including the identifier of the selected RSU to the acknowledging RSU(s). In the case of multiple acknowledging RSUs (e.g., RSU 1 and RSU 2 for UE 2 in the example of FIG. 17), the UE may provide the RSU indication message 1712 via groupcast to the multiple acknowledging RSUs. The message is provided via groupcast to allow the acknowledging RSUs to respectively determine whether or not the RSU was indicated as a delegate for FL message passing by that UE. Upon receiving the RSU indication message 1712 from a respective UE, an RSU having an identifier that matches the identifier included in the RSU indication message 1712 may determine itself to be a delegate for passing FL information of that UE, and therefore maintain its storage in memory of the FL information in the FL message 1708 from that UE. In contrast, an RSU having an identifier that does not match the identifier included in the RSU indication message 1712 may determine itself to not be a delegate for that UE, and therefore may drop or discard the FL information of that UE from memory while still maintaining its storage in memory of the identifier of the UE. Notwithstanding the indicated RSU in the RSU indication message 1712, an RSU may continue to store identifiers of UEs which the RSU previously acknowledged in order to track its ability to communicate with those UEs and to inform the base station 1704 of this list of UEs during cluster formation and leader selection.

In response to obtaining the RSU indication message(s) 1712 from the UEs 1702, the RSUs 1706 may respectively provide a message 1714 to base station 1704 including the FL information of the UE which indicated the RSU's identifier and a list (or other data structure) of the identifiers of the UEs 1702 which the RSU has previously acknowledged (and thus has the ability to communicate). For instance, in the illustrated example of FIG. 17, RSU 1 may provide the FL information of UE 1 to base station 1704, RSU 2 may provide the FL information of UE 2 to base station 1704, and both RSU 1 and RSU 2 may provide the identifiers of UE 1 and UE 2 to base station 1704. As a result, the base station 1704 may be informed of the ML tasks, sensors, model information, and computational capabilities of the UEs 1702, and the RSUs 1706 which may communicate with respective UEs.

In one example, one or more of the RSUs 1706 may be learning nodes, rather than merely UE FL information aggregators. For instance, these RSU(s) may have obtained their own local dataset and intend to train their own ML model using that dataset in FL. In such case, those RSU(s) 1706 may also provide in message 1714 their own FL information to the base station 1704, similar to the FL information of the UEs. This information may include, for example, ML tasks that the RSU is participating in or is interested in participating in, available ML models in training including model status, model architectures, model training parameters, and current performance (e.g., accuracy and loss), and available computation resources (e.g., whether the RSU includes a CPU or GPU, information about its clock speed, available memory, etc.). While in one example the message 1714 from an RSU may include the UE FL information, UE list, and RSU FL information if existing, in other examples, any combination of the foregoing may be included in one or multiple such messages 1714 from an RSU.

In response to receiving the messages 1714 from respective RSUs 1706, the base station 1704 may aggregate the UE FL information (e.g., store in memory the FL information of the respective UEs 1702), select the RSU(s) serving as cluster leaders based on the aggregated information, and select the UEs 1702 to be members or participants of the clusters led by respectively selected RSU(s) based on the aggregated information. For instance, the base station may assign UEs 1702 to a cluster of an RSU which indicated a capability to communicate with those UEs in message 1714 (e.g., via inclusion of those UEs' identifiers). The base station may not necessarily assign a UE to the cluster of the same RSU which identifier the UE indicated in the RSU indication message 1712. For instance, in the illustrated example of FIG. 17, even though the base station 1704 obtained messages 1714 from both RSU 1 and RSU 2 respectively indicating the FL information of UE 1 and UE 2 (in response to UE 1 and UE 2 respectively indicating RSU 1 and RSU 2 as their delegates in respective RSU indication messages 1712), the base station may assign both UE 1 and UE 2 as cluster members of a cluster led by RSU 1.

The base station 1704 may also select an RSU to serve as a cluster leader and the UEs to serve as cluster members of such RSU based on other factors than the communication capability indicated in the messages 1714. For instance, the base station may select as cluster leader whichever RSU can communicate with the largest quantity of UEs (e.g., the RSU whose list included the largest quantity of UE identifiers), and group those UEs together in a cluster under that RSU. For example, in the illustrated example of FIG. 17, the base station may select RSU 1 as the cluster leader of both UE 1 and UE 2, rather than RSU 1 as the cluster leader of UE 1 and RSU 2 as the cluster leader of UE 2, in response to determining from the obtained lists of UEs in messages 1714 that RSU 1 may communicate with the larger quantity of UEs (e.g., both UE 1 and UE 2) as opposed to RSU 2 (which may only communicate with UE 1 in this example). Additionally or alternatively, the base station may select UEs 1702 having same or similar computational capabilities to be in a same cluster, while selecting UEs having different computational capabilities to be in different clusters. For instance, in the illustrated example of FIG. 17, the base station 1704 may group UE 1 and UE 2 in a same cluster led by RSU 1 in response to determining from the FL information in messages 1714 that UE 1 and UE 2 both have high computational capabilities or both have low computational capabilities. In contrast, if UE 1 had high computational capabilities and UE 2 had low computational capabilities, or vice-versa, the base station 1704 may determine to group UE 1 and UE 2 in different clusters led by different RSUs (e.g., to avoid the low capability UE from acting as a bottleneck in model training via FL for the high capability UE). Additionally or alternatively, in other examples, the base station may apply other criteria in its selection of cluster leaders and cluster members based on the FL information in messages 1714.

Following this aggregation and selection, the base station 1704 may provide a message 1716 respectively to selected RSU(s) via unicast indicating their respective cluster information. The cluster information provided to a respective RSU may include, for example, the identifiers of the UEs which will be grouped into a cluster for FL that is led by that RSU. For instance, in the illustrated example of FIG. 17, the base station 1704 may inform RSU 1 of its status as the cluster leader or model update aggregator of a cluster including UE 1 and UE 2. For example, the base station 1704 may provide to RSU 1 the identifiers of UE 1 and UE 2. If the base station does not select a particular RSU as a cluster leader or aggregator, the base station may not provide such message or cluster information to that RSU. For instance, in the illustrated example of FIG. 17, the base station may not select RSU 2 as a cluster leader, and thus the base station may not provide message 1716 to RSU 2.

Upon obtaining respective cluster information in message(s) 1716 from the base station 1704, the RSU(s) 1706 which received such information may respectively provide a message 1718 to the UEs 1702 indicated in their respective cluster information. An RSU may provide its respective message 1718 via groupcast to those UEs 1702 having identifiers assigned or indicated in the cluster information of message 1716. The message 1718 may inform these UEs 1702 of their status as participant or follower nodes for FL in a cluster led by that RSU, and may instruct those UEs to provide ML model weight updates to that RSU for training and optimization during clustered FL. For instance, in the illustrated example of FIG. 17, RSU 1 may provide message 1718 via groupcast to UE 1 and UE 2 indicating those UEs are cluster members of a cluster led by RSU 1.

Figure 18:
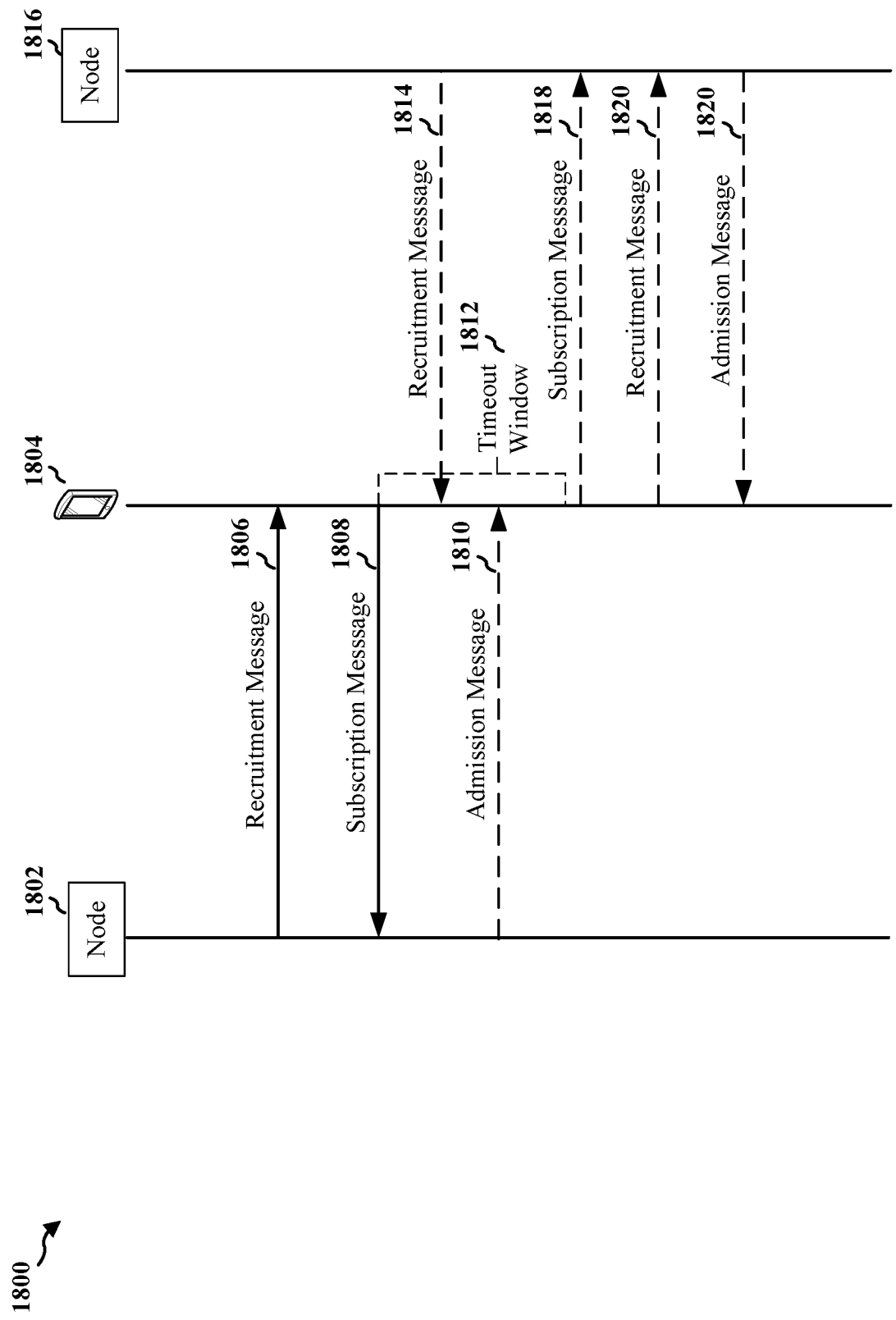
FIG. 18 is a diagram illustrating an example of a signaling procedure for simultaneous discovery and cluster formation.

FIG. 18 illustrates an example 1800 of a signaling procedure which allows a first node 1802 (e.g. a RSU) to form a cluster (as cluster leader in a clustered FL architecture) with a second node 1804 (e.g., a UE), e.g., in sidelink communications. This procedure may replace the individual signaling procedures for neighbor discovery or cluster formation described with respect to FIGS. 14-17, by allowing a first node 1802 (e.g. a UE) to simultaneously discover and form a cluster (as cluster leader in a clustered FL architecture) with a second node 1804 (e.g., another UE) via sidelink communications. In this procedure, network nodes (e.g., UEs or RSUs) may nominate themselves as cluster leaders (e.g., in response to a nomination trigger discussed below), rather than be elected or selected as cluster leaders by other network nodes (e.g., UEs or a base station). Moreover, a network node intending to serve as a leader (e.g., in response to the nomination trigger) may form a cluster with other network nodes by sending a message to recruit these other nodes to its cluster. This recruitment message may indicate that the network node intends to operate as a cluster leader and FL coordinator as well as indicate ML training-related information of the network node. Examples of nomination triggers may be the same as the examples of candidacy triggers described with respect to FIG. 16. For example, a node may nominate itself as a leader if the node fails to receive a recruitment message (e.g., message 1806 below) from another node within a pre-configured timeout period, if the node determines that ML model information collected from the other node(s) is insufficient to trigger a subscription (e.g., message 1808 below) to its cluster from the node, or if the node determines that its loss function indicates a low quality ML model.

Nodes which receive this recruitment message, and potentially other recruitment messages from other self-nominated leaders, may determine whether or not to subscribe to any of the indicated clusters led by the respective senders based on the indicated ML training-related information in the respective messages. If a network node determines to subscribe to a cluster of one of these sending nodes, the network node may send back a message requesting to subscribe to this cluster and further indicating ML-related training information of this node; otherwise, the network node may ignore the recruitment message. The recruiting node upon receipt of the subscription message may determine whether or not to admit the subscribing node to its cluster similarly based on the indicated ML-related training information of the subscribing node. If an admission decision is made, the recruiting node may send an acknowledgment of cluster admission to the subscribing node. Otherwise, the recruiting node may ignore the subscription message, and the subscribing node may search to join or lead a different cluster after a specified period of time.

Initially, the first node 1802 transmits a message 1806 indicating the first node 1802 is interested in recruiting other nodes to form or join a cluster led by the first node. The message 1806 may be provided periodically (e.g., according to a pre-configured periodicity), for example, if the first node is not currently participating in an active clustered FL session. Alternatively, the message 1806 may be event-triggered, for example, in response to the first node 1802 determining to train or update a ML model to improve performance of a certain ML task. The first node 1802 may broadcast the message 1806 to any network node which is capable of decoding the message. Alternatively, the message 1806 may be groupcast, for example, to network nodes of which the first node 1802 is aware. The message 1806 may also be sent using groupcast option 1 to enhance reliability of the recruitment message (e.g., the first node 1802 may indicate in second stage SCI a distance within which the first node expects to receive NACKs from other nodes who fail to decode the message).

Moreover, the message 1806 may indicate model training-related information of the first node 1802. This information may include, for example, ML tasks that the first node 1802 is participating in or is interested in participating in, available sensors at the first node 1802 and their associated data input format, available ML models in training including model status, model architectures, model training parameters, and current performance (e.g., accuracy and loss), and available computation resources (e.g., whether the first node 1802 includes a CPU or GPU, information about its clock speed, available memory, etc.). Thus, the message 1806 may include similar types of information as those provided in the message 1414 of FIG. 14 or the ND message 1506 of FIG. 15.

In the example of FIG. 18, second node 1804 may receive the message 1806 from the first node 1802 if the nodes are within proximity of each other. The second node 1804 may potentially receive other such messages from other network nodes requesting to recruit the second node 1804 to a cluster led by that respective node. Thus, the second node 1804 may receive recruitment messages from multiple candidates for cluster leadership. In response to receiving the recruitment message(s), the second node may determine whether to subscribe to a cluster of one of these candidates, based at least in part on the model training-related information indicated in the respective messages. This determination may be based on similar factors as those described with respect to FIG. 15 for neighbor lists (e.g., whether the candidate node and the second node have similar ML models, computational resources, etc.).

In this example, the second node 1804 determines to form or join a cluster led by the first node 1802, and so the second node may provide a message 1808 to the first node 1802 (e.g., via unicast) requesting to subscribe to or join with its cluster. This message 1808 may also indicate model training-related information of the second node 1804. This information may include, for example, ML tasks that the second node 1804 is participating in or is interested in participating in, available sensors at the second node and their associated data input format, available ML models in training including model status, model architectures, model training parameters, and current performance (e.g., accuracy and loss), and available computation resources (e.g., whether the second node includes a CPU or GPU, information about its clock speed, available memory, etc.). Thus, the message 1808 may include the same type of information as message 1806, but for the second node 1804 rather than the first node 1802.

In response to receiving the message 1808, the first node 1802 may determine whether or not to admit the second node 1804 to its cluster similarly based at least in part on the model training-related information indicated in the message 1808. For example, the first node 1802 may determine not to add the second node 1804 to its cluster if this information indicates the second node has a dissimilar ML model or a lower computation capability than that of the first node. In such case, the first node 1802 may disregard or ignore (and thus not respond to) message 1808. Alternatively, the first node 1802 may determine to add the second node 1804 to its cluster if the information indicates, for example, that the nodes have a same or similar ML model or a same or similar computation capability. In such case, the first node 1802 may provide (e.g., via unicast) a message 1810 acknowledging admission of the second node 1804 to the cluster led by the first node 1802.

On the other hand, if the first node 1802 determines not to admit the second node 1804 to its cluster, the second node may fail to receive message 1810 within a timeout window 1812 starting from the time that message 1808 was provided (due to the first node 1802 disregarding or ignoring message 1808). In such case, the second node 1804 may subscribe to the cluster of another network node from which the second node previously received a recruitment request. For instance, in the illustrated example of FIG. 18, the second node 1804 may have previously received a message 1814 from a third node 1816 requesting to recruit other nodes to its cluster (similar to message 1806), and based at least in part on model training-related information of the third node 1816 indicated in the message 1814, the second node 1804 may transmit a message 1814 requesting to subscribe to or join the cluster led by the third node 1816 upon expiration of the timeout window 1812. In response to receiving the message 1818, the third node 1816 may similarly determine whether to admit the second node 1804 to its cluster based at least in part on the model training-related information indicated in the message 1818, in which case the third node 1816 may provide (e.g., via unicast) a message 1820 acknowledging admission of the second node 1804 to the cluster led by the third node 1816. Alternatively, rather than subscribing to the cluster of another network node, the second node 1804 may transmit a message 1820 requesting to recruit other nodes to a cluster led by the second node 1804 (similar to message 1806, 1814). For example, the second node 1804 may determine to nominate itself as a cluster leader and broadcast or groupcast the message 1820 to third node 1816 upon expiration of the timeout window 1812. In response to receiving the message 1820, the third node 1816 may determine whether or not to subscribe to the cluster led by the second node 1804 based on the model training-related information of the second node indicated in message 1820.

Figure 19:
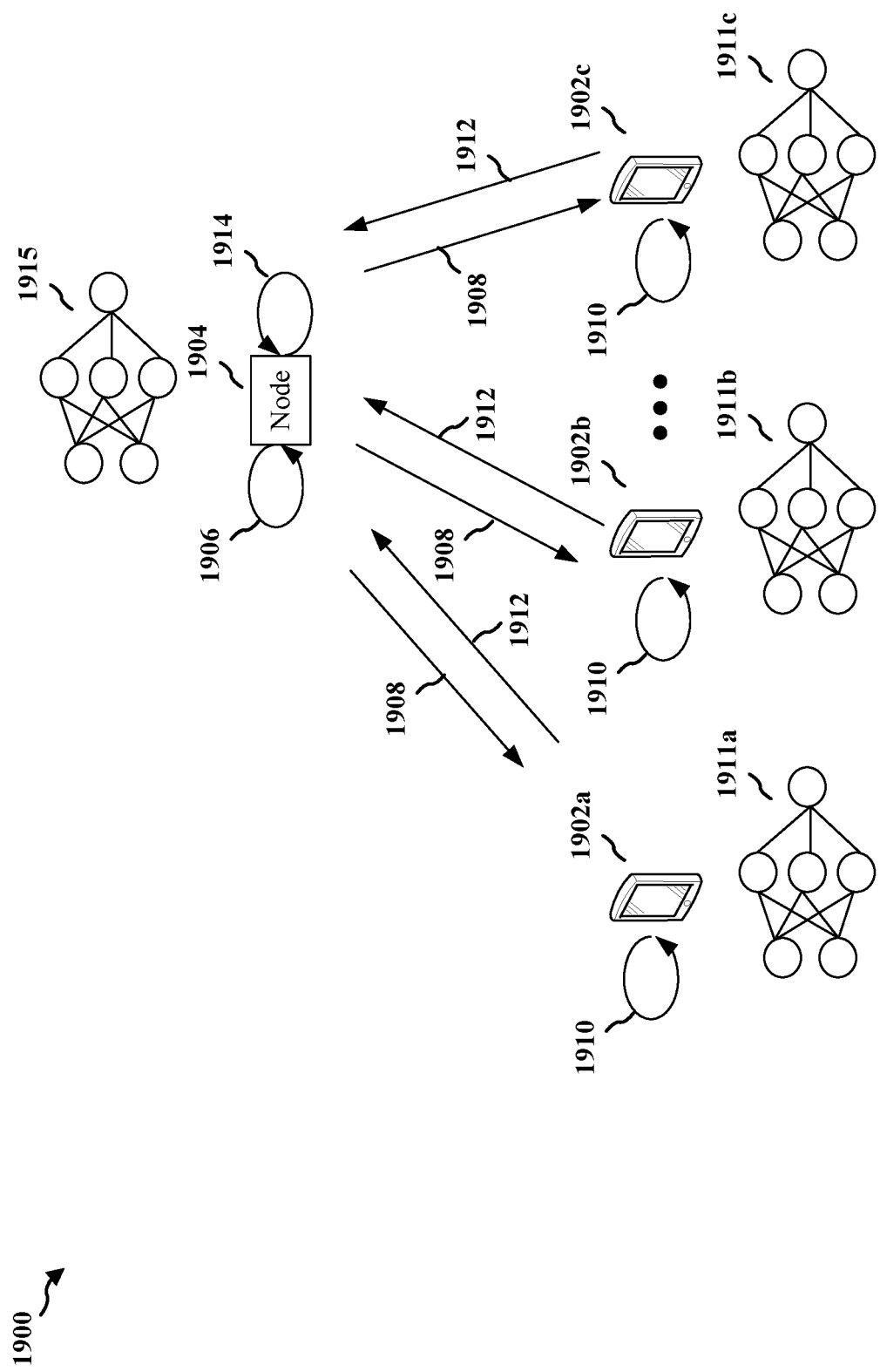
FIG. 19 is a diagram illustrating an example of a signaling procedure for intra-cluster FL or peer-to-peer FL following election or nomination of a leader node.

FIG. 19 illustrates an example 1900 of a signaling procedure in which participant nodes 1902 (participant nodes 1902a, 1902b, 1902c) may perform intra-cluster FL or peer-to-peer FL following election, selection, or nomination of a leader node 1904 (e.g., a cluster leader or a peer leader) such as described with respect to FIGS. 16-18. The participant nodes 1902 (e.g., UEs) may be, for example, neighboring follower or candidate nodes in a cluster Ci or a peer-to-peer network. The leader node 1904 (e.g., a UE, a RSU, edge server, a local FL server, or other network node) may be for example, an elected, selected, or self-nominated leader of the cluster Ci or an elected leader of the peer-to-peer network. In one example, leader nodes 1904 may serve as aggregators without themselves participating in learning or model training, while in other examples, leader nodes 1904 may themselves participate in model training in addition to serving as aggregators. While the example of FIG. 19 illustrates three UEs in communication with leader node 1904, it should be understood that the cluster or peer-to-peer network is not limited to such quantity of UEs and may have a different quantity of UEs in other examples.

Initially, at operation 1906, the leader node 1904 may initialize a ML model (e.g., a cluster model $W_0^{Ci}$ for clustered FL, or a global model $W_0^G$ for peer-to-peer FL). The initialization may include, for example, configuring a ML task (e.g., object detection), a neural network (e.g., a CNN), a quantity of neurons and synapses, random weights and biases, a model algorithm (e.g., logistic regression), and other model parameters. Following initialization, at operation 1908, the leader node 1904 may broadcast or groupcast these ML model parameters to the network nodes 1902 for download.

Upon receiving the ML model parameters from the leader node 1904 and configuring their local ML models accordingly, at operation 1910, the participant nodes 1902 (e.g., k cluster members or peer nodes) and potentially the leader node 1904 may perform local ML model training based on their respective datasets. For instance, during a given FL iteration t, a respective node k (corresponding to cluster model $W_t^{Cik}$ or global model $W_t^k$ depending on the FL architecture) may train a local ML model 1911 (model 1911a, 1911b, 1911c) to identify the optimal model parameters for minimizing a loss function F ($W_t^{Cik}$) or $F_k$ ($W_t^k$), such as described with respect to FIG. 6. For example, the node may utilize backpropagation and stochastic gradient descent to identify the optimum model weights to be applied to its respective neural network which result in a minimized cross-entropy loss following multiple training sessions. Afterwards, at operation 1912, the participant nodes 1902 may upload their respectively updated ML model parameters to the leader node 1904. To reduce transmission traffic, these parameters may include, for example, modified weights, weights that changed more than a threshold, or multiplicative or additive delta amounts or percentages for those weights. For example, the participant nodes 1902 may transmit the optimized ML model weights and other information to the leader node 1904. Following receipt of these ML model information updates from the participant nodes 1902, at operation 1914, the leader node 1904 may aggregate the updates to generate an updated ML model 1915 for the nodes (e.g., an updated cluster model $W_{t+1}^{Ci}$ or global model $W_{t+1}^G$ to be applied for the next FL iteration t+1). For example, the leader node 1904 may average or perform some other calculation on the respective model weights indicated by the participant nodes 1902, including potentially the respective model weights of the leader node 1904.

After generating the aggregated ML model information, the leader node 1904 may determine that a loss function associated with the updated ML model is no longer minimized. For example, the aggregated ML model weights may potentially result in increased loss compared to the previous ML model weights for individual nodes. As a result, the leader node may send the aggregated ML model information to the participant nodes 1902, which may be the same nodes as before or may include additional or less nodes, to utilize for further local ML model training. For instance, after configuring their local ML models with the updated weights, during this next FL iteration t+1, the participant nodes 1902 (and potentially the leader node 1904) may again perform local ML model training to arrive at an optimum set of ML model weights for their individual models, and the participant nodes 1902 may similarly send their updated ML models to the leader node 1904 for further aggregation. This process may repeat until a minimization of a loss function associated with the aggregated ML model (e.g., the cluster loss function $F(W_t^{Ci})$ for cluster Ci or the global loss function $F_G$ ($W_t^G$) for the peer-to-peer network) is achieved. Alternatively, this process may repeat until a predetermined quantity of FL iterations in the cluster or peer-to-peer network has occurred (e.g., a quantity based on the computational capabilities or other ML model information of the participant nodes 1902), or a timeout of the leader node 1904 with respect to its status as a leader has occurred (e.g., if the leader is elected).

Figure 20:
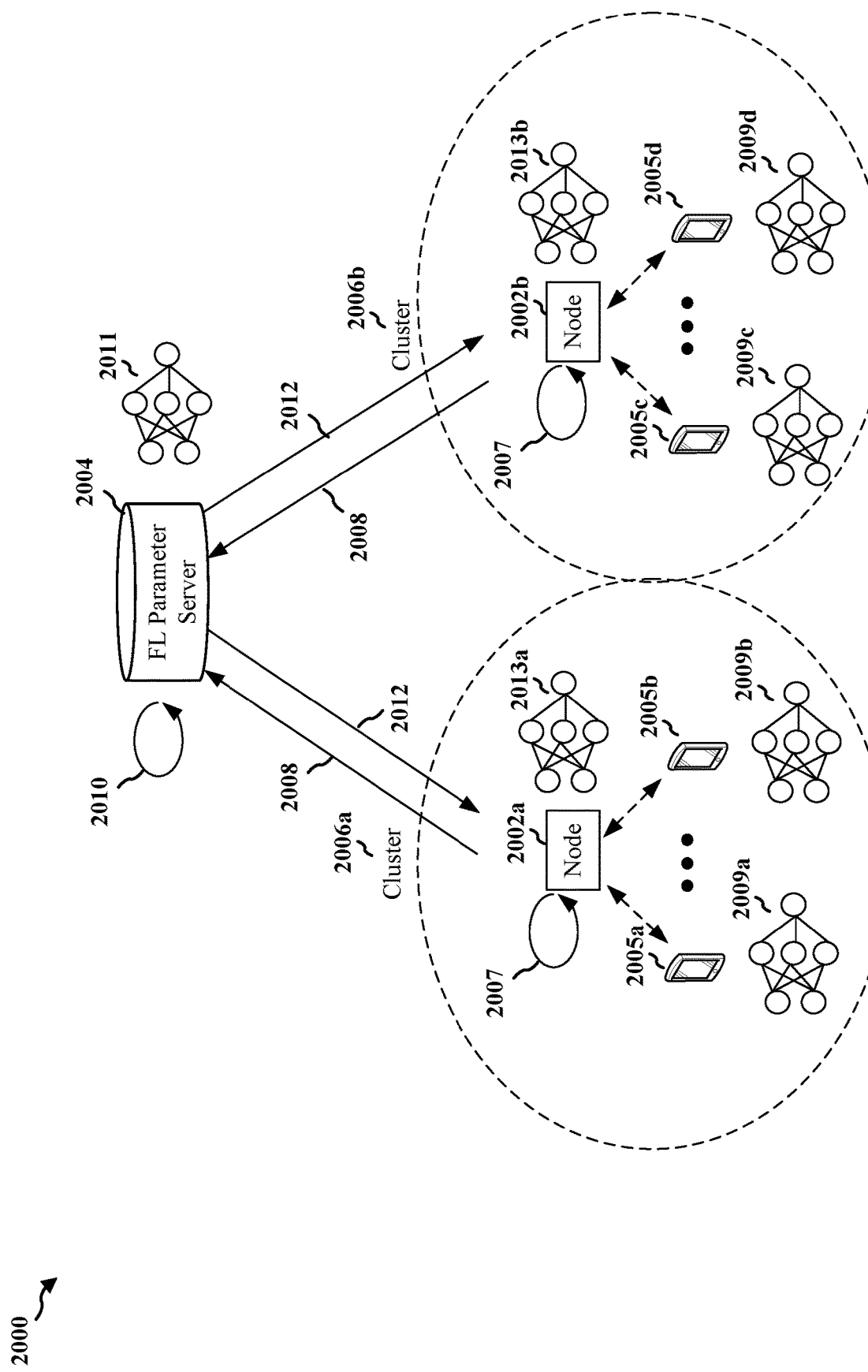
FIG. 20 is a diagram illustrating an example of a signaling procedure for inter-cluster FL following one or more iterations of intra-cluster FL.

FIG. 20 illustrates an example 2000 of a signaling procedure in which leader nodes 2002 (nodes 2002a, 2002b) may communicate with an FL parameter server 2004 to perform inter-cluster FL following one or more FL iterations of intra-cluster model training with participant nodes 2005 (nodes 2005a, 2005b, 2005c, 2005d) as described with respect to FIG. 19. The leader nodes 2002 (e.g., UEs, RSUs, or edge servers) may be for example, elected, selected or self-nominated leaders of respective clusters 2006 (clusters 2006a, 2006b). The FL parameter server 2004 may be, for example, a base station, an RSU, an edge server, or other network entity which coordinates FL between the respective clusters 2006. In one example, leader nodes 2002 may serve as aggregators without themselves participating in learning or model training, while in other examples, leader nodes 2002 may themselves participate in model training in addition to serving as aggregators. While the example of FIG. 20 illustrates two UEs in communication with leader nodes 2002 in respective clusters 2006, it should be understood that the clusters 2006 are not limited to such quantities of UEs and may have different quantities of UEs in other examples.

At given instances of time following intra-cluster FL training, the leader nodes 2002 may communicate locally updated ML model information (intra-cluster) to the FL parameter server 2004 for inter-cluster FL training. For example, the FL parameter server 2004 may periodically or aperiodically send requests to cluster leaders to communicate their model updates for inter-cluster FL training. Alternatively, the leader nodes 2002 themselves may communicate their model updates for inter-cluster FL training in response to an event trigger, such as a minimization of a local loss function in a respective cluster or an occurrence of a certain quantity of intra-cluster FL iterations. The FL parameter server 2004 may aggregate this information received from the respective cluster leaders to generate global (multi-cluster) ML model updates, after which the FL parameter server may provide this globally updated ML model information to the respective leader nodes. These leader nodes may in turn provide the globally updated ML model information to their respective participant nodes for further refinement of local ML models through additional intra-cluster FL training. The intra-cluster and inter-cluster FL training may or may not be synchronized; for example, different clusters may perform intra-cluster FL training or inter-cluster FL training over a same quantity or different quantities of iterations before ceasing to perform FL training. For instance, the leader nodes 2002 of respective clusters may stop communicating local model updates (in intra-cluster training) or global model updates (in inter-cluster training) to participating nodes or the FL parameter server simultaneously or at different times.

Initially, at operation 2008, the leader node 2002 of a respective cluster may send its updated ML model $W_t^{Ci}$ for its cluster Ci, which includes one or more previous aggregations 2007 of ML model updates of local models 2009 (models 2009a, 2009b, 2009c, 2009d) from follower nodes, to the FL parameter server 2004. To reduce transmission traffic, these updates may include, for example, modified weights, weights that changed more than a threshold, or multiplicative or additive delta amounts or percentages for those weights. For instance, the leader node 2002 may send the aggregated ML model weights that it most recently generated after a given quantity of intra-cluster FL iterations, for further aggregation with other aggregated ML model weights generated by other leader nodes in other clusters. The leader node 2002 may be triggered to send the updated ML model for this inter-cluster FL training, for example, in response to receiving a request from the FL parameter server 2004, achieving a minimization of a loss function associated with the updated ML model (e.g., the cluster loss function F(W t cl) for cluster), an occurrence of a predetermined quantity of FL iterations in the cluster, or a timeout of the leader node 2002 with respect to its status as a leader. Similarly, the leader nodes 2002 of other respective clusters may send their updated ML models (e.g., aggregated ML model weights) respectively for their own clusters to the FL parameter server 2004 for inter-cluster FL training in response to similar events.

After receiving the updated ML models from the cluster leaders, at operation 2010, the FL parameter server 2004 may aggregate the updates to generate an updated global ML model 2011 for the leader nodes (e.g., an updated global model $W_{t+1}{}^G$). For example, the FL parameter server 2004 may average or perform some other calculation on the respective, aggregated model weights indicated by the leader nodes 2002. After generating the aggregated ML model information, the FL parameter server 2004 may determine that a global loss function associated with the updated ML model is no longer minimized. For example, the aggregated ML model weights across clusters may potentially result in increased loss compared to the previous updated ML model weights for individual cluster leaders. As a result, at operation 2012, the FL parameter server may send the aggregated ML model information to the leader nodes 2002 to utilize for further training of respective intra-cluster ML models 2013 (models 2013a, 2013b, beginning from the updated model $W_{t+1}{}^G$) such as described with respect to FIG. 19. Following this intra-cluster FL training, the leader nodes 2002 may again send their updated or aggregated ML model information to the FL parameter server 2004 for further inter-cluster FL training, and this process may repeat until a minimization of the global loss function associated with the aggregated ML model across clusters (e.g., the global loss function $F_G(W_t{}^G)$) is achieved. Alternatively, this process may repeat until a predetermined quantity of inter-cluster FL iterations has occurred, or a timeout of the FL parameter server 2004 has occurred (e.g., if the leader is elected).

Figure 21:
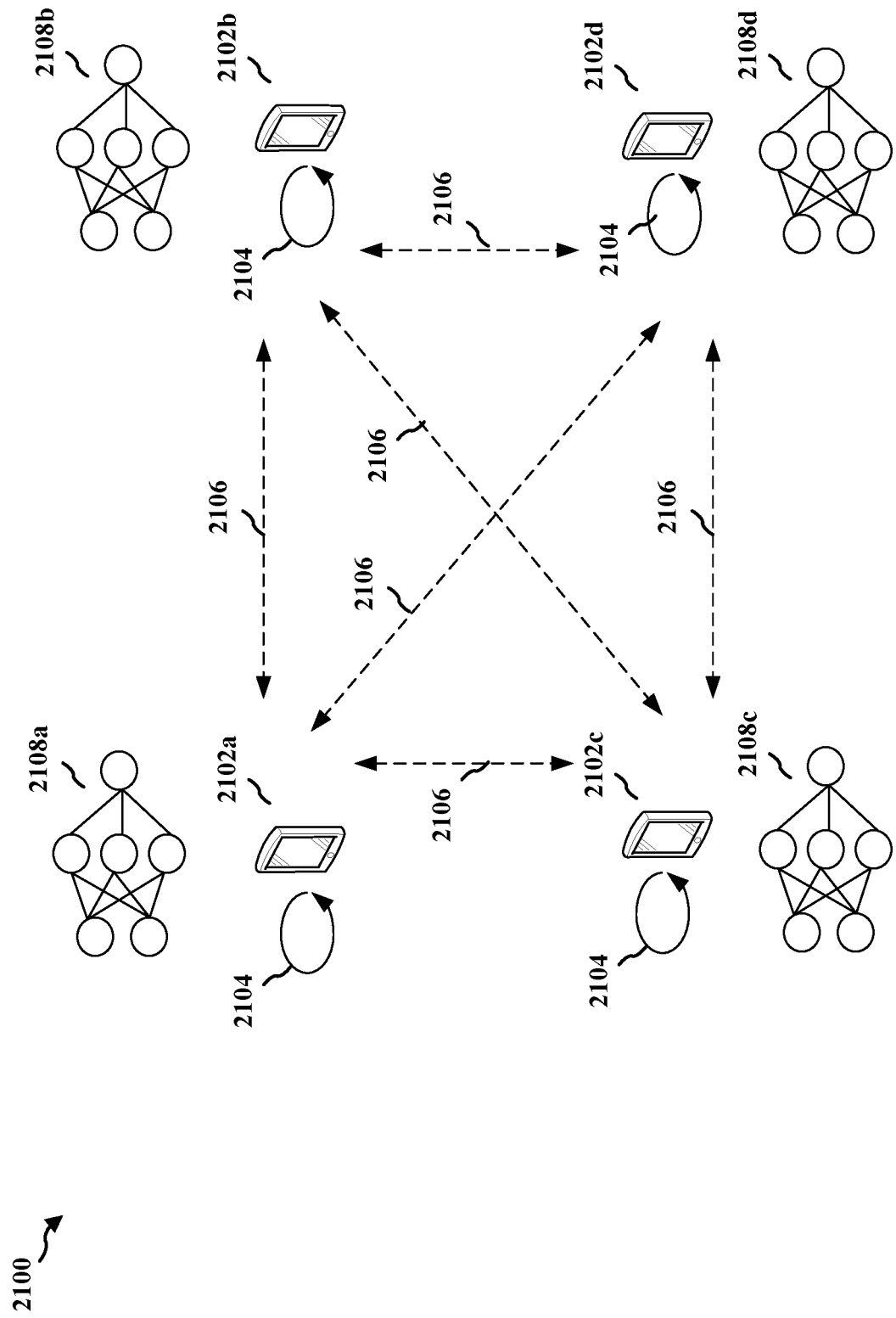
FIG. 21 is a diagram illustrating an example of a signaling procedure for synchronous peer-to-peer FL without nomination or election of a leader node.

FIG. 21 illustrates an example 2100 of a signaling procedure in which peer nodes 2102 (nodes 2102a, 2102b, 2102c, 2102d) may perform peer-to-peer FL in a synchronized manner without nomination or election of a leader node. The peer nodes 2102 (e.g., UEs) may be, for example, neighboring follower nodes in a peer-to-peer network. Unlike the example of FIG. 19 where participant nodes periodically send model updates to a leader or FL parameter server for aggregation, in this example, the peer nodes 2102 may respectively serve as their own aggregator of ML model updates received from other peer nodes. While this approach may result in peer nodes 2102 performing more computations and experiencing more communication overhead than those in the leader-based approach of FIG. 19, this approach may minimize or avoid aggregation bottlenecks that could otherwise arise in the event of a failure at the leader or FL parameter server (since the peer nodes themselves serve as aggregators). Moreover, this signaling procedure may occur following neighbor discovery such as described with respect to FIGS. 14 and 15, without peer nodes forming clusters or electing leaders as described with respect to FIGS. 16-18. As a result, the peer-to-peer network of FIG. 21 may include peer nodes 2102 that communicate with other peer nodes in their respective neighbor lists, effectively within a single group or cluster. While the example of FIG. 21 illustrates four UEs in the peer-to-peer network, it should be understood that the peer-to-peer network is not limited to such quantity of UEs and may have a different quantity of UEs in other examples.

Initially, at operation 2104, the peer nodes 2102 may initialize and train their own ML models in parallel using their respective datasets. For instance, a peer node may initialize a ML model, which initialization may include, for example, configuring a ML task (e.g., object detection), a neural network (e.g., a CNN), a quantity of neurons and synapses, random weights and biases, a model algorithm (e.g., logistic regression), and other model parameters. Following initialization, the peer nodes 2102 may perform individual ML model training based on their respective datasets. For instance, a respective node may train its ML model using observed data to identify the optimal model parameters for minimizing a loss function, such as described with respect to FIG. 6. For example, the node may utilize backpropagation and stochastic gradient descent to identify the optimum model weights to be applied to its respective neural network which result in a minimized cross-entropy loss following multiple training sessions or iterations. The training performed by a peer node may continue to occur until a minimization of a loss function associated with the respective ML model is achieved, or until a predetermined quantity of iterations or training sessions has occurred for that peer node.

After the peer nodes 2102 complete or stop their model training, the peer nodes may broadcast their updated ML model information to other peer nodes in their peer-to-peer network (e.g., the nodes in the neighbor lists of respective nodes). To reduce transmission traffic, this information may include, for example, modified weights, weights that changed more than a threshold, or multiplicative or additive delta amounts or percentages for those weights. These broadcasts may be scheduled so that a synchronized model update exchange 2106 may occur between each of the peer nodes 2102. Following this synchronized model update exchange 2106, the peer nodes 2102 may have the updated ML model information (e.g., updated model weights) of other peer nodes as well as their own updated ML model information.

Then, the peer nodes 2102 may respectively aggregate their updates to generate an updated global ML model 2108 (model 2108a, 2108b, 2108c, 2108d) common between the peer nodes. For example, the peer nodes 2102 may average or perform some other common calculation on the model weights that the respective peer node previously obtained during the synchronized model update exchange 2106 including their own updated ML model information. As a result, the aggregated ML model information generated by the peer nodes may be identical. After the peer nodes 2102 generate the aggregated ML model information, the peer nodes may determine that a loss function associated with the updated ML model is no longer minimized, or that a predetermined quantity of FL iterations has not yet occurred. As a result, the peer nodes 2102 may repeat the aforementioned process of performing individual ML training based on their respective datasets, performing a scheduled, synchronized model update exchange, and aggregating the obtained ML model updates from other peer nodes, in a subsequent FL iteration.

Peer nodes may continue to repeat the aforementioned process in multiple FL iterations until a minimization of the loss function associated with the aggregated ML model is finally achieved, an individual target performance metric is met, or a predetermined quantity of FL iterations has occurred. For example, if a peer node determines after one or more FL iterations that a classification accuracy of 75% or more has been achieved, or if the peer node determines that it performed a certain quantity of FL iterations, the peer node may stop performing model training, update exchanges, or aggregation notwithstanding the status of other peer nodes. Thus, other peer nodes seeking a different target performance or a different quantity of FL iterations may continue to perform the aforementioned process until their respective condition(s) are met.

Figure 22:
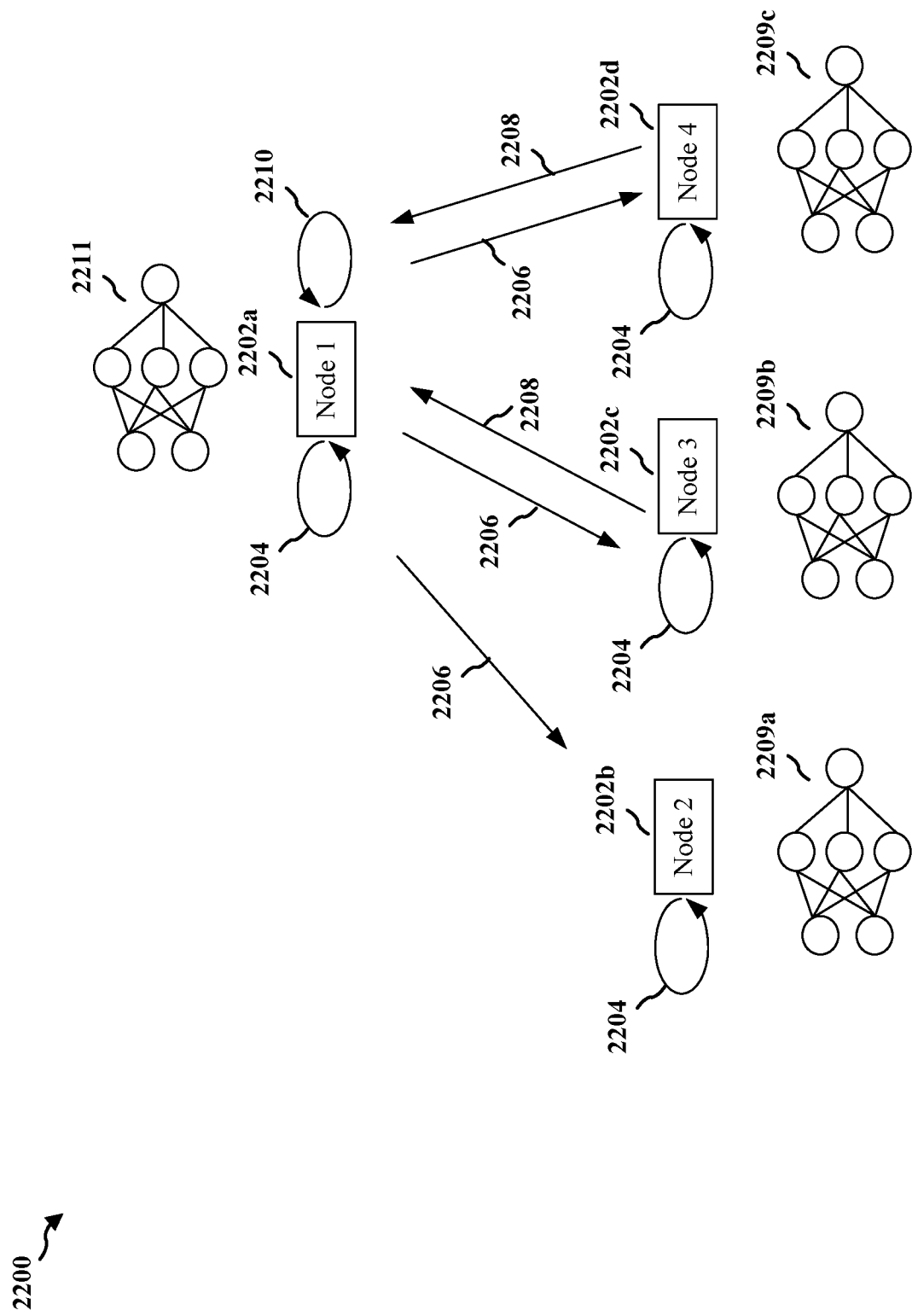
FIG. 22 is a diagram illustrating an example of a signaling procedure for asynchronous peer-to-peer FL without nomination or election of a leader node.

FIG. 22 illustrates an example 2200 of a signaling procedure in which peer nodes 2202 (nodes 2202a, 2202, 2202c, 2202d) may perform peer-to-peer FL in an asynchronized manner without nomination or election of a leader node. The peer nodes 2202 (e.g., UEs) may be, for example, neighboring follower nodes in a peer-to-peer network. Unlike the example of FIG. 19 where participant nodes periodically send model updates to a leader or FL parameter server for aggregation, in this example, the peer nodes 2202 may serve as their own aggregators of ML model updates received from other peer nodes. While the example of FIG. 22 illustrates four peer nodes in the peer-to-peer network, it should be understood that the peer-to-peer network is not limited to such quantity of peer nodes and may have a different quantity of peer nodes in other examples.

Moreover, unlike the example of FIG. 21 where the peer nodes synchronously exchanges model updates with other peer nodes, here the aggregation of model updates by one node is asynchronous with respect to the other nodes. For example, in this procedure, one peer node (e.g., a random node) at a time may request for model updates of other peer nodes and aggregate the model updates to generate an individual updated ML model, rather than multiple peer nodes at the same time. Furthermore, in this example, the requesting peer node may receive model updates having performance metrics specifically meeting a threshold performance level, unlike the example of FIG. 21 where the peer nodes receive model updates from other peer nodes in their neighbor lists notwithstanding model performance. For example, a requesting node may receive model updates specifically from peer nodes having models associated with a classification accuracy above 75% or other threshold, or models associated with some other relatively good performance or evaluation metric. Thus, the requesting peer node may not necessarily receive updates from every peer node in its neighbor list, and the aggregation of model updates may more quickly result in more accurate models compared to the approach of FIG. 21.

Initially, at operation 2204, the peer nodes 2202 may initialize and train their own ML models in parallel using their respective datasets. For instance, peer nodes may initialize their respective ML models, which initialization may include, for example, configuring a ML task (e.g., object detection), a neural network (e.g., a CNN), a quantity of neurons and synapses, random weights and biases, a model algorithm (e.g., logistic regression), and other model parameters. Following initialization, the peer nodes 2202 may perform individual ML model training based on their respective datasets. For instance, a respective node may train its ML model using observed data to identify the optimal model parameters for minimizing a loss function, such as described with respect to FIG. 6. The training performed by a peer mode may continue to occur until a minimization of a loss function associated with the respective ML model is achieved, or until a predetermined quantity of iterations or training sessions has occurred for that peer node.

Moreover, while training their respective ML models, the peer nodes 2202 may track a performance metric of their individual ML models. For example, the peer nodes may respectively determine a classification accuracy of their individual models after a predetermined quantity of training sessions has occurred. Alternatively, the peer nodes may determine a logarithmic loss, confusion matrix, or other evaluation metric which indicates the current performance of their respective ML model.

After the peer nodes 2202 complete or stop their model training, at operation 2206, one of the peer nodes 2202 (node 2202a or N1 in the illustrated example) sends a request to the other peer nodes for their ML model updates of ML models 2209 (respective ML models 2209a, 2209b, 2209c) during an FL iteration. For example, the peer node sending the request may be a random peer node chosen among the peer nodes 2202 in the network. Peer nodes that receive the request may determine whether to provide their respective ML model update based on their respective performance or evaluation metrics. For instance, if a peer node determines that its performance metric meets a pre-configured threshold (e.g., a classification accuracy of 75% or more), then at operation 2208, the peer node may provide its updated ML model information to the requesting node. To reduce transmission traffic, this information may include, for example, modified weights, weights that changed more than a threshold, or multiplicative or additive delta amounts or percentages for those weights. Peer nodes having performance metrics that fall below the pre-configured threshold may in contrast refrain from providing their updated ML model information to the requesting node, or otherwise ignore the request. Thus, in the illustrated example of FIG. 22, N3 (node 2202c) and N4 (node 2202d) have high performance metrics and thus respond with their model updates to N1's (node 2202a's) request, but N2 (node 2202b) has a low performance metric and thus does not respond to the request.

In response to receiving updated ML model information from one or more of the peer nodes 2202 having performance metric(s) meeting the threshold, at operation 2210, the requesting peer node (N1 in this example) may aggregate the updates to generate an updated ML model 2211. For example, the requesting peer node may average or perform some other calculation on the model weights that were obtained from the other peer nodes in response to its request. After the requesting peer node obtains the aggregated ML model, the node may determine that a loss function associated with the aggregated ML model is no longer minimized, or that a predetermined quantity of FL iterations has not yet occurred. As a result, the requesting node may continue to perform individual ML training based on its respective dataset until the node is triggered to perform another request in a subsequent FL iteration (e.g., in response to a random selection or other event). Alternatively, if the loss function is minimized or the quantity of FL iterations for that node has occurred, the requesting node may terminate the model training process.

In the meanwhile, after responding to the requesting node (and notwithstanding its subsequent actions), another one of the peer nodes 2202 (node 2202b or N2 in the illustrated example) may send a request to the other peer nodes (including node 2202a or N1) for their respective ML model updates during a subsequent FL iteration. For example, the new peer node sending the request may be another random peer node chosen among the peer nodes 2202 in the network. The peer nodes 2202 that receive the request may similarly provide their model updates depending on their respective performance metrics to the requesting node for ML model aggregation, and the requesting node may similarly continue ML training or terminate ML training based on the loss function, FL iteration quantity, or other factor. This process may similarly repeat for other peer nodes, where peer nodes may individually send requests for model updates at different times while other peer nodes continue to monitor their model performance metrics or quantity of FL iterations.

Figure 23:
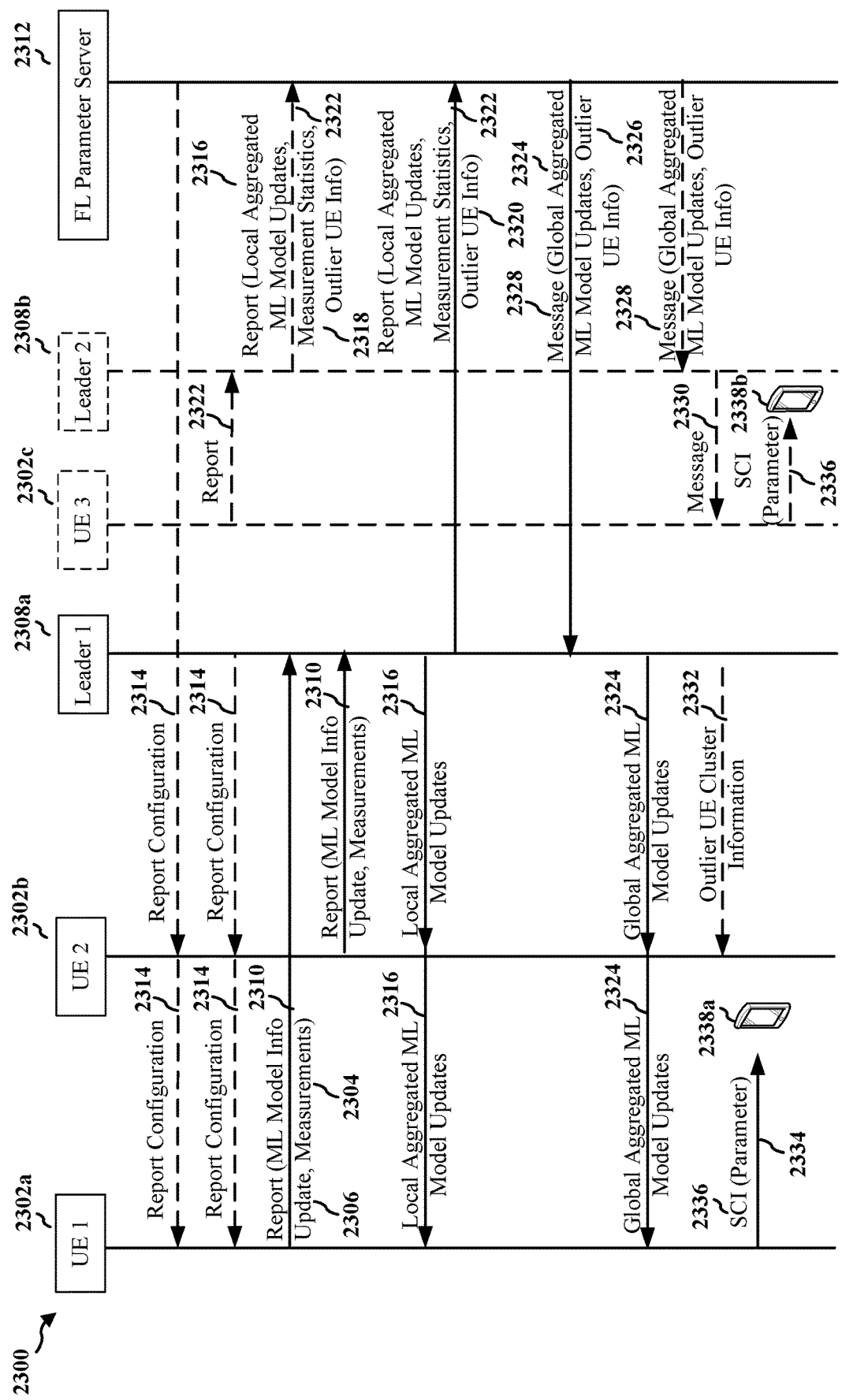
FIG. 23 is a diagram illustrating an example of a signaling procedure for sidelink parameter coordination in response to clustered or peer-to-peer FL.

FIG. 23 illustrates an example 2300 of a signaling procedure in which a UE 2302 (UE 2302a, 2302b, 2302c) may optimize sidelink communication parameters in response to clustered or peer-to-peer FL. UE 2302 may correspond to device 410, 450, UE 104, 702, 1104, 1202, 1302, 1702 or node 1402, 1404, 1502, 1504, 1514, 1622, 1626, 1802, 1804, 1816, 1902, 2005, 2102, 2202, and UE 2302 may be configured to perform the aforementioned functions of its corresponding UEs or nodes as described with respect to FIGS. 1, 7, and 11-22. UEs may be in one or more clusters, such as cluster 1102, 1304, 2006, or in a peer-to-peer network such as illustrated in FIGS. 12, 19, 21 and 22.

Initially, the UE 2302 collects measurements 2304 from its environment (e.g., a CBR, a quantity of received packets at the UE, a quantity of resource reservations by other UEs, or other metrics observed instantaneously or over a configured period of time). The UE 2302 may store these observations in a local dataset and map this dataset to a ML model or policy for selecting sidelink communication parameters. For example, in mode 2 resource allocation, the UE 2302 may train a neural network (e.g., neural network 600 of FIG. 6) using reinforcement learning (or other ML task) and backpropagation to obtain updated ML model information 2306 (e.g., updated weights 616 and gradients with respect to those weights). These updates allow the model to output an optimal communication range for groupcast option 1 which is associated with a maximum reward (e.g., maximum throughput, minimal latency, or other metric) based on the measurements 2304 input to the model in the case of reinforcement learning, or a minimal loss function in the case of other ML tasks such as object detection or classification. Updated ML model information 2306 may correspond, for example, to modified weights or gradients from updated local model 1112, local ML model 1911, local ML model 2009, updated global ML model 2108, and updated ML model 2209 described with respect to FIGS. 11 and 19-22.

After training its local ML model, the UE 2302 provides to a leader node 2308 (leader node 2308a, 2308b, e.g., a cluster leader in clustered FL or a leader in a peer-to-peer FL) a report 2310 including the updated ML model information 2306 and measurements 2304. For example, the UE 2302 may measure a distribution of CBRs observed over a time window, calculate an average or maximum CBR from the distribution of CBRs, and report the average or maximum CBR along with the updated model weights, gradients, or other ML model information. Leader node 2308 may correspond to device 410, 450, UE 104, RSU 107, 1706, cluster leader 1108, 1306, leader 1204, or node 1622, 1802, 1904, 2002, and leader node 2308 may be configured to perform the aforementioned functions of its corresponding leader nodes as described with respect to FIGS. 1, 7, and 11-22. Leader nodes 2308 may also be in one or more clusters, such as cluster 1102, 1304, 2006, or in a peer-to-peer network such as illustrated in FIGS. 12 and 19.

The UE 2302 may obtain measurements 2304, train ML models to obtain updated ML model information 2306, and provide reports 2310 including these measurements and updated ML model information, periodically, semi-persistently, or aperiodically. Reports 2310 may correspond to messages passed at operations 1912, 2208 or synchronized model update exchange 2106 as described with respect to FIGS. 19-22. In one example, the UE 2302 may transmit reports 2310 to the leader node 2308 with a periodicity configured by the leader node 2308 or configured by a FL parameter server 2312. FL parameter server 2312 may correspond to device 410, 450, base station 102/180, 181, 500, 1308, 1704, or FL parameter server 1106, 2004, and FL parameter server 2312 may be configured to perform the aforementioned functions of its corresponding entity as described with respect to FIGS. 1, 7, and 11-22. In another example, the UE 2302 may transmit reports 2310 semi-persistently within a configured time period, and the leader node 2308 or FL parameter server 2312 may select the configured time period based on a duration of time within which the UE 2302 intends to participate in clustered or peer-to-peer FL. In a further example, the UE 2302 may transmit reports 2310 aperiodically in response to requests from the leader node 2308 triggering respective report instances.

The UE 2302 may determine whether to transmit reports 2310 periodically, semi-persistently, or aperiodically, including applicable time periods as well as the time-frequency resources in which to transmit the reports, in one or more report configurations 2314 from the FL parameter server 2312 or leader node 2308. In one example, the FL parameter server 2312 may transmit report configuration 2314 via RRC signaling (the report configuration may be an RRC configuration), and the UE 2302 may transmit the report 2310 to leader node 2308 in resources indicated in the report configuration 2314. In another example, the report configuration 2314 may be triggered by the leader node 2308. For instance, the leader node 2308 may reserve sidelink resources in PSSCH for transmission of the report configuration 2314 and reception of the report 2310, and the leader node may transmit the report configuration in the reserved sidelink resources indicated in SCI. In such example, the UE may transmit the report 2310 to leader node 2308 in the reserved sidelink resources. In an additional example, notwithstanding the origin of report configuration 2314, the UE 2302 may transmit report 2310 in dedicated resources for such reports, such as pre-configured time-frequency resources.

After receiving the report 2310 from the UE 2302, the leader node 2308 may aggregate this report with other reports from other UEs in the same cluster or peer-to-peer network, such as described with respect to FIGS. 19-22 (e.g., intra-cluster FL or peer-to-peer FL). For example, the leader node 2308 may receive reports 2310 from UE 1 and UE 2, including respectively updated ML model information 2306 (e.g., weights and gradients) and measurements 2304, and the leader node 2308 may aggregate the updated ML model information of the individual UEs to form local aggregated ML model information 2316. Local aggregated ML model information 2316 may correspond, for example, to updated ML model 1915, intra-cluster ML models 2013, updated global ML model 2108, and updated ML model 2211 as described with respect to FIGS. 19-22. The leader node 2308 may subsequently provide the local aggregated ML model information 2316, including the aggregated weights and gradients, to the UEs 2302 of its cluster or peer-to-peer network via a groupcast message. Using the local aggregated ML model information 2316, the UEs 2302 may continue to perform FL training, such as intra-cluster FL or peer-to-peer FL, as described with respect to FIGS. 19, 21, and 22.

Moreover, the leader node 2308 may derive measurement statistics 2318 from the measurements 2304 obtained from the UEs 2302. These measurement statistics may be, for instance, averages, maximums, variances, frequencies, or other values derived from a combination of the measurements 2304 the leader node 2308 obtains from the UEs 2302 in the same cluster or peer-to-peer network. For example, if the measurements 2304 from individual UEs include instantaneous CBRs observed over a period of time, the leader node 2308 may calculate an average or maximum CBR across the various measurements, or a variance of the observed CBRs across the multiple UEs. Similarly, if the measurements 2304 from respective UEs include average or maximum CBRs, the leader node 2308 may calculate an average of these averages, an average of the maximums, a maximum of the averages, a maximum of the maximums, or other statistic. The leader node 2308 may also or alternatively maintain a histogram of the measurements 2304 from the UEs 2302, such as individually reported CBRs. For instance, the leader node 2308 may derive total frequencies of individually reported CBR values, ranges, or other measurements from UEs 2302.

Using the measurement statistics 2318, the leader node 2308 may identify the UEs 2302 which are outliers in the cluster or peer-to-peer network led or utilized by that leader node. Outlier UEs may be, for example, UEs with measurements 2304 having significantly different values (e.g., CBR values at least three standard deviations away from a total average CBR across multiple UEs), or a different distribution of values, than that of measurement statistics 2318. For instance, the leader node 2308 may categorize a UE as an outlier in the cluster or peer-to-peer network in response to determining that the average CBR of that UE is at least three standard deviations away from the total average CBR (or nominal CBR) across multiple UEs in that cluster or network. Since the dataset of an outlier UE may impact the homogeneity of data observed within its cluster or peer-to-peer network, the leader node 2308 may inform the FL parameter server 2312 or the respective UE of this outlier UE information 2320. As a result, the FL parameter server 2312 may reassign that outlier UE to a different cluster, the UE 2302 may participate in or lead a different cluster or peer-to-peer network, or the leader node 2308 may otherwise remove the outlier UE from its cluster or peer-to-peer network to maintain data homogeneity in the cluster or network.

After obtaining the local aggregated ML model information 2316 (e.g., updated model weights and gradients), the measurement statistics 2318 (e.g., summary statistics on reported measurements from individual UEs), and outlier UE information 2320 (e.g., identifiers of outlier UEs and their measurement distributions), the leader node 2308 may provide a report 2322 to the FL parameter server 2312 including this information. Report 2322 may correspond, for example, to the message passed at operation 2008 as described with respect to FIG. 20. The FL parameter server 2312 may similarly obtain reports 2322 including local aggregated ML model information 2316, measurement statistics 2318, and outlier UE information 2320 from other leader nodes of different clusters or networks. For example, the FL parameter server 2312 may receive reports 2322 from leader nodes 1 and 2, where leader node 1 derives its local aggregated ML model information 2316, measurement statistics 2318, and outlier UE information 2320 from updated ML model information 2306 and measurements 2304 in reports 2310 from UE 1 and UE 2, and where leader node 2 derives similar information from similar reported information in reports 2310 from UE 3 and other UEs.

After receiving the reports 2322 from the leader nodes 2308, the FL parameter server 2312 may dynamically associate clusters experiencing similar conditions associated with FL training. For instance, the FL parameter server 2312 may link or associate clusters led by leader nodes 2308 reporting measurement statistics 2318 which are similar in values. As an example, if reports 2322 include CBR values (e.g., an average of average CBRs of individual UEs), the FL parameter server 2312 may obtain an average of the total CBR values across the leader nodes 2308, and the FL parameter server may link clusters associated with reports 2322 indicating CBR values that are within one or two standard deviations from the average of the total CBR values across clusters.

After performing this linking or association of clusters into groups, the FL parameter server 2312 may aggregate the local aggregated ML model information 2316 obtained in reports 2322 associated with the same group of clusters, such as described with respect to FIG. 20 (e.g., inter-cluster FL). Thus, the FL parameter server 2312 may aggregate local ML model information of leader nodes 2308 reporting similar measurement statistics (but not clusters with dissimilar measurement statistics). For example, if the cluster including UE 1 and 2 had similar measurement statistics as those of the cluster including UE 3, the FL parameter server 2312 may aggregate the aggregated model weights of UEs 1, 2, and 3. Alternatively, if the cluster including UE 1 and 2 had dissimilar measurement statistics as those of the cluster including UE 3, the FL parameter server 2312 may aggregate the aggregated model weights of UEs 1 and 2 and separately aggregate the aggregated model weights of UE 3 with those of other UEs in its cluster.

In response to performing an aggregation of local ML model updates for one cluster or group of similar clusters, the FL parameter server 2312 may derive global aggregated ML model information 2324 for that cluster or group of similar clusters. Global aggregated ML model information 2324 may correspond, for example, to updated global ML model 2011 as described with respect to FIG. 20. The FL parameter server 2312 may also reassign UEs 2302 whose identifiers are indicated in outlier UE information 2320 to a different existing cluster, or remove these UEs 2302 from their current cluster(s) to form new cluster(s) such as described with respect to 16-18. The FL parameter server 2312 may maintain outlier UE reassignment information 2326 including the identifiers of UEs 2302 reassigned to different clusters, the identifiers of leader nodes 2308 leading those different clusters, or other information based on the outlier UE information 2320.

After obtaining global aggregated ML model information 2324 and outlier UE reassignment information 2326 for a respective cluster, the FL parameter server 2312 may provide a message 2328 including this information individually via unicast to the leader node 2308 associated with that respective cluster. Message 2328 may correspond, for example, to the message passed at operation 2012 as described with respect to FIG. 20. The FL parameter server 2312 may similarly provide such messages with respective global aggregated ML model information and outlier UE reassignment information to other leader nodes from which the FL parameter server had obtained reports 2322. The global aggregated ML model information 2324 provided to different leader nodes may include the same model updates if the leader nodes lead clusters which the FL parameter server 2312 linked together as having similar measurement statistics (in a same group of clusters). Otherwise, the global aggregated ML model information 2324 may include different model updates for different leader nodes or clusters.

In response to obtaining messages 2328 from the FL parameter server 2312, the leader nodes 2308 may respectively provide messages 2330 including the global aggregated ML model information 2324 to their respective UEs 2302 to be applied for further intra-cluster FL training such as described with respect to FIGS. 19 and 20. For example, in response to receiving messages 2328 from FL parameter server 2312, leader 1 and leader 2 may respectively transmit message 2330 including the global aggregated ML model information 2324 to UEs 1 and 2, and UE 3, respectively. The leader nodes 2308 may also provide outlier UE cluster information 2332 to UE(s) which were categorized as outliers of their current cluster(s). Outlier UE cluster information 2332 may include identifiers of other leader nodes of different clusters or other information obtained or derived from outlier UE reassignment information 2326. For example, in response to receiving message 2328 from FL parameter server 2312, if leader 1 determines from outlier UE reassignment information 2326 that UE 2 is an outlier of leader 1's cluster and therefore is to be reassigned to the cluster of leader 2, leader 1 may provide outlier UE cluster information 2332 to UE 2 informing that UE of its new status as a participating node of the cluster of leader 2.

In response to receiving local aggregated ML model information 2316 (for clustered FL or peer-to-peer FL) or global aggregated ML model information 2324 (for clustered FL), the UEs 2302 may continue to perform FL training as previously described with respect to FIGS. 19-22 until their individual ML models are optimized. For example, UE 1 and UE 3 may respectively perform intra-cluster FL training in their respective clusters, following one or more iterations of intra-cluster FL training and one or more iterations of inter-cluster FL training, until a loss function respectively associated with their individual ML models is minimized such as described with respect to FIG. 6. Subsequently, the UEs 2302 may input observed data in their individual datasets into their updated ML models to respectively output sidelink communication parameters 2334, and the UEs 2302 may include these sidelink communication parameters 2334 in respective SCIs 2336 to optimize communication with other UEs 2338 (UEs 2338a, 2338b, or with UEs 2302). For example, UE 1 and UE 3 may respectively transmit SCI 2336 to UEs 2338 including a required communication range for groupcast option 1 that is derived from updated ML models following the aforementioned FL training.

Thus, referring back to the examples 700, 1300 of FIGS. 7 and 13, UEs 702, 1302 in street 704 associated with high congestion (or other similar conditions) may be grouped into one cluster 1304, while UEs 702, 1302 in street 706 associated with low congestion (or other similar conditions) may be grouped into a different cluster 1304, with or without assistance of base station 1308. Alternatively, UEs 702, 1302 in different intersections (or parts of a same intersection) may be participants in a same peer-to-peer network. UEs 702, 1302 may perform intra-cluster FL with cluster leaders 1306 and inter-cluster FL with base station 1308, or UEs 702, 1302 may perform peer-to-peer FL with other UEs in their respective zones or intersections. Moreover, UEs 702, 1302 which are determined to be outliers of their current cluster may be reassigned to another cluster. Following optimization of individual ML models through the aforementioned clustered or peer-to-peer FL process, UEs 702, 1302 may obtain and apply SCI parameters for their sidelink communications with other UEs. As a result, network performance may be improved through sidelink parameter coordination via clustered or peer-to-peer FL.

Figure 24:
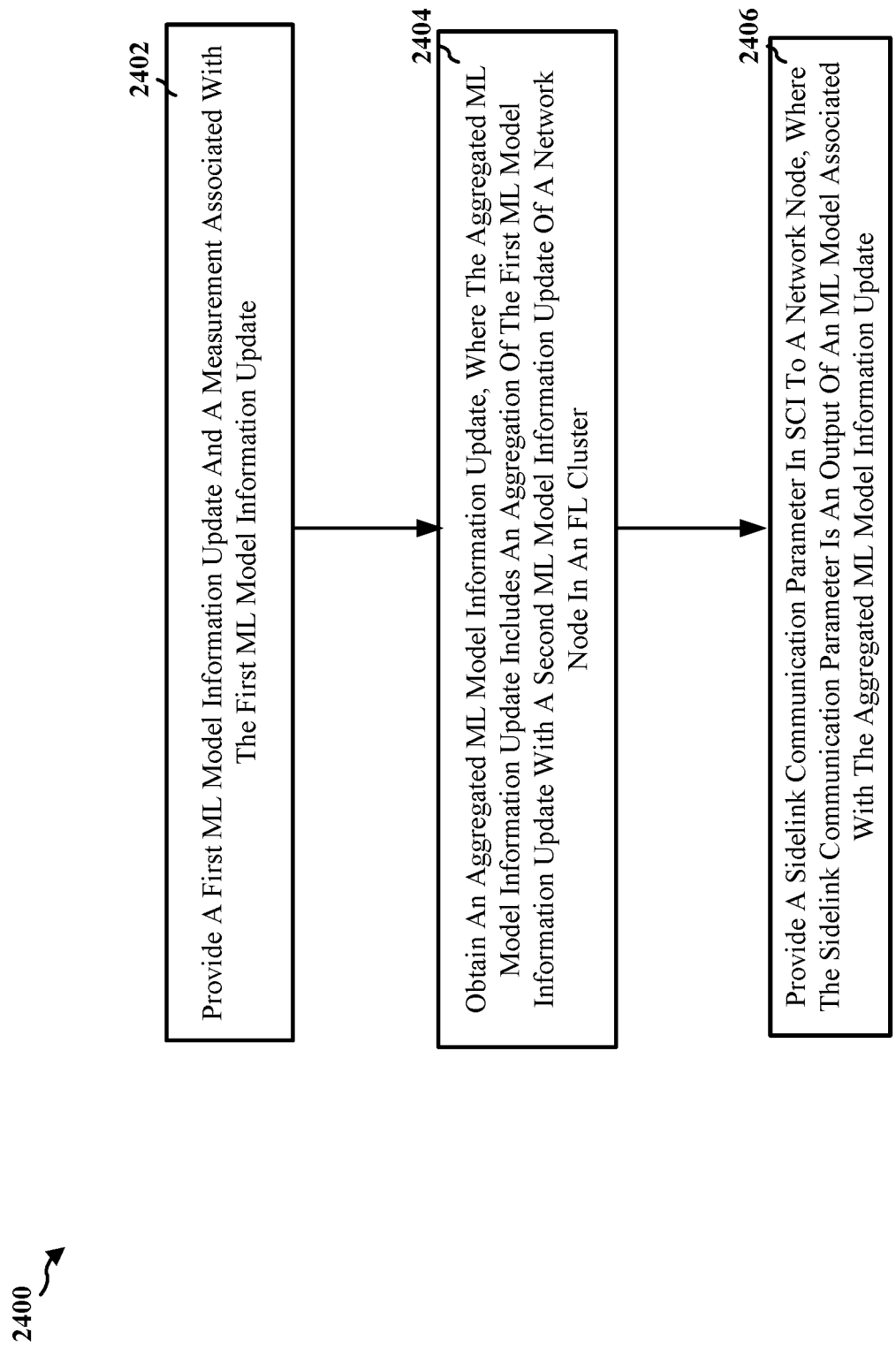
FIG. 24 is a flowchart of a method of wireless communication at a UE or a leader node.

FIG. 24 is a flowchart 2400 of a method of wireless communication. The method may be performed by a UE (e.g., UE 104, 702, 1104, 1202, 1302, 1702, 2302; device 410, 450; node 1402, 1404, 1502, 1504, 1514, 1622, 1626, 1802, 1804, 1816, 1902, 2005, 2102, 2202, the apparatus 2802) or a leader node (e.g., UE 104; device 410, 450; RSU 107, 1706; cluster leader 1108, 1306; leader 1204; node 1622, 1802, 1904, 2002; leader node 2308; the apparatus 2802). For example, the method may be performed by the controller/processor 459, 475 coupled to memory 460, 476 of device 410, 450. Optional aspects are illustrated in dashed lines. The method allows a UE or a leader node to achieve sidelink parameter coordination in mode 2 resource allocation scenarios through various signaling in clustered FL or peer-to-peer FL.

At 2402, the UE or leader node may provide a first ML model information update and a measurement associated with the first ML model information update. For example, 2402 may be performed by FL training component 3044.

In one example, if the UE performs operation 2402, then referring to FIG. 23, initially, the UE 2302 collects measurements 2304 from its environment (e.g., a CBR, a quantity of received packets at the UE, a quantity of resource reservations by other UEs, or other metrics observed instantaneously or over a configured period of time). The UE 2302 may store these observations in a local dataset and map this dataset to a ML model or policy for selecting sidelink communication parameters. For example, in mode 2 resource allocation, the UE 2302 may train a neural network (e.g., neural network 600 of FIG. 6) using reinforcement learning and backpropagation to obtain updated ML model information 2306 (e.g., weights 616, biases 618, subsampling or scaling factors in subsampling layers 608, or other updated ML model information following minimization of a loss function). After training its local ML model, the UE 2302 transmits to a leader node 2308 (e.g., a cluster leader in clustered FL or a leader in a peer-to-peer FL) a report 2310 including the updated ML model information 2306 and measurements 2304.

In another example, if the leader node performs operation 2402, then referring to FIG. 23, after receiving the local aggregated ML model information 2316 (e.g., updated model weights and gradients) and the measurement statistics 2318 (e.g., summary statistics on reported measurements from individual UEs), the leader node 2308 may transmit a report 2322 to the FL parameter server 2312 including this information (the first ML model information update and measurement respectively, in this example).

At 2404, the UE or leader node may obtain an aggregated ML model information update. For example, 2404 may be performed by FL training component 3044.

In one example, if the UE performs operation 2404, the aggregated ML model information update includes an aggregation of the first ML model information update with a second ML model information update of the first network node in a first FL cluster including the UE. For instance, referring to FIG. 23, after receiving the report 2310 from the UE 2302, the leader node 2308 may aggregate this report with other reports from other UEs in the same cluster or peer-to-peer network, such as described with respect to FIGS. 19-22 (e.g., intra-cluster FL or peer-to-peer FL). For example, the leader node 2308 may receive reports 2310 from UE 1 (the apparatus in this example) and UE 2 (the first network node in the first FL cluster including UE 1 in this example), including respectively updated ML model information 2306 (e.g., weights and gradients) and measurements 2304, and the leader node 2308 may aggregate the updated ML model information of the individual UEs to form local aggregated ML model information 2316 (the aggregated ML model information update). The leader node 2308 may subsequently transmit the local aggregated ML model information 2316, including the aggregated weights and gradients, to the UEs 2302 of its cluster or peer-to-peer network via a groupcast message. Thus, the UE 2302 may obtain (e.g., receive) the aggregated ML model information update.

In another example, if the leader node performs operation 2404, the aggregated ML model information update includes an aggregation of the first ML model information update with a second ML model information update of a network node in a FL cluster (e.g., a second network node in a second FL cluster). For instance, referring to FIG. 23, leader node 2308 of a respective cluster including UE 1 may receive global aggregated ML model information 2324 from the FL parameter server 2312, which update was aggregated with that of UE 3 (the second network node in this example) in a different cluster than UE 1.

Finally, at 2406, the UE or leader node may provide a sidelink communication parameter in SCI to a network node, wherein the sidelink communication parameter is an output of an ML model associated with the aggregated ML model information update. For example, 2406 may be performed by sidelink parameter coordination component 3046.

In one example, if the UE performs operation 2406, then referring to FIG. 23, in response to receiving local aggregated ML model information 2316 (for clustered FL or peer-to-peer FL) or global aggregated ML model information 2324 (for clustered FL), the UEs 2302 may continue to perform FL training as previously described with respect to FIGS. 19-22 until their individual ML models are optimized. Subsequently, the UEs 2302 may input observed data in their individual datasets into their updated ML models to respectively output sidelink communication parameters 2334, and the UEs 2302 may include these sidelink communication parameters 2334 in respective SCIs 2336 to optimize communication with other UEs 2338 (or with UEs 2302). For example, UE 1 and UE 3 may respectively transmit SCI 2336 to UEs 2338 (the network node in this example) including a required communication range for groupcast option 1 that is derived from updated ML models following the aforementioned FL training.

In another example, if the leader node performs operation 2406, then referring to FIG. 23, in response to receiving local aggregated ML model information 2316 (for clustered FL or peer-to-peer FL) or global aggregated ML model information 2324 (for clustered FL), leader nodes 2308 may perform FL training as previously described with respect to FIGS. 19-22 until their individual ML models are optimized. Subsequently, the leader nodes 2308 may input observed data in their individual datasets into their updated ML models to respectively output sidelink communication parameters 2334 (e.g., a required communication range for groupcast option 1), and the leader nodes may include these sidelink communication parameters 2334 in respective SCIs 2336 to optimize communication with other UEs 2338 (or with UEs 2302).

Figure 25:
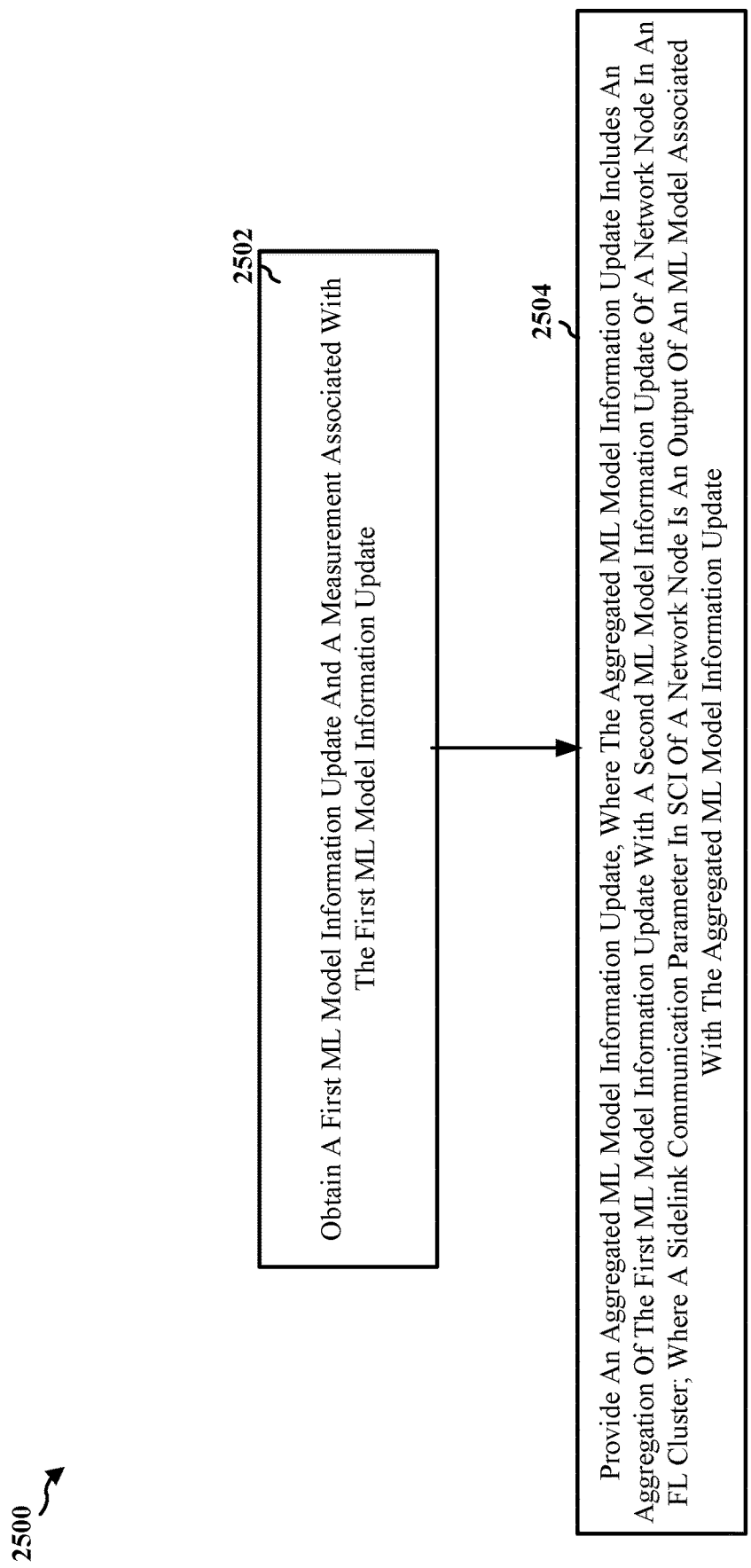
FIG. 25 is a flowchart of another method of wireless communication at a leader node or an FL parameter network entity.

FIG. 25 is a flowchart 2500 of another method of wireless communication. The method may be performed by a leader node (e.g., UE 104; device 410, 450; RSU 107, 1706; cluster leader 1108, 1306; leader 1204; node 1622, 1802, 1904, 2002; leader node 2308; the apparatus 2802) or an FL parameter network entity (e.g., base station 102/180, 181, 500, 1308, 1704; device 410, 450; FL parameter server 1106, 2004, 2312; the apparatus 2902). For example, the method may be performed by the controller/processor 459, 475 coupled to memory 460, 476 of device 410, 450. Optional aspects are illustrated in dashed lines. The method allows a leader node or an FL parameter network entity to provide sidelink parameter coordination in mode 2 resource allocation scenarios through various signaling in clustered FL or peer-to-peer FL.

At 2502, the leader node or FL parameter network entity may obtain a first ML model information update and a measurement associated with the first ML model information update. For example, 2502 may be performed by FL training component 3144.

In one example, if the leader node performs operation 2502, then referring to FIG. 23, leader node 2308 may receive updated ML model information 2306 (the first ML model information update, e.g., updated model weights and gradients) and measurement 2304 (e.g., an observed CBR, etc.) in report 2310. The measurement may be applied to the UE's ML model to result in updated ML model information 2306.

In another example, if the FL parameter network entity performs operation 2502, then referring to FIG. 23, FL parameter server 2312 (the FL parameter network entity in this example) may receive, from leader node 2308 (the FL cluster leader of an FL cluster including UE 1 and UE 2), report 2322 including local aggregated ML model information 2316 (the first ML model information update) and measurement statistics 2318 (including the measurement associated with the update in this example) that the leader node 2308 derived from measurements 2304 observed by UEs 2302. These measurements may be applied to the UEs' ML models to result in updated ML model information 2306, which the leader node 2308 aggregated into local aggregated ML model information 2316.

At 2504, the leader node or FL parameter network entity may provide an aggregated ML model information update, where the aggregated ML model information update includes an aggregation of the first ML model information update with a second ML model information update of the first network node in the first FL cluster including the apparatus; and where a sidelink communication parameter in SCI of a network node is an output of an ML model associated with the aggregated ML model information update. For example, 2504 may be performed by FL training component 3144.

In one example, if the leader node performs operation 2504, then referring to FIG. 23, leader node 2308 may transmit local aggregated ML model information 2316 (the aggregated ML model information update) to UEs 2302. For example, the local aggregated ML model information 2316 aggregates updated ML model information 2306 of UE 1 (the first ML model information update) with updated ML model information 2306 (the second ML model information update) of UE 2 (the first network node in this example), where UE 1 and UE 2 are in the same respective cluster of leader 1 (the apparatus in this example). Using the local aggregated ML model information 2316, UEs 2302, leader nodes 2308, or other network nodes (e.g., UEs 2338) may perform FL training as previously described with respect to FIGS. 19-22 until their individual ML models are optimized. Subsequently, the network nodes may input observed data in their individual datasets into their updated ML models to respectively output sidelink communication parameters 2334 (e.g., a required communication range for groupcast option 1), and the network nodes may include these sidelink communication parameters 2334 in respective SCIs 2336 to optimize communication with other network nodes.

In another example, if the FL parameter network entity performs operation 2504, then referring to FIG. 23, FL parameter server 2312 (the FL parameter network entity in this example) may transmit, to leader node 2308 (e.g., leader 1), global aggregated ML model information 2324 (the aggregated ML model information update), which aggregates the local aggregated ML model information 2316 (the first ML model information update) received from leader node 2308 (e.g., leader 1) with local aggregated ML model information (the second ML model information update) of another leader node (the second network node in this example, e.g., leader 2) in a different cluster than the leader node 2308 (e.g., leader 1). Using the local aggregated ML model information 2316, UEs 2302, leader nodes 2308, or other network nodes (e.g., UEs 2338) may perform FL training as previously described with respect to FIGS. 19-22 until their individual ML models are optimized. Subsequently, the network nodes may input observed data in their individual datasets into their updated ML models to respectively output sidelink communication parameters 2334 (e.g., a required communication range for groupcast option 1), and the network nodes may include these sidelink communication parameters 2334 in respective SCIs 2336 to optimize communication with other network nodes.

Figure 26:
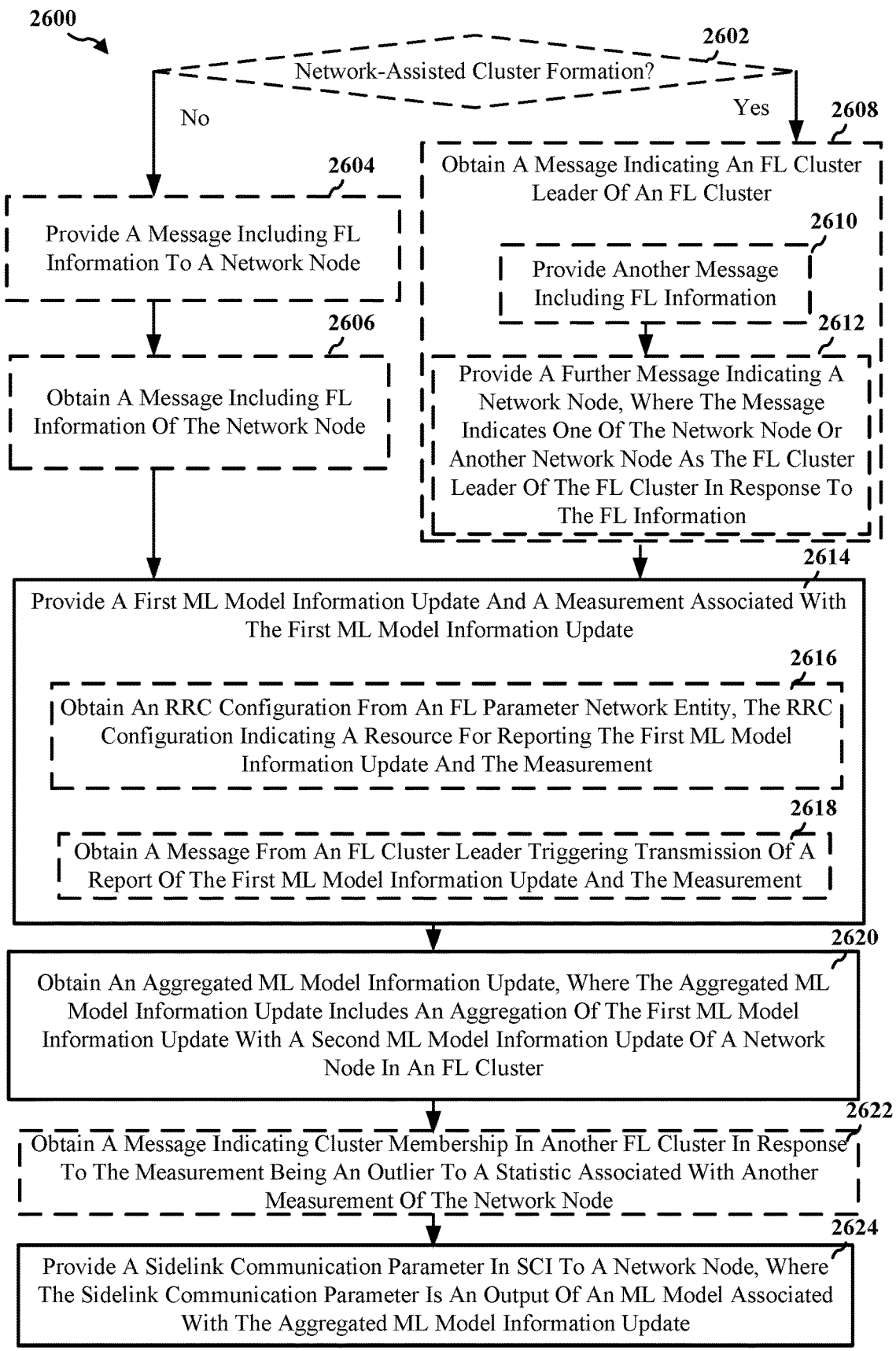
FIG. 26 is a flowchart of a method of wireless communication at a UE.

FIG. 26 is a flowchart 2600 of a method of wireless communication. The method may be performed by a UE (e.g., UE 104, 702, 1104, 1202, 1302, 1702, 2302; device 410, 450; node 1402, 1404, 1502, 1504, 1514, 1622, 1626, 1802, 1804, 1816, 1902, 2005, 2102, 2202, the apparatus 3002). For example, the method may be performed by the controller/processor 459, 475 coupled to memory 460, 476 of device 410, 450. Optional aspects are illustrated in dashed lines. The method allows a UE to achieve sidelink parameter coordination in mode 2 resource allocation scenarios through various signaling in clustered FL or peer-to-peer FL.

At 2602, the flowchart diverges depending on whether network-assisted cluster formation such as described with respect to FIGS. 17 and 18 is applied, or whether cluster formation without network assistance such as described with respect to FIGS. 16 and 18 is applied. If network assistance is not applied in cluster formation, the UE may perform operations 2604 and 2606. Otherwise, if network assistance is applied in cluster formation, the UE may perform operations 2608, 2610, and 2612. The flowchart afterwards converges at operation 2614.

At 2604, the UE may provide a first message including first FL information of the apparatus to a first network node. For example, 2604 may be performed by neighbor discovery component 3040. In one example, the first FL information comprises at least one of: a machine learning task of the apparatus; information associated with an available sensor coupled to the apparatus for the machine learning task; an available ML model associated with the machine learning task; or an available computation resource of the apparatus for the machine learning task. In one example, the machine learning task may comprise at least one of: a reinforcement learning task; an object detection task; or a classification task. For instance, referring to FIG. 14, after first node 1402 (Node 1) and second node 1404 (Node 2) have designated each other as a neighbor (i.e., a symmetric neighbor), Node 1 may transmit a message 1414 (the first message in this example) indicating its model training-related information to Node 2. This information may include, for example, ML tasks that Node 1 is participating in or is interested in participating in (e.g., reinforcement learning, object detection, or classification), available sensors at Node 1 and their associated data input format, available ML models in training including model status, model architectures, model training parameters, and current performance (e.g., accuracy and loss), or available computation resources (e.g., whether Node 1 includes a CPU or GPU, information about its clock speed, available memory, etc.). The message 1414 may include any combination of the foregoing, as well as other information.

At 2606, the UE may obtain a second message including second FL information of the first network node. For example, 2606 may be performed by neighbor discovery component 3040. For instance, referring to FIG. 14, in response to receiving message 1414 including the model training-related information, second node 1404 (Node 2) associates this information with first node 1402 (Node 1) in its neighbor list, communication graph, or other data structure. Node 2 may then transmit message 1416 indicating model training-related information to Node 1. Thus, the first node 1402 may obtain the message 1416 (the second message in this example) from the second node 1404. This information may include, for example, ML tasks that Node 2 is participating in or is interested in participating in, available sensors at Node 2 and their associated data input format, available ML models in training including model status, model architectures, model training parameters, and current performance (e.g., accuracy and loss), and available computation resources (e.g., whether Node 2 includes a CPU or GPU, information about its clock speed, available memory, etc.). Thus, the message 1416 may include the same type of information as message 1414, but for Node 2 rather than Node 1.

The first network node may be in a first cluster based on the first FL information and the second FL information. For instance, referring to FIGS. 11, 13, 14, and 20, the first node 1402 may be grouped with second node 1404 into cluster 1102, 1304, 2006 based on the first FL information that was previously provided in the first message at 2604 and the second FL information that was previously obtained in the second message at 2606. For example, the first node 1402 and the second node 1404 may be assigned to the same cluster in response to the first node 1402 being in a neighbor list, communication graph, or other data structure of the second node following the neighbor discovery process of FIGS. 14 and 15 or the simultaneous neighbor discovery and cluster formation process of FIG. 18, or vice-versa.

At 2608, the UE may obtain a message (a first message) indicating a FL cluster leader of a first FL cluster including the apparatus. For example, 2608 may be performed by cluster formation component 3042. For instance, at 2610, the UE may provide a second message including FL information, and at 2612, the UE may provide a third message indicating a second network node, where the message (the first message) indicates one of the second network node or a third network node as the FL cluster leader of the first FL cluster based on the FL information. For example, 2610 and 2612 may be performed by cluster formation component 3042. In one example, referring to FIG. 17, the UE 1702 may transmit FL message 1708 to RSUs 1706 as prospective cluster leaders. The FL message 1708 may indicate FL or model training-related information of the UE 1702. Moreover, UE 1702 may transmit RSU indication message 1712 to RSUs 1706 which includes the identifier of a selected RSU (the second network node) to act as a delegate of the UE for passing its FL information to the base station 1704 for cluster formation and leader selection. In response, the UE 1702 may receive from the RSU 1706 which the UE identified in its RSU indication message 1712 (the second network node) or from a different RSU (the third network node), message 1718 (the first message) informing the UE of its status as a participant or follower node for FL in a cluster (e.g., cluster 1102, 1304, 2006 of FIGS. 11, 13, and 20) led by the respective RSU (the second network node or third network node), and instructing that UE to provide its ML model weight updates to that RSU for training and optimization during clustered FL. The RSU selected to serve as cluster leader, and the UEs selected to be members or participants of a cluster led by that RSU, may be based on aggregated FL information from the UE 1702 and the other UEs.

At 2614, the UE may provide a first ML model information update and a measurement associated with the first ML model information update. For example, 2614 may be performed by FL training component 3044. In one example, the measurement may include at least one of a CBR, a quantity of received packets at the apparatus, or a quantity of resource reservations by the first network node. In one example, the first ML model information update may comprise at least one of: a weight; a gradient; or a scaling factor. The scaling factor may be, for example, a multiplicand (e.g., the update may be a multiplicative delta) or a summand (e.g., the update may be an additive delta). For instance, referring to FIG. 23, initially, the UE 2302 collects measurements 2304 from its environment (e.g., a CBR, a quantity of received packets at the UE, a quantity of resource reservations by other UEs, or other metrics observed instantaneously or over a configured period of time). The UE 2302 may store these observations in a local dataset and map this dataset to a ML model or policy for selecting sidelink communication parameters. For example, in mode 2 resource allocation, the UE 2302 may train a neural network (e.g., neural network 600 of FIG. 6) using reinforcement learning and backpropagation to obtain updated ML model information 2306 (e.g., weights 616, biases 618, subsampling or scaling factors in subsampling layers 608, or other updated ML model information following minimization of a loss function). After training its local ML model, the UE 2302 transmits to a leader node 2308 (e.g., a cluster leader in clustered FL or a leader in a peer-to-peer FL) a report 2310 including the updated ML model information 2306 and measurements 2304. To reduce transmission traffic, this updated ML model information may include, for example, modified weights, weights that changed more than a threshold, or multiplicative or additive delta amounts or percentages for those weights.

In one example, the measurement may further include a statistic associated with the CBR within a configured time window. For example, referring to FIG. 23, the UE 2302 may measure a distribution of CBRs observed over a time window, calculate an average or maximum CBR from the distribution of CBRs, and transmit in a report the average or maximum CBR along with the updated model weights, gradients, or other ML model information.

In one example, the UE may provide the first ML model information update and the measurement with a periodicity configured by one of the FL cluster leader or an FL parameter network entity. For example, referring to FIG. 23, the UE 2302 may transmit reports 2310 to the leader node 2308 with a periodicity configured by the leader node 2308 or configured by a FL parameter server 2312. In another example, the UE may provide the first ML model information update and the measurement semi-persistently within a configured time window. For example, referring to FIG. 23, the UE 2302 may transmit reports 2310 semi-persistently within a configured time period, and the leader node 2308 or FL parameter server 2312 may select the configured time period based on a duration of time within which the UE 2302 intends to participate in clustered or peer-to-peer FL. In another example, the UE may provide the first ML model information update and the measurement aperiodically in response to a request from the FL cluster leader. For example, referring to FIG. 23, the UE 2302 may transmit reports 2310 aperiodically in response to requests from the leader node 2308 triggering respective report instances.

At 2616, the UE may obtain a RRC configuration from the FL parameter network entity, the RRC configuration indicating a resource for reporting the first ML model information update and the measurement. For example, 2616 may be performed by FL training component 3044. The UE may provide the first ML model information update and the measurement in the resource. For instance, referring to FIG. 23, the FL parameter server 2312 may transmit report configuration 2314 to UE 2302 via RRC signaling (the report configuration may be an RRC configuration), and after receiving the report configuration 2314, the UE 2302 may transmit the report 2310 to leader node 2308 in resources indicated in the report configuration 2314.

At 2618, the UE may obtain a message from the FL cluster leader triggering transmission of a report of the first ML model information update and the measurement. For example, 2618 may be performed by FL training component 3044. The UE may provide the first ML model information update and the measurement in a reserved sidelink resource in response to the message. For example, referring to FIG. 23, the report configuration 2314 may be triggered by the leader node 2308. For instance, the leader node 2308 may reserve sidelink resources in PSSCH for transmission of the report configuration 2314 and reception of the report 2310, and the leader node may transmit a message including the report configuration in the reserved sidelink resources indicated in SCI. In response to obtaining the report configuration 2314 (the message), the UE may transmit the report 2310 to leader node 2308 in the reserved sidelink resources.

In one example, the UE may provide the first ML model information update and the measurement in a dedicated resource for reporting the first ML model information update and the measurement. For example, referring to FIG. 23, notwithstanding the origin of report configuration 2314, the UE 2302 may transmit report 2310 in dedicated resources for such reports, such as pre-configured time-frequency resources.

At 2620, the UE may obtain an aggregated ML model information update, where the aggregated ML model information update includes an aggregation of the first ML model information update with a second ML model information update of the first network node in a first FL cluster including the apparatus. For example, 2620 may be performed by FL training component 3044. The first FL cluster may be a group of network nodes in a clustered FL architecture (e.g., where UEs may be grouped into different clusters), or in a peer-to-peer FL architecture (e.g., where UEs are in a single cluster or group of peer nodes). For instance, referring to FIG. 23, after receiving the report 2310 from the UE 2302, the leader node 2308 may aggregate this report with other reports from other UEs in the same cluster or peer-to-peer network, such as described with respect to FIGS. 19-22 (e.g., intra-cluster FL or peer-to-peer FL). For example, the leader node 2308 may receive reports 2310 from UE 1 (the apparatus in this example) and UE 2 (the first network node in the first FL cluster including UE 1 in this example), including respectively updated ML model information 2306 (e.g., weights and gradients) and measurements 2304, and the leader node 2308 may aggregate the updated ML model information of the individual UEs to form local aggregated ML model information 2316 (the aggregated ML model information update). The leader node 2308 may subsequently transmit the local aggregated ML model information 2316, including the aggregated weights and gradients, to the UEs 2302 of its cluster or peer-to-peer network via a groupcast message. Thus, the UE 2302 may obtain (e.g., receive) the aggregated ML model information update.

In one example, the UE may provide the first ML model information update and the measurement to the FL cluster leader of the first FL cluster. For instance, referring to FIG.

23, the UE 2302 transmits to a leader node 2308 the report 2310 including the updated ML model information 2306 and measurements 2304, where leader node 2308 is the cluster leader of the cluster 1102, 1304, 2006 including UE 2302 in this example.

In one example, the aggregated ML model information update from the FL cluster leader may further include an additional ML model information update of a second network node in a second FL cluster. For instance, referring to FIG. 23, in response to obtaining messages 2328 from the FL parameter server 2312, the leader nodes 2308 may respectively transmit messages 2330 including the global aggregated ML model information 2324 to their respective UEs 2302 to be applied for further intra-cluster FL training such as described with respect to FIGS. 19 and 20. For example, leader 1 may transmit message 2330 including global aggregated ML model information 2324 (the aggregated ML model information update in this example) to UE 1, which update was aggregated with that of UE 3 (the second network node in this example) in a different cluster than UE 1.

At 2622, the UE may obtain a message indicating the apparatus is a cluster member of a third FL cluster based on the measurement being an outlier to a statistic associated with a second measurement of the first network node. For example, 2622 may be performed by FL training component 3044. For instance, referring to FIG. 23, the leader nodes 2308 may transmit outlier UE cluster information 2332 in messages to UE(s) which were indicated as outliers of their current cluster(s). Outlier UEs may be, for example, UEs with measurements 2304 having significantly different values (e.g., CBR values), or a different distribution of values, than that of measurement statistics 2318 (the statistic in this example) derived from the measurements 2304 (including the second measurement in this example) obtained from other UEs (including the first network node). In response to receiving message 2328 from FL parameter server 2312, leader 1 may transmit outlier UE cluster information 2332 to UE 2 informing that UE of its new status as a participating node of the cluster of leader 2 (the third FL cluster in this example).

At 2624, the UE may provide a sidelink communication parameter in SCI to a network node, wherein the sidelink communication parameter is an output of an ML model associated with the aggregated ML model information update. For example, 2624 may be performed by sidelink parameter coordination component 3046. For instance, referring to FIG. 23, in response to receiving local aggregated ML model information 2316 (for clustered FL or peer-to-peer FL) or global aggregated ML model information 2324 (for clustered FL), the UEs 2302 may continue to perform FL training as previously described with respect to FIGS. 19-22 until their individual ML models are optimized. Subsequently, the UEs 2302 may input observed data in their individual datasets into their updated ML models to respectively output sidelink communication parameters 2334, and the UEs 2302 may include these sidelink communication parameters 2334 in respective SCIs 2336 to optimize communication with other UEs 2338 (or with UEs 2302). For example, UE 1 and UE 3 may respectively transmit SCI 2336 to UEs 2338 (the network node in this example) including a required communication range for groupcast option 1 that is derived from updated ML models following the aforementioned FL training.

In one example, the first network node and the second network node may be a same network node or different network nodes. In one example, the first FL cluster and the second FL cluster may be a same FL cluster or different FL clusters.

In one example, the first network node may be a first UE, and the second network node may be a second UE or an RSU. In this example, the apparatus may be a third UE and the network node may be a second RSU. Alternatively, the apparatus and the network node may be UEs.

Figure 27:
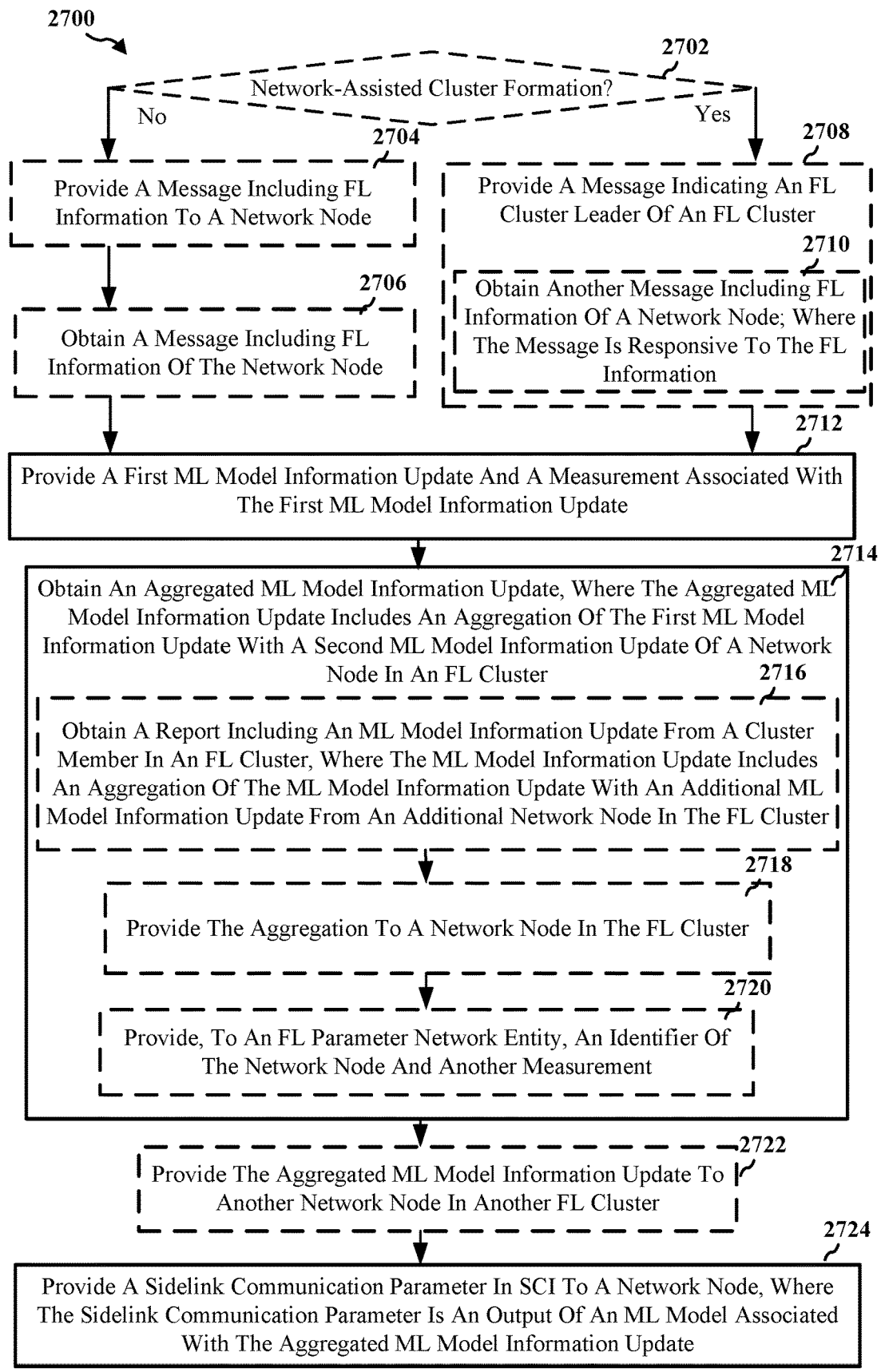
FIG. 27 is a flowchart of another method of wireless communication at a leader node.

FIG. 27 is a flowchart 2700 of a method of wireless communication. The method may be performed by a leader node (e.g., UE 104; device 410, 450; RSU 107, 1706; cluster leader 1108, 1306; leader 1204; node 1622, 1802, 1904, 2002; leader node 2308; the apparatus 3002). For example, the method may be performed by the controller/processor 459, 475 coupled to memory 460, 476 of device 410, 450. Optional aspects are illustrated in dashed lines. The method allows a leader node to achieve sidelink parameter coordination in mode 2 resource allocation scenarios through various signaling in clustered FL or peer-to-peer FL.

At 2702, the flowchart diverges depending on whether network-assisted cluster formation such as described with respect to FIGS. 17 and 18 is applied, or whether cluster formation without network assistance such as described with respect to FIGS. 16 and 18 is applied. If network assistance is not applied in cluster formation, the leader node may perform operations 2704 and 2706. Otherwise, if network assistance is applied in cluster formation, the leader node may perform operations 2708 and 2710. The flowchart afterwards converges at operation 2712.

At 2704, the leader node may provide a first message including first FL information of the apparatus to a first network node. For example, 2704 may be performed by neighbor discovery component 3040. In one example, the first FL information may comprise at least one of: a machine learning task of the apparatus; information associated with an available sensor coupled to the apparatus for the machine learning task; an available ML model associated with the machine learning task; or an available computation resource of the apparatus for the machine learning task. In one example, the machine learning task may comprise at least one of: a reinforcement learning task; an object detection task; or a classification task. For example, the leader node may perform a similar operation to that performed by the UE at 2604 with respect to FIG. 26.

At 2706, the leader node may obtain a second message including second FL information of the first network node. For example, 2706 may be performed by neighbor discovery component 3040. The first network node may be in a first FL cluster based on the first FL information and the second FL information. For example, the leader node may perform a similar operation to that performed by the UE at 2606 with respect to FIG. 26.

At 2708, the leader node may provide a message indicating the apparatus is a FL cluster leader of a first FL cluster. For example, 2708 may be performed by cluster formation component 3042. For instance, at 2710, the leader node may obtain a second message including FL information of a first network node; where the message is responsive to the FL information. For example, 2710 may be performed by cluster formation component 3042. For example, the leader node may perform similar operations to those performed by the UE at 2608 and 2610 with respect to FIG. 26.

At 2712, the leader node may provide a first ML model information update and a measurement associated with the first ML model information update. For example, 2712 may be performed by FL training component 3044. In one example, the first ML model information update may comprise at least one of: a weight; a gradient; or a scaling factor. For instance, referring to FIG. 23, after receiving the local aggregated ML model information 2316 (e.g., updated model weights and gradients) and the measurement statistics 2318 (e.g., summary statistics on reported measurements from individual UEs), the leader node 2308 may transmit a report 2322 to the FL parameter server 2312 including this information (the first ML model information update and measurement respectively, in this example).

At 2714, the leader node may obtain an aggregated ML model information update, where the aggregated ML model information update includes an aggregation of the first ML model information update with a second ML model information update of a network node in a FL cluster (e.g., a second network node in a second FL cluster, e.g., following operation 2708). For example, 2720 may be performed by FL training component 3044. The second FL cluster may be a group of network nodes in a clustered FL architecture (e.g., where UEs may be grouped into different clusters), or in a peer-to-peer FL architecture (e.g., where UEs are in a single cluster or group of peer nodes). For instance, referring to FIG. 23, leader node 2308 of a respective cluster including UE 1 may receive global aggregated ML model information 2324 from the FL parameter server 2312, which update was aggregated with that of UE 3 (the second network node in this example) in a different cluster than UE 1.

In one example, the leader node may provide the first ML model information update and the measurement to an FL parameter network entity. For instance, referring to FIG. 23, the leader node 2308 may transmit report 2322 to the FL parameter server 2312.

At 2716, the leader node may obtain a report including a third ML model information update from the first network node in the first FL cluster, where the first ML model information update includes a second aggregation of the third ML model information update with an additional ML model information update from an additional network node in the first FL cluster. For example, 2714 may be performed by FL training component 3044. For instance, referring to FIG. 23, the leader node 2308 (cluster leader) may receive report 2310 including updated ML model information 2306 from UE 2302 (the first network node in this example) in its respective cluster. The local aggregated ML model information 2316 which the leader node 2308 transmits to the FL parameter server 2312 may include an aggregation (the second aggregation) of updated ML model information 2306 from multiple UEs 2302 (e.g., UE 1 and UE 2, where UE 2 is the additional network node in the same cluster as UE 1 in this example).

At 2718, the leader node may provide the second aggregation to the first network node in the first FL cluster. For example, 2716 may be performed by FL training component 3044. For instance, referring to FIG. 23, the leader node 2308 (the cluster leader in this example) may transmit local aggregated ML model information 2316, including the aggregation (the second aggregation) of updated ML model information 2306 of UE 1 and UE 2, to UE 1 (the first network node in this example) in its respective cluster.

In one example, the report may include a second measurement associated with the third ML model information update, and the measurement may include a statistic associated with the second measurement. For instance, referring to FIG. 23, report 2310 obtained from UE 2302 may include measurements 2304 (e.g., the second measurement in this example, including CBR, CR, etc.) which the UE observed in its environment and mapped to its local ML model (e.g., using reinforcement learning and backpropagation) to arrive at updated ML model information 2306 (the third ML model information update). Leader node 2308 may derive its own measurement or measurement statistics 2318 from the measurements 2304 obtained from the UEs (e.g., an average or maximum CBR, a variance of CBRs, etc.) and this measurement (including the statistic associated with the second measurement or measurement 2304) is reported to the FL parameter server 2312 in report 2322.

At 2720, the leader node may provide, to the FL parameter network entity, an identifier of the first network node and the second measurement. For example, 2718 may be performed by FL training component 3044. The second measurement may be an outlier to the statistic. For instance, referring to FIG. 23, leader node 2308 may transmit, to FL parameter server 2312, outlier UE information 2320 including measurements 2304 which the leader node 2308 observed to be outliers of measurement statistics 2318, as well as the identifiers of UE 2302 which observed such outlier measurements. For example, the leader node may inform the FL parameter server of the identifier of UE 2 (the first network node in this example) if UE 2's observed CBR is more than three standard deviations away from an average CBR of other UEs in the same cluster.

At 2722, the leader node may provide the aggregated ML model information update to the first network node in the first FL cluster. For example, 2722 may be performed by FL training component 3044. For instance, referring to FIG. 23, leader node 2308 may transmit global aggregated ML model information 2324 (the aggregated ML model information update) to UE 1 (the first network node in this example) in its respective cluster, after leader node 2308 receives global aggregated ML model information 2324 from FL parameter server 2312.

At 2724, the leader node may provide a sidelink communication parameter in SCI to a network node, wherein the sidelink communication parameter is an output of an ML model associated with the aggregated ML model information update. For example, 2724 may be performed by sidelink parameter coordination component 3046. For instance, referring to FIG. 23, in response to receiving local aggregated ML model information 2316 (for clustered FL or peer-to-peer FL) or global aggregated ML model information 2324 (for clustered FL), leader nodes 2308 may perform FL training as previously described with respect to FIGS. 19-22 until their individual ML models are optimized. Subsequently, the leader nodes 2308 may input observed data in their individual datasets into their updated ML models to respectively output sidelink communication parameters 2334 (e.g., a required communication range for groupcast option 1), and the leader nodes may include these sidelink communication parameters 2334 in respective SCIs 2336 to optimize communication with other UEs 2338 (or with UEs 2302).

In one example, the first network node and the second network node may be a same network node or different network nodes. In one example, the first FL cluster and the second FL cluster may be a same FL cluster or different FL clusters.

In one example, the first network node may be a first UE, and the second network node may be a second UE or an RSU. In this example, the apparatus may be a third UE and the network node may be a second RSU. Alternatively, the apparatus may be the second RSU and the network node may be the third UE. Alternatively, the apparatus and the network node may be UEs. Alternatively, the apparatus and the network node may be RSUs.

Figure 28:
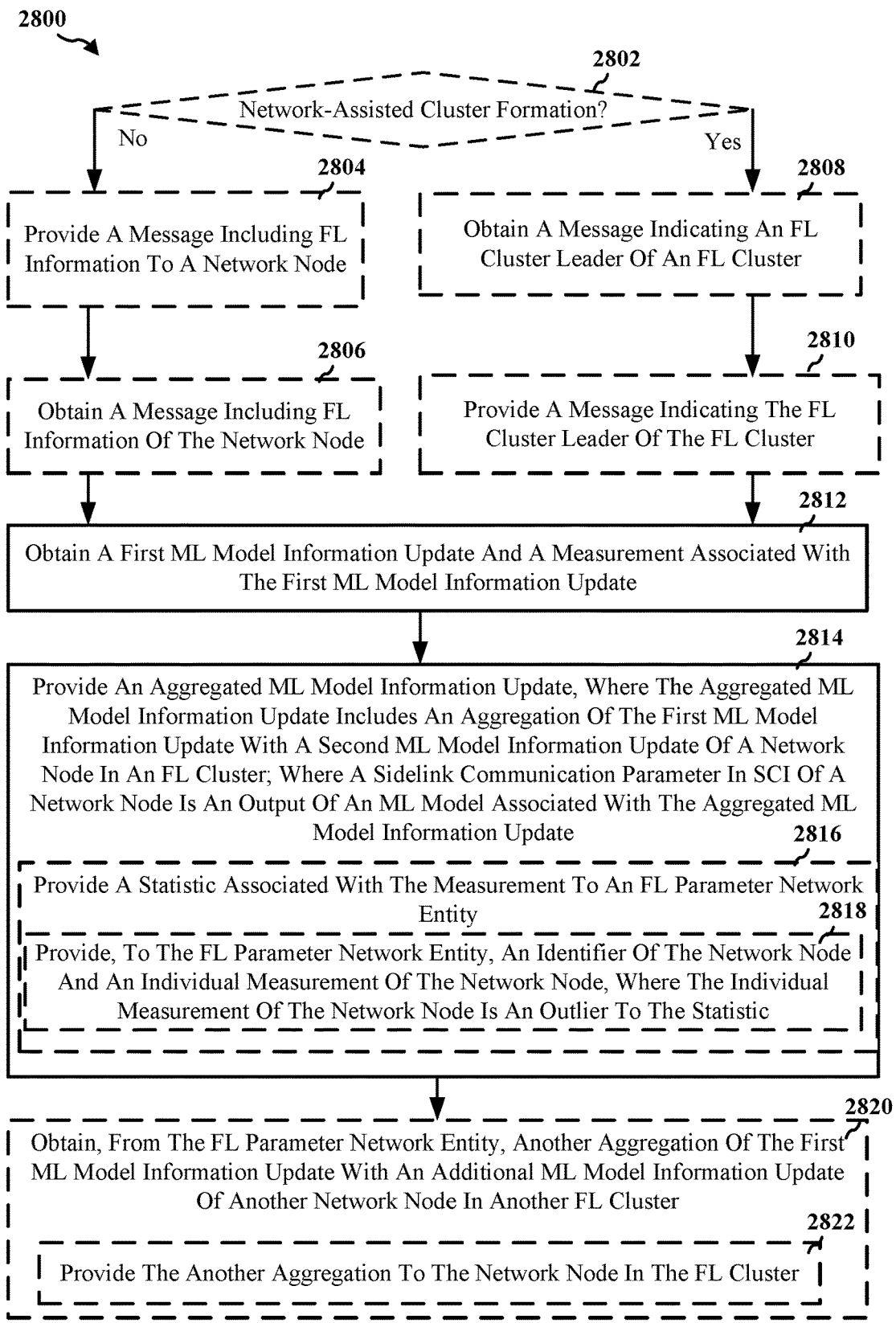
FIG. 28 is a flowchart of another method of wireless communication at a leader node.

FIG. 28 is a flowchart 2800 of another method of wireless communication. The method may be performed by a leader node (e.g., UE 104; device 410, 450; RSU 107, 1706; cluster leader 1108, 1306; leader 1204; node 1622, 1802, 1904, 2002; leader node 2308; the apparatus 3002). For example, the method may be performed by the controller/processor 459, 475 coupled to memory 460, 476 of device 410, 450. Optional aspects are illustrated in dashed lines. The method allows a leader node to provide sidelink parameter coordination in mode 2 resource allocation scenarios through various signaling in clustered FL or peer-to-peer FL.

At 2802, the flowchart diverges depending on whether network-assisted cluster formation such as described with respect to FIGS. 17 and 18 is applied, or whether cluster formation without network assistance such as described with respect to FIGS. 16 and 18 is applied. If network assistance is not applied in cluster formation, the leader node may perform operations 2804 and 2806. Otherwise, if network assistance is applied in cluster formation, the leader node may perform operations 2808 and 2810. The flowchart afterwards converges at operation 2812.

At 2804, the leader node may provide a first message including first FL information of the apparatus to a first network node. For example, 2804 may be performed by neighbor discovery component 3140. In one example, the first FL information may comprise at least one of: a machine learning task of the apparatus; an available sensor coupled to the apparatus for the machine learning task; an available ML model associated with the machine learning task; or an available computation resource of the apparatus for the machine learning task. In one example, the machine learning task may comprise at least one of: a reinforcement learning task; an object detection task; or a classification task. For example, the leader node may perform a similar operation to that performed by the UE at 2604 with respect to FIG. 26.

At 2806, the leader node may obtain a second message including second FL information of the first network node. For example, 2806 may be performed by neighbor discovery component 3140. The first network node may be in a first FL cluster based on the first FL information and the second FL information. For example, the leader node may perform a similar operation to that performed by the UE at 2606 with respect to FIG. 26.

At 2808, the leader node may obtain a message indicating a FL cluster leader of a first FL cluster including the apparatus. For example, 2808 may be performed by cluster formation component 3142. For instance, referring to FIG. 17, RSU 1 (the FL cluster leader in this example) may receive message 1716 including cluster information from base station 1704 indicating the RSU leads a cluster including itself (the apparatus) and UEs 1702.

At 2810, the leader node may provide a message indicating the apparatus is a FL cluster leader of the first FL cluster. For example, 2810 may be performed by cluster formation component 3142. For instance, referring to FIG. 18, first node 1802 (the FL cluster leader) may transmit message 1810 admitting second node 1804 into its cluster and thus indicating that first node 1802 (the apparatus) leads the cluster including second node 1804.

At 2812, the leader node may obtain a first ML model information update and a measurement associated with the first ML model information update. For example, 2812 may be performed by FL training component 3144. The first ML model information update may comprise at least one of: a weight; a gradient; or a scaling factor. For instance, referring to FIG. 23, leader node 2308 may receive updated ML model information 2306 (the first ML model information update, e.g., updated model weights and gradients) and measurement 2304 (e.g., an observed CBR, etc.) in report 2310. The measurement may be applied to the UE's ML model to result in updated ML model information 2306.

At 2814, the leader node may provide an aggregated ML model information update, where the aggregated ML model information update includes an aggregation of the first ML model information update with a second ML model information update of the first network node in the first FL cluster including the apparatus; and where a sidelink communication parameter in SCI of a network node is an output of an ML model associated with the aggregated ML model information update. For example, 2814 may be performed by FL training component 3144. The first FL cluster may be a group of network nodes in a clustered FL architecture (e.g., where UEs may be grouped into different clusters), or in a peer-to-peer FL architecture (e.g., where UEs are in a single cluster or group of peer nodes). For instance, referring to FIG. 23, leader node 2308 may transmit local aggregated ML model information 2316 (the aggregated ML model information update) to UEs 2302. For example, the local aggregated ML model information 2316 aggregates updated ML model information 2306 of UE 1 (the first ML model information update) with updated ML model information 2306 (the second ML model information update) of UE 2 (the first network node in this example), where UE 1 and UE 2 are in the same respective cluster of leader 1 (the apparatus in this example). Using the local aggregated ML model information 2316, UEs 2302, leader nodes 2308, or other network nodes (e.g., UEs 2338) may perform FL training as previously described with respect to FIGS. 19-22 until their individual ML models are optimized. Subsequently, the network nodes may input observed data in their individual datasets into their updated ML models to respectively output sidelink communication parameters 2334 (e.g., a required communication range for groupcast option 1), and the network nodes may include these sidelink communication parameters 2334 in respective SCIs 2336 to optimize communication with other network nodes.

In one example, the leader node may obtain the first ML model information update and the measurement from a third network node in the first FL cluster. For instance, referring to FIG. 23, leader node 2308 may receive updated ML model information 2306 (the first ML model information update) and measurement 2304 in report 2310 from UE 1 or UE 2 (the third network node in this example) in the same cluster.

In one example, the leader node may provide the aggregated ML model information update to an FL parameter network entity. For instance, referring to FIG. 23, the leader node 2308 may transmit local aggregated ML model information 2316 (the aggregated ML model information update) in report 2322 to FL parameter server 2312 (the FL parameter network entity in this example).

At 2816, the leader node may provide a statistic associated with the measurement to the FL parameter network entity. For example, 2816 may be performed by FL training component 3144. For instance, referring to FIG. 23, the leader node 2308 may transmit measurement statistics 2318 (including statistics derived from measurements 2304) in report 2322 to the FL parameter server 2312 (the FL parameter network entity in this example).

At 2818, the leader node may provide, to the FL parameter network entity, an identifier of the first network node and an individual measurement of the first network node, where the individual measurement of the first network node is an outlier to the statistic. For example, 2818 may be performed by FL training component 3144. For instance, referring to FIG. 23, leader node 2308 may transmit, to FL parameter server 2312, outlier UE information 2320 including measurements 2304 which the leader node 2308 observed to be outliers of measurement statistics 2318, as well as the identifiers of UE 2302 which observed such outlier measurements. For example, the leader node may inform the FL parameter server of the identifier of UE 2 (the first network node in this example) if UE 2's observed CBR is more than three standard deviations away from an average CBR of other UEs in the same cluster.

At 2820, the leader node may obtain, from the FL parameter network entity, a second aggregation of the first ML model information update with an additional ML model information update of a second network node in the second FL cluster. For example, 2820 may be performed by FL training component 3144. For instance, referring to FIG. 23, leader node 2308 (e.g., leader 1) may receive from FL parameter server 2312 (the FL parameter network entity in this example), global aggregated ML model information 2324, which aggregates (corresponding to the second aggregation) local aggregated ML model information 2316 (the first ML model information update) of leader node 2308 (e.g., leader 1) with local aggregated ML model information (the additional ML model information update) of another leader node (the second network node in this example, e.g., leader 2) in a different cluster than the leader node 2308 (e.g., leader 1).

At 2822, the leader node may provide the second aggregation to the first network node in the first FL cluster. For example, 2822 may be performed by FL training component 3144. For instance, referring to FIG. 23, leader node 2308 may transmit global aggregated ML model information 2324 (including the second aggregation referenced at 2820) to UE 1 or UE 2 (the first network node in this example) in its cluster.

In one example, the first network node and the second network node may be a same network node or different network nodes. In one example, the first FL cluster and the second FL cluster may be a same FL cluster or different FL clusters.

In one example, the first network node may be a first UE, the second network node may be a second UE or a RSU, and the FL parameter network entity may be a base station or server. In one example, the apparatus may be a second RSU and the network node may be a third UE. In another example, the apparatus and the network node may be RSUs.

FIG. 29 is a flowchart 2900 of a method of wireless communication. The method may be performed by an FL parameter network entity (e.g., base station 102/180, 181, 500, 1308, 1704; device 410, 450; FL parameter server 1106, 2004, 2312; the apparatus 3102). Optional aspects are illustrated in dashed lines. The method allows an FL parameter network entity to provide sidelink parameter coordination in mode 2 resource allocation scenarios through various signaling in clustered FL.

At 2902, the FL parameter network entity may obtain a first ML model information update and a measurement associated with the first ML model information update. For example, 2902 may be performed by FL training component 3144. In one example, the FL parameter network entity may obtain the first ML model information update and the measurement from a FL cluster leader of a first FL cluster. For instance, referring to FIG. 23, FL parameter server 2312 (the FL parameter network entity in this example) may receive, from leader node 2308 (the FL cluster leader of an FL cluster including UE 1 and UE 2), report 2322 including local aggregated ML model information 2316 (the first ML model information update) and measurement statistics 2318 (including the measurement associated with the update in this example) that the leader node 2308 derived from measurements 2304 observed by UEs 2302. These measurements may be applied to the UEs' ML models to result in updated ML model information 2306, which the leader node 2308 aggregated into local aggregated ML model information 2316.

At 2904, the FL parameter network entity may obtain, from an FL cluster leader, an identifier of a first network node in a first FL cluster and an individual measurement of the first network node, wherein the individual measurement of the first network node is an outlier to the measurement from the FL cluster leader. For example, 2904 may be performed by FL training component 3144. For instance, referring to FIG. 23, FL parameter server 2312 (the FL parameter network entity in this example) may receive, from leader node 2308 (the FL cluster leader in this example), outlier UE information 2320 including measurements 2304 which the leader node 2308 observed to be outliers of measurement statistics 2318, as well as the identifiers of UE 2302 which observed such outlier measurements. For example, the leader node may inform the FL parameter server of the identifier of UE 2 (the first network node in this example) if UE 2's observed CBR is more than three standard deviations away from an average CBR of other UEs in the same cluster.

At 2906, the FL parameter network entity may provide an aggregated ML model information update, where the aggregated ML model information update includes an aggregation of the first ML model information update with a second ML model information update of a network node in a FL cluster (e.g., a second network node in a second FL cluster, e.g., following operation 2904); and where a sidelink communication parameter in SCI of a network node is an output of an ML model associated with the aggregated ML model information update. For example, 2906 may be performed by FL training component 3144. The second FL cluster may be a group of network nodes in a clustered FL architecture (e.g., where UEs may be grouped into different clusters), or in a peer-to-peer FL architecture (e.g., where UEs are in a single cluster or group of peer nodes). For instance, referring to FIG. 23, FL parameter server 2312 (the FL parameter network entity in this example) may transmit, to leader node 2308 (e.g., leader 1), global aggregated ML model information 2324 (the aggregated ML model information update), which aggregates the local aggregated ML model information 2316 (the first ML model information update) received from leader node 2308 (e.g., leader 1) with local aggregated ML model information (the second ML model information update) of another leader node (the second network node in this example, e.g., leader 2) in a different cluster than the leader node 2308 (e.g., leader 1). Using the local aggregated ML model information 2316, UEs 2302, leader nodes 2308, or other network nodes (e.g., UEs 2338) may perform FL training as previously described with respect to FIGS. 19-22 until their individual ML models are optimized. Subsequently, the network nodes may input observed data in their individual datasets into their updated ML models to respectively output sidelink communication parameters 2334 (e.g., a required communication range for groupcast option 1), and the network nodes may include these sidelink communication parameters 2334 in respective SCIs 2336 to optimize communication with other network nodes.

In one example, the first ML model information update may include a second aggregation of an additional ML model information update of the first network node in the first FL cluster. For instance, referring to FIG. 23, the local aggregated ML model information 2316 (the first ML model information update) may aggregate (the second aggregation) updated ML model information 2306 (the additional ML model information update) of UEs 2302 (including the first network node) in the cluster led by leader node 2308 (the first FL cluster).

At 2908, the FL parameter network entity may provide a message indicating the first network node is a cluster member of a third FL cluster based on the individual measurement being the outlier. For example, 2908 may be performed by FL training component 3144. For instance, referring to FIG. 23, the FL parameter server 2312 (the FL parameter network entity in this example) may transmit message 2328 including outlier UE reassignment information 2326 to leader nodes 2308. The leader nodes 2308 in turn may transmit outlier UE cluster information 2332 in messages to UE(s) which were indicated as outliers of their current cluster(s) in the outlier UE reassignment information 2326. Outlier UEs may be, for example, UEs with measurements 2304 having significantly different values (e.g., CBR values), or a different distribution of values, than that of measurement statistics 2318 (the statistic in this example) derived from the measurements 2304 (including the second measurement in this example) obtained from other UEs (including the first network node). As an example, outlier UE cluster information 2332 may indicate that UE 2 (the first network node in this example) is to be reassigned as a participating node (a cluster member) in a cluster (the FL cluster) led by leader 1 to a different cluster led by leader 2 (the third FL cluster in this example).

In one example, the first network node may be a first UE, and the second network node may be a second UE or a RSU. In one example, the apparatus may be a FL parameter network entity and the network node may be the second RSU. In another example, the apparatus may be the FL parameter network entity and the network node may be a third UE. The FL parameter network entity may be a base station or server.

Figure 30:
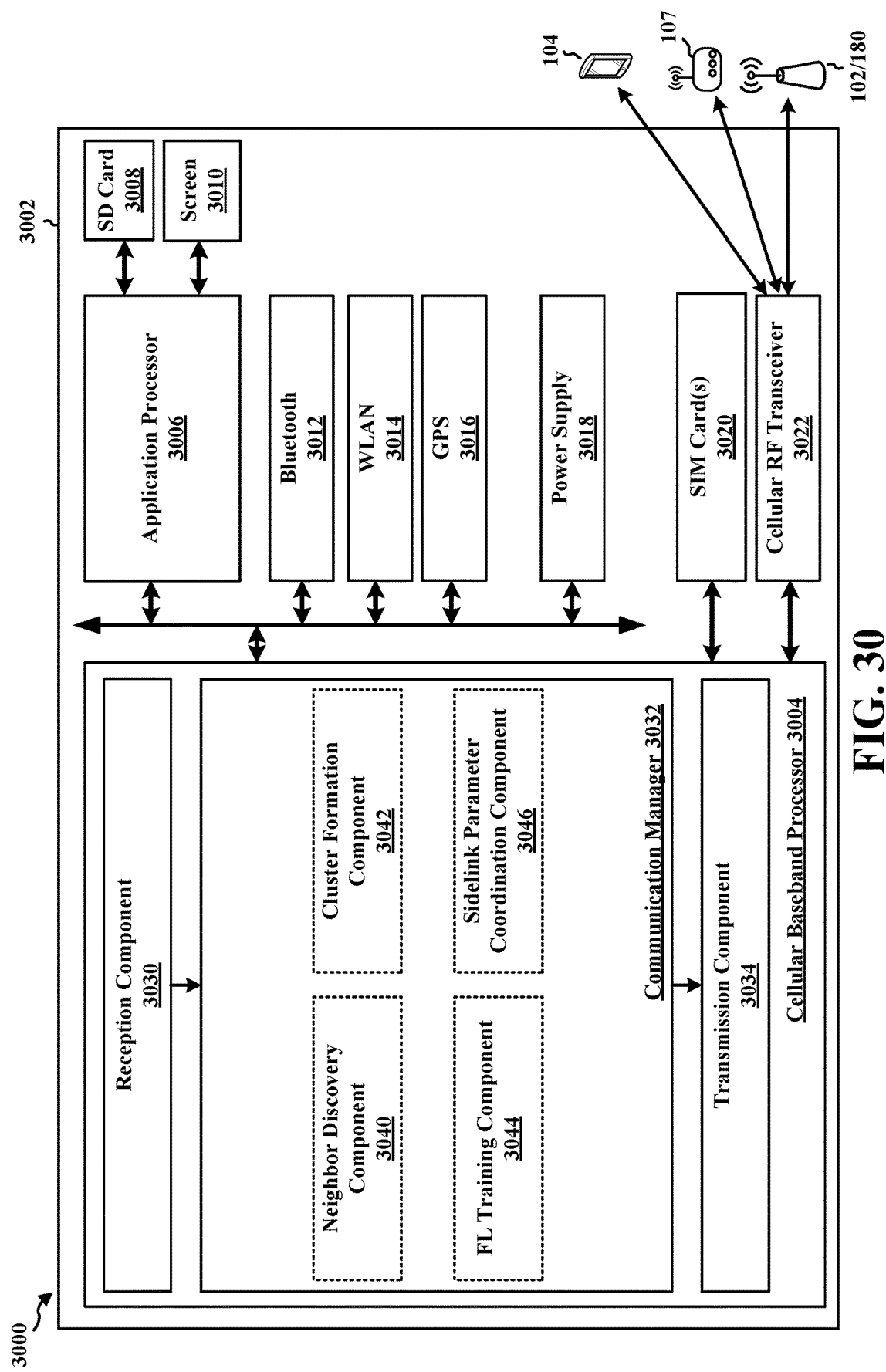
FIG. 30 is a diagram illustrating an example of a hardware implementation for an example apparatus.

FIG. 30 is a diagram 3000 illustrating an example of a hardware implementation for an apparatus 3002. The apparatus 3002 is a network node such as a UE or RSU and includes a cellular baseband processor 3004 (also referred to as a modem) coupled to a cellular RF transceiver 3022 and one or more subscriber identity modules (SIM) cards 3020, an application processor 3006 coupled to a secure digital (SD) card 3008 and a screen 3010, a Bluetooth module 3012, a wireless local area network (WLAN) module 3014, a Global Positioning System (GPS) module 3016, and a power supply 3018. The cellular baseband processor 3004 communicates through the cellular RF transceiver 3022 with the UE 104, RSU 107, BS 102/180, and/or other network node. The cellular baseband processor 3004 may include a computer-readable medium/memory. The computer-readable medium/memory may be non-transitory. The cellular baseband processor 3004 is responsible for general processing, including the execution of software stored on the computer-readable medium/memory. The software, when executed by the cellular baseband processor 3004, causes the cellular baseband processor 3004 to perform the various functions described supra. The computer-readable medium/memory may also be used for storing data that is manipulated by the cellular baseband processor 3004 when executing software. The cellular baseband processor 3004 further includes a reception component 3030, a communication manager 3032, and a transmission component 3034. The communication manager 3032 includes the one or more illustrated components. The components within the communication manager 3032 may be stored in the computer-readable medium/ memory and/or configured as hardware within the cellular baseband processor 3004. The cellular baseband processor 3004 may be a component of the device 410, 450 and may include the memory 460, 476 and/or at least one of the TX processor 428, 468, the RX processor 456, 470 and the controller/processor 459, 475. In one configuration, the apparatus 3002 may be a modem chip and include just the baseband processor 3004, and in another configuration, the apparatus 3002 may be the entire UE, RSU, or other network node (e.g., see device 410, 450 of FIG. 4) and include the aforediscussed additional modules of the apparatus 3002.

The communication manager 3032 includes a neighbor discovery component 3040 that is configured to provide a message including FL information to a network node, e.g., as described in connection with 2604 or 2704. The neighbor discovery component 3040 is further configured to obtain a message including FL information of the network node, e.g., as described in connection with 2606 or 2706.

The communication manager 3032 further includes a cluster formation component 3042 that is configured to obtain a message indicating a FL cluster leader of a FL cluster, e.g., as described in connection with 2608. The cluster formation component 3042 is further configured to provide a message including FL information, e.g., as described in connection with 2610. The cluster formation component 3042 is further configured to provide a message indicating a network node, where the message indicates one of the network node or another network node as the FL cluster leader of the FL cluster based on the FL information, e.g., as described in connection with 2612. The cluster formation component 3042 is further configured to provide a message indicating an FL cluster leader of an FL cluster, e.g., as described in connection with 2708. The cluster formation component 3042 is further configured to obtain a message including FL information of a network node; where the message is responsive to the FL information, e.g., as described in connection with 2710.

The communication manager 3032 further includes an FL training component 3044 that is configured to provide a first ML model information update and a measurement associated with the first ML model information update, e.g., as described in connection with 2402, 2614 or 2712. The FL training component 3044 is further configured to obtain an RRC configuration from an FL parameter network entity, the RRC configuration indicating a resource for reporting the first ML model information update and the measurement, e.g., as described in connection with 2616. The FL training component 3044 is further configured to obtain a message from an FL cluster leader triggering transmission of a report of the first ML model information update and the measurement, e.g., as described in connection with 2618. The FL training component 3044 is further configured to obtain an aggregated ML model information update, where the aggregated ML model information update includes an aggregation of the first ML model information update with a second ML model information update of a network node in an FL cluster, e.g., as described in connection with 2404, 2620 or 2714. The FL training component 3044 is further configured to obtain a message indicating cluster membership in another FL cluster based on the measurement being an outlier to a statistic associated with another measurement of the network node, e.g., as described in connection with 2622. The FL training component 3044 is further configured to obtain a report including an ML model information update from a cluster member in an FL cluster, where the ML model information update includes an aggregation of the ML model information update with an additional ML model information update from an additional network node in the FL cluster, e.g., as described in connection with 2716. The FL training component 3044 is further configured to provide the aggregation to a network node in the FL cluster, e.g., as described in connection with 2718. The FL training component 3044 is further configured to provide, to an FL parameter network entity, an identifier of the network node and another measurement, e.g., as described in connection with 2720. The FL training component is further configured to provide the aggregated ML model information update to another network node in another FL cluster, e.g., as described in connection with 2722.

The communication manager 3032 further includes a sidelink parameter coordination component 3046 that is configured to provide a sidelink communication parameter in SCI to a network node, where the sidelink communication parameter is an output of an ML model associated with the aggregated ML model information update, e.g., as described in connection with 2406, 2624 or 2724.

The apparatus may include additional components that perform each of the blocks of the algorithm in the aforementioned flowcharts of FIGS. 24, 26 and 27. As such, each block in the aforementioned flowcharts of FIGS. 24, 26 and 27 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 3002, and in particular the cellular baseband processor 3004, includes means for providing a first ML model information update and a measurement associated with the first ML model information update; means for obtaining an aggregated ML model information update, wherein the aggregated ML model information update includes an aggregation of the first ML model information update with a second ML model information update of one of: a first network node in a first FL cluster including the apparatus, or a second network node in a second FL cluster; and wherein the means for providing is further configured to provide a sidelink communication parameter in SCI to a network node, wherein the sidelink communication parameter is an output of an ML model associated with the aggregated ML model information update.

In one configuration, the means for providing is configured to provide the first ML model information update and the measurement to a FL cluster leader of the first FL cluster; and wherein the aggregation is with the second ML model information update of the first network node in the first FL cluster.

In one configuration, the measurement includes at least one of a channel busy ratio (CBR), a quantity of received packets at the apparatus, or a quantity of resource reservations by the first network node.

In one configuration, the measurement further includes a statistic associated with the CBR within a configured time window.

In one configuration, the means for providing is configured to provide the first ML model information update and the measurement with a periodicity configured by one of the FL cluster leader or an FL parameter network entity.

In one configuration, the means for providing is configured to provide the first ML model information update and the measurement semi-persistently within a configured time window.

In one configuration, the means for providing is configured to provide the first ML model information update and the measurement aperiodically in response to a request from the FL cluster leader.

In one configuration, the means for obtaining is further configured to: obtain a RRC configuration from an FL parameter network entity, the RRC configuration indicating a resource for reporting the first ML model information update and the measurement; wherein the means for providing is configured to provide the first ML model information update and the measurement in the resource.

In one configuration, the means for obtaining is further configured to: obtain a message from the FL cluster leader triggering transmission of a report of the first ML model information update and the measurement; wherein the means for providing is configured to provide the first ML model information update and the measurement in a reserved sidelink resource in response to the message.

In one configuration, the means for providing is configured to provide the first ML model information update and the measurement in a dedicated resource for reporting the first ML model information update and the measurement.

In one configuration, the aggregated ML model information update from the FL cluster leader further includes an additional ML model information update of the second network node in the second FL cluster.

In one configuration, the means for obtaining is further configured to: obtain a message indicating the apparatus is a cluster member of a third FL cluster based on the measurement being an outlier to a statistic associated with a second measurement of the first network node.

In one configuration, the means for providing is configured to provide the first ML model information update and the measurement to an FL parameter network entity; and wherein the aggregation is with the second ML model information update of the second network node in the second FL cluster.

In one configuration, the means for obtaining is further configured to: obtain a report including a third ML model information update from the first network node in the first FL cluster; wherein the first ML model information update includes a second aggregation of the third ML model information update with an additional ML model information update from an additional network node in the first FL cluster.

In one configuration, the means for providing is further configured to: provide the second aggregation to the first network node in the first FL cluster.

In one configuration, the report includes a second measurement associated with the third ML model information update, and the measurement includes a statistic associated with the second measurement.

In one configuration, the means for providing is further configured to: provide, to the FL parameter network entity, an identifier of the first network node and the second measurement, wherein the second measurement is an outlier to the statistic.

In one configuration, the means for providing is further configured to: provide the aggregated ML model information update to the first network node in the first FL cluster.

In one configuration, the means for providing is further configured to: provide a first message including first FL information of the apparatus to the first network node; and obtain a second message including second FL information of the first network node; wherein the first network node is in the first FL cluster based on the first FL information and the second FL information.

In one configuration, the first FL information includes at least one of: a machine learning task of the apparatus; an available sensor coupled to the apparatus for the machine learning task; an available ML model associated with the machine learning task; or an available computation resource of the apparatus for the machine learning task.

In one configuration, the machine learning task includes at least one of: a reinforcement learning task; an object detection task; or a classification task.

In one configuration, the means for obtaining is further configured to: obtain a message indicating a FL cluster leader of the first FL cluster including the apparatus.

In one configuration, the means for providing is further configured to: provide a second message including FL information; and provide a third message indicating the second network node; wherein the message indicates one of the second network node or a third network node as the FL cluster leader of the first FL cluster based on the FL information.

In one configuration, the means for providing is further configured to: provide a message indicating the apparatus is a FL cluster leader of the first FL cluster.

In one configuration, the means for obtaining is further configured to: obtain a second message including FL information of the first network node; wherein the message is responsive to the FL information.

In one configuration, the first network node and the second network node are a same network node or different network nodes.

In one configuration, the first FL cluster and the second FL cluster are a same FL cluster or different FL clusters.

In one configuration, the first ML model information update includes at least one of: a weight; a gradient; or a scaling factor.

In one configuration, the first network node is a first UE; wherein the second network node is a second UE or a RSU; and wherein: the apparatus is a third UE and the network node is a second RSU; the apparatus is the second RSU and the network node is the third UE; the apparatus and the network node are UEs; or the apparatus and the network node are RSUs.

The aforementioned means may be one or more of the aforementioned components of the apparatus 3002 configured to perform the functions recited by the aforementioned means. As described supra, the apparatus 3002 may include the TX processor 428, 468, the RX processor 456, 470 and the controller/processor 459, 475. As such, in one configuration, the aforementioned means may be the TX processor 428, 468, the RX processor 456, 470 and the controller/processor 459, 475 configured to perform the functions recited by the aforementioned means.

Figure 31:
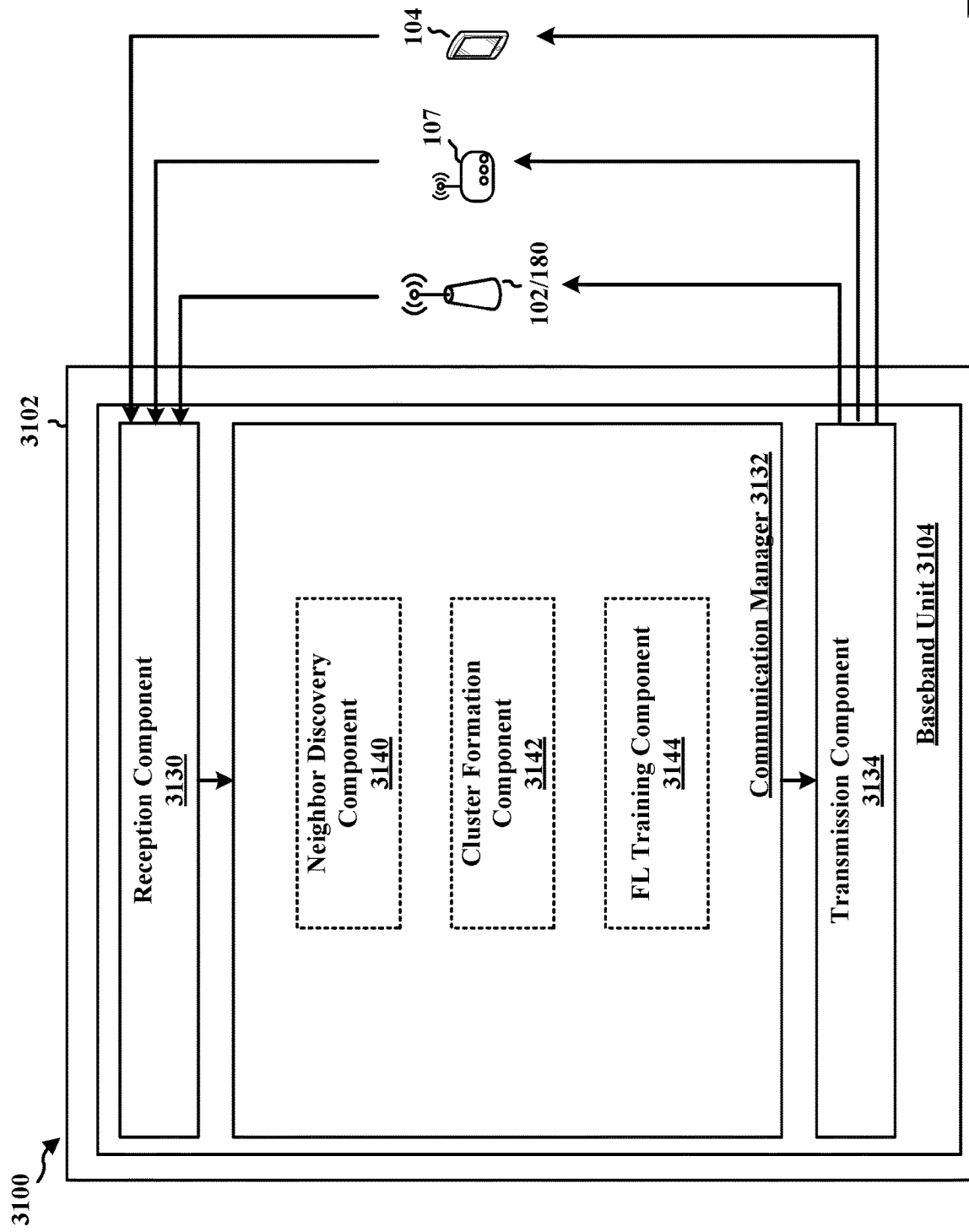
FIG. 31 is a diagram illustrating another example of a hardware implementation for another example apparatus.

FIG. 31 is a diagram 3100 illustrating an example of a hardware implementation for an apparatus 3102. The apparatus 3102 is a network node such as a RSU or BS and includes a baseband unit 3104. The baseband unit 3104 may communicate through a cellular RF transceiver with the UE 104, RSU 107, BS 102/180, or other network node. The baseband unit 3104 may include a computer-readable medium/memory. The baseband unit 3104 is responsible for general processing, including the execution of software stored on the computer-readable medium/memory. The software, when executed by the baseband unit 3104, causes the baseband unit 3104 to perform the various functions described supra. The computer-readable medium/memory may also be used for storing data that is manipulated by the baseband unit 3104 when executing software. The baseband unit 3104 further includes a reception component 3130, a communication manager 3132, and a transmission component 3134. The communication manager 3132 includes the one or more illustrated components. The components within the communication manager 3132 may be stored in the computer-readable medium/memory and/or configured as hardware within the baseband unit 3104. The baseband unit 3104 may be a component of the device 410, 450 and may include the memory 460, 476 and/or at least one of the TX processor 416, 468, the RX processor 456, 470 and the controller/processor 459, 475.

The communication manager 3132 includes a neighbor discovery component 3140 that is configured to provide a message including FL information to a network node, e.g., as described in connection with 2804. The neighbor discovery component 3140 is further configured to obtain a message including FL information of the network node, e.g., as described in connection with 2806.

The communication manager 3132 further includes a cluster formation component 3142 that is configured to obtain a message indicating an FL cluster leader of an FL cluster, e.g., as described in connection with 2808. The cluster formation component 3142 is further configured to provide a message indicating the FL cluster leader of the FL cluster, e.g., as described in connection with 2810.

The communication manager 3132 further includes an FL training component 3144 that is configured to obtain a first ML model information update and a measurement associated with the first ML model information update, e.g., as described in connection with 2502, 2812 or 2902. The FL training component 3144 is further configured to provide an aggregated ML model information update, where the aggregated ML model information update includes an aggregation of the first ML model information update with a second ML model information update of a network node in an FL cluster; where a sidelink communication parameter in SCI of a network node is an output of an ML model associated with the aggregated ML model information update, e.g., as described in connection with 2504, 2814 or 2906. The FL training component 3144 is further configured to provide a statistic associated with the measurement to an FL parameter network entity, e.g., as described in connection with 2816. The FL training component 3144 is further configured to provide, to an FL parameter network entity, an identifier of the network node and an individual measurement of the network node, where the individual measurement of the network node is an outlier to the statistic, e.g., as described in connection with 2818. The FL training component 3144 is further configured to obtain, from the FL parameter network entity, another aggregation of the first ML model information update with an additional ML model information update of another network node in another FL cluster, e.g., as described in connection with 2820. The FL training component 3144 is further configured to provide the another aggregation to the network node in the FL cluster, e.g., as described in connection with 2822. The FL training component 3144 is further configured to obtain, from an FL cluster leader, an identifier of a network node in an FL cluster and an individual measurement of the network node, where the individual measurement of the network node is an outlier to the measurement, e.g., as described in connection with 2904. The FL training component 3144 is further configured to provide a message indicating a network node is a cluster member of another FL cluster based on an individual measurement of the network node being an outlier to the measurement, e.g., as described in connection with 2908.

The apparatus may include additional components that perform each of the blocks of the algorithm in the aforementioned flowcharts of FIGS. 25, 28 and 29. As such, each block in the aforementioned flowcharts of FIGS. 25, 28 and 29 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 3102, and in particular the baseband unit 3104, includes means for obtaining a first ML model information update and a measurement associated with the first ML model information update; and means for providing an aggregated ML model information update, wherein the aggregated ML model information update includes an aggregation of the first ML model information update with a second ML model information update of one of: a first network node in a first FL cluster including the apparatus, or a second network node in a second FL cluster; and wherein a sidelink communication parameter in SCI of a network node is an output of an ML model associated with the aggregated ML model information update.

In one configuration, the means for obtaining is configured to obtain the first ML model information update and the measurement from a third network node in the first FL cluster; and wherein the aggregation is with the second ML model information update of the first network node in the first FL cluster.

In one configuration, the means for providing is configured to provide the aggregated ML model information update to an FL parameter network entity.

In one configuration, the means for providing is further configured to: provide a statistic associated with the measurement to an FL parameter network entity.

In one configuration, the means for providing is further configured to: provide, to the FL parameter network entity, an identifier of the first network node and an individual measurement of the first network node, wherein the individual measurement of the first network node is an outlier to the statistic.

In one configuration, the means for obtaining is further configured to: obtain, from an FL parameter network entity, a second aggregation of the first ML model information update with an additional ML model information update of the second network node in the second FL cluster; and provide the second aggregation to the first network node in the first FL cluster.

In one configuration, the means for obtaining is configured to obtain the first ML model information update and the measurement from a FL cluster leader of the first FL cluster; and wherein the aggregation is with the second ML model information update of the second network node in the second FL cluster.

In one configuration, the first ML model information update includes a second aggregation of an additional ML model information update of the first network node in the first FL cluster.

In one configuration, the means for obtaining is further configured to: obtain, from the FL cluster leader, an identifier of the first network node in the first FL cluster and an individual measurement of the first network node, wherein the individual measurement of the first network node is an outlier to the measurement from the FL cluster leader; and the means for providing is further configured to provide a message indicating the first network node is a cluster member of a third FL cluster based on the individual measurement being the outlier.

In one configuration, the means for providing is further configured to: provide a first message including first FL information of the apparatus to the first network node; and the means for obtaining is further configured to obtain a second message including second FL information of the first network node; wherein the first network node is in the first FL cluster based on the first FL information and the second FL information.

In one configuration, the first FL information includes at least one of: a machine learning task of the apparatus; an available sensor coupled to the apparatus for the machine learning task; an available ML model associated with the machine learning task; or an available computation resource of the apparatus for the machine learning task.

In one configuration, the machine learning task includes at least one of: a reinforcement learning task; an object detection task; or a classification task.

In one configuration, the means for obtaining is further configured to: obtain a message indicating a FL cluster leader of the first FL cluster including the apparatus.

In one configuration, the means for providing is further configured to: provide a message indicating the apparatus is a FL cluster leader of the first FL cluster.

In one configuration, the first network node and the second network node are a same network node or different network nodes.

In one configuration, the first FL cluster and the second FL cluster are a same FL cluster or different FL clusters.

In one configuration, the first ML model information update includes at least one of: a weight; a gradient; or a scaling factor.

In one configuration, the first network node is a first UE; wherein the second network node is a second UE or a RSU; wherein: the apparatus is a second RSU and the network node is a third UE; the apparatus and the network node are RSUs; the apparatus is a FL parameter network entity and the network node is the second RSU; or the apparatus is the FL parameter network entity and the network node is the third UE; and wherein the FL parameter network entity is a base station or a server.

The aforementioned means may be one or more of the aforementioned components of the apparatus 3102 configured to perform the functions recited by the aforementioned means. As described supra, the apparatus 3102 may include the TX processor 416, 468, the RX processor 456, 470 and the controller/processor 459, 475. As such, in one configuration, the aforementioned means may be the TX processor 416, 468, the RX processor 456, 470 and the controller/processor 459, 475 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.

The term "receive" and its conjugates (e.g., "receiving" and/or "received," among other examples) may be alternatively referred to as "obtain" or its respective conjugates (e.g., "obtaining" and/or "obtained," among other examples). Similarly, the term "transmit" and its conjugates (e.g., "transmitting" and/or "transmitted," among other examples) may be alternatively referred to as "provide" or its respective conjugates (e.g., "providing" and/or "provided," among other examples), "generate" or its respective conjugates (e.g., "generating" and/or "generated," among other examples), and/or "output" or its respective conjugates (e.g., "outputting" and/or "outputted," among other examples).

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other aspects or teachings described herein, without limitation.

Example 1 is an apparatus for wireless communication, including: a processor; and memory coupled with the processor, the processor configured to: provide a first machine learning (ML) model information update and a measurement associated with the first ML model information update; obtain an aggregated ML model information update, wherein the aggregated ML model information update includes an aggregation of the first ML model information update with a second ML model information update of one of: a first network node in a first federated learning (FL) cluster including the apparatus, or a second network node in a second FL cluster; and provide a sidelink communication parameter in sidelink control information (SCI) to a network node, wherein the sidelink communication parameter is an output of an ML model associated with the aggregated ML model information update.

Example 2 is the apparatus of Example 1, the processor further configured to provide the first ML model information update and the measurement to a FL cluster leader of the first FL cluster.

Example 3 is the apparatus of Example 2, wherein the aggregation is with the second ML model information update of the first network node in the first FL cluster.

Example 4 is the apparatus of Examples 2 or 3, wherein the measurement includes at least one of a channel busy ratio (CBR), a quantity of received packets at the apparatus, or a quantity of resource reservations by the first network node.

Example 5 is the apparatus of Example 4 wherein the measurement further includes a statistic associated with the CBR within a configured time window.

Example 6 is the apparatus of any of Examples 2 to 5, wherein the processor is configured to provide the first ML model information update and the measurement with a periodicity configured by one of the FL cluster leader or an FL parameter network entity.

Example 7 is the apparatus of any of Examples 2 to 5, wherein the processor is configured to provide the first ML model information update and the measurement, semi-persistently within a configured time window.

Example 8 is the apparatus of any of Examples 2 to 5, wherein the processor is configured to provide the first ML model information update and the measurement aperiodically in response to a request from the FL cluster leader.

Example 9 is the apparatus of any of Examples 2 to 8, wherein the processor is further configured to: obtain a radio resource control (RRC) configuration from an FL parameter network entity, the RRC configuration indicating a resource for reporting the first ML model information update and the measurement.

Example 10 is the apparatus of Example 9, wherein the processor is configured to provide the first ML model information update and the measurement in the resource.

Example 11 is the apparatus of any of Examples 2 to 8, wherein the processor is further configured to: obtain a message from the FL cluster leader triggering transmission of a report of the first ML model information update and the measurement.

Example 12 is the apparatus of Example 11, wherein the processor is configured to provide the first ML model information update and the measurement in a reserved sidelink resource in response to the message.

Example 13 is the apparatus of any of Examples 2 to 8, wherein the processor is configured to provide the first ML model information update and the measurement in a dedicated resource for reporting the first ML model information update and the measurement.

Example 14 is the apparatus of any of Examples 2 to 13, wherein the aggregated ML model information update from the FL cluster leader further includes an additional ML model information update of the second network node in the second FL cluster.

Example 15 is the apparatus of any of Examples 2 to 14, wherein the processor is further configured to: obtain a message indicating the apparatus is a cluster member of a third FL cluster based on the measurement being an outlier to a statistic associated with a second measurement of the first network node.

Example 16 is the apparatus of Example 1, wherein the processor is configured to provide the first ML model information update and the measurement to an FL parameter network entity.

Example 17 is the apparatus of Example 16, wherein the aggregation is with the second ML model information update of the second network node in the second FL cluster.

Example 18 is the apparatus of Example 16 or 17, wherein the processor is further configured to obtain a report including a third ML model information update from the first network node in the first FL cluster.

Example 19 is the apparatus of Example 18, wherein the first ML model information update includes a second aggregation of the third ML model information update with an additional ML model information update from an additional network node in the first FL cluster.

Example 20 is the apparatus of Example 19, wherein the processor is further configured to provide the second aggregation to the first network node in the first FL cluster.

Example 21 is the apparatus of any of Examples 18 to 20, wherein the report includes a second measurement associated with the third ML model information update, and the measurement includes a statistic associated with the second measurement.

Example 22 is the apparatus of Example 21, wherein the processor is further configured to provide, to the FL parameter network entity, an identifier of the first network node and the second measurement, wherein the second measurement is an outlier to the statistic.

Example 23 is the apparatus of any of Examples 16 to 22, wherein the processor is further configured to provide the aggregated ML model information update to the first network node in the first FL cluster.

Example 24 is the apparatus of any of Examples 1 to 23, wherein the processor is further configured to provide a first message including first FL information of the apparatus to the first network node.

Example 25 is the apparatus of Example 24, wherein the processor is further configured to obtain a second message including second FL information of the first network node.

Example 26 is the apparatus of Example 25, wherein the first network node is in the first FL cluster based on the first FL information and the second FL information.

Example 27 is the apparatus of any of Examples 24 to 26, wherein the first FL information includes a machine learning task of the apparatus.

Example 28 is the apparatus of Example 27, wherein the first FL information includes information associated with an available sensor coupled to the apparatus for the machine learning task.

Example 29 is the apparatus of Examples 27 or 28, wherein the first FL information includes an available ML model associated with the machine learning task.

Example 30 is the apparatus of any of Examples 27 to 29, wherein the first FL information includes an available computation resource of the apparatus for the machine learning task.

Example 31 is the apparatus of any of Examples 27 to 30, wherein the machine learning task includes a reinforcement learning task.

Example 32 is the apparatus of any of Examples 27 to 31, wherein the machine learning task includes an object detection task.

Example 33 is the apparatus of any of Examples 27 to 32, wherein the machine learning task includes a classification task.

Example 34 is the apparatus of any of Examples 1 to 33, wherein the processor is further configured to obtain a message indicating a FL cluster leader of the first FL cluster including the apparatus.

Example 35 is the apparatus of Example 34, wherein the processor is further configured to provide a second message including FL information.

Example 36 is the apparatus of Example 35, wherein the processor is further configured to provide a third message indicating the second network node.

Example 37 is the apparatus of Examples 35 or 36, wherein the message indicates one of the second network node or a third network node as the FL cluster leader of the first FL cluster based on the FL information.

Example 38 is the apparatus of any of Examples 1 to 33, wherein the processor is further configured to provide a message indicating the apparatus is a FL cluster leader of the first FL cluster.

Example 39 is the apparatus of Example 38, wherein the processor is further configured to obtain a second message including FL information of the first network node.

Example 40 is the apparatus of Example 39, wherein the message is responsive to the FL information.

Example 41 is the apparatus of any of Examples 1 to 40, wherein the first network node and the second network node are a same network node or different network nodes.

Example 42 is the apparatus of any of Examples 1 to 41, wherein the first FL cluster and the second FL cluster are a same FL cluster or different FL clusters.

Example 43 is the apparatus of any of Examples 1 to 42, wherein the first ML model information update includes a weight.

Example 44 is the apparatus of any of Examples 1 to 43, wherein the first ML model information update includes a gradient.

Example 45 is the apparatus of any of Examples 1 to 44, wherein the first ML model information update includes a scaling factor, the scaling factor being a multiplicand or a summand.

Example 46 is the apparatus of any of Examples 1 to 45, further including a second processor configured to transmit the sidelink communication parameter using one or more antennas to the network node.

Example 47 is the apparatus of any of Examples 1 to 46, wherein the first network node is a first user equipment (UE).

Example 48 is the apparatus of any of Examples 1 to 47, wherein the second network node is a second UE or a road side unit (RSU).

Example 49 is the apparatus of any of Examples 1 to 48, wherein the apparatus is a third UE and the network node is a second RSU.

Example 50 is the apparatus of any of Examples 1 to 48, wherein the apparatus is a second RSU and the network node is a third UE.

Example 51 is the apparatus of any of Examples 1 to 48, wherein the apparatus and the network node are UEs.

Example 52 is the apparatus of any of Examples 1 to 48, wherein the apparatus and the network node are RSUs.

Example 53 is an apparatus for wireless communication, including: a processor; and memory coupled with the processor, the processor configured to: obtain a first machine learning (ML) model information update and a measurement associated with the first ML model information update; and provide an aggregated ML model information update, wherein the aggregated ML model information update includes an aggregation of the first ML model information update with a second ML model information update of one of: a first network node in a first federated learning (FL) cluster including the apparatus, or a second network node in a second FL cluster; and wherein a sidelink communication parameter in sidelink control information (SCI) of a network node is an output of an ML model associated with the aggregated ML model information update.

Example 54 is the apparatus of Example 53, wherein the processor is further configured to obtain the first ML model information update and the measurement from a third network node in the first FL cluster.

Example 55 is the apparatus of Example 54, wherein the aggregation is with the second ML model information update of the first network node in the first FL cluster.

Example 56 is the apparatus of Examples 54 or 55, wherein the processor is further configured to provide the aggregated ML model information update to an FL parameter network entity.

Example 57 is the apparatus of any of Examples 54 to 56, wherein the processor is further configured to provide a statistic associated with the measurement to an FL parameter network entity.

Example 58 is the apparatus of Example 57, wherein the processor is further configured to provide, to the FL parameter network entity, an identifier of the first network node and an individual measurement of the first network node.

Example 59 is the apparatus of Example 58, wherein the individual measurement of the first network node is an outlier to the statistic.

Example 60 is the apparatus of any of Examples 54 to 59, wherein the processor is further configured to obtain, from an FL parameter network entity, a second aggregation of the first ML model information update with an additional ML model information update of the second network node in the second FL cluster.

Example 61 is the apparatus of Example 60, wherein the processor is further configured to provide the second aggregation to the first network node in the first FL cluster.

Example 62 is the apparatus of Example 53, wherein the processor is further configured to obtain the first ML model information update and the measurement from a FL cluster leader of the first FL cluster.

Example 63 is the apparatus of Example 62, wherein the aggregation is with the second ML model information update of the second network node in the second FL cluster.

Example 64 is the apparatus of Examples 62 or 63, wherein the first ML model information update includes an aggregation of an additional ML model information update of the first network node in the first FL cluster.

Example 65 is the apparatus of any of Examples 62 to 64, wherein the processor is further configured to obtain, from the FL cluster leader, an identifier of the first network node in the first FL cluster and an individual measurement of the first network node.

Example 66 is the apparatus of Example 65, wherein the individual measurement of the first network node is an outlier to the measurement from the FL cluster leader.

Example 67 is the apparatus of Example 66, wherein the processor is further configured to provide a message indicating the first network node is a cluster member of a third FL cluster based on the individual measurement being the outlier.

Example 68 is the apparatus of any of Examples 53 to 67, wherein the processor is further configured to provide a first message including first FL information of the apparatus to the first network node.

Example 69 is the apparatus of Example 68, wherein the processor is further configured to obtain a second message including second FL information of the first network node.

Example 70 is the apparatus of Example 69, wherein the first network node is in the first FL cluster based on the first FL information and the second FL information.

Example 71 is the apparatus of any of Examples 68 to 70, wherein the first FL information includes a machine learning task of the apparatus.

Example 72 is the apparatus of Example 71, wherein the first FL information includes information associated with an available sensor coupled to the apparatus for the machine learning task.

Example 73 is the apparatus of Examples 71 or 72, wherein the first FL information includes an available ML model associated with the machine learning task.

Example 74 is the apparatus of any of Examples 71 to 73, wherein the first FL information includes an available computation resource of the apparatus for the machine learning task.

Example 75 is the apparatus of any of Examples 71 to 74, wherein the machine learning task includes a reinforcement learning task.

Example 75 is the apparatus of any of Examples 71 to 75, wherein the machine learning task includes an object detection task.

Example 76 is the apparatus of any of Examples 71 to 76, wherein the machine learning task includes a classification task.

Example 77 is the apparatus of any of Examples 53 to 76, wherein the processor is further configured to obtain a message indicating a FL cluster leader of the first FL cluster including the apparatus.

Example 78 is the apparatus of any of Examples 53 to 76, wherein the processor is further configured to provide a message indicating the apparatus is a FL cluster leader of the first FL cluster.

Example 79 is the apparatus of any of Examples 53 to 78, wherein the first network node and the second network node are a same network node or different network nodes.

Example 80 is the apparatus of any of Examples 53 to 79, wherein the first FL cluster and the second FL cluster are a same FL cluster or different FL clusters.

Example 81 is the apparatus of any of Examples 53 to 80, wherein the first ML model information update includes a weight.

Example 82 is the apparatus of any of Examples 53 to 81, wherein the first ML model information update includes a gradient.

Example 83 is the apparatus of any of Examples 53 to 82, wherein the first ML model information update includes a scaling factor, the scaling factor being a multiplicand or a summand.

Example 84 is the apparatus of any of Examples 53 to 83, further including a second processor configured to transmit the sidelink communication parameter using one or more antennas to the network node.

Example 85 is the apparatus of any of Examples 53 to 84, wherein the first network node is a first user equipment (UE).

Example 86 is the apparatus of any of Examples 53 to 85, wherein the second network node is a second UE or a road side unit (RSU).

Example 87 is the apparatus of any of Examples 53 to 86, wherein the apparatus is a second RSU and the network node is a third UE.

Example 88 is the apparatus of any of Examples 53 to 86, wherein the apparatus and the network node are RSUs.

Example 89 is the apparatus of any of Examples 53 to 86, wherein the apparatus is a FL parameter network entity and the network node is a second RSU.

Example 90 is the apparatus of any of Examples 53 to 86, wherein the apparatus is a FL parameter network entity and the network node is a third UE.

Example 91 is the apparatus of any of Examples 53 to 90, wherein the FL parameter network entity is a base station or a server.

Example 92 is a method for wireless communication at a network entity, including: providing a first machine learning (ML) model information update and a measurement associated with the first ML model information update; obtaining an aggregated ML model information update, wherein the aggregated ML model information update includes an aggregation of the first ML model information update with a second ML model information update of one of: a first network node in a first federated learning (FL) cluster including the network entity, or a second network node in a second FL cluster; and providing a sidelink communication parameter in sidelink control information (SCI) to a network node, wherein the sidelink communication parameter is an output of an ML model associated with the aggregated ML model information update.

Example 93 is the method of Example 92, the method including one or more operations configured to be performed by the processor of the apparatus of any of Examples 1 to 52.

Example 94 is an apparatus for wireless communication, including means for providing a first machine learning (ML) model information update and a measurement associated with the first ML model information update; means for obtaining an aggregated ML model information update, wherein the aggregated ML model information update includes an aggregation of the first ML model information update with a second ML model information update of one of: a first network node in a first federated learning (FL) cluster including the network entity, or a second network node in a second FL cluster; and wherein the means for providing is further configured to provide a sidelink communication parameter in sidelink control information (SCI) to a network node, wherein the sidelink communication parameter is an output of an ML model associated with the aggregated ML model information update.

Example 95 is a non-transitory computer-readable medium storing computer-executable code, the code when executed by a processor cause the processor to provide a first machine learning (ML) model information update and a measurement associated with the first ML model information update; obtain an aggregated ML model information update, wherein the aggregated ML model information update includes an aggregation of the first ML model information update with a second ML model information update of one of: a first network node in a first federated learning (FL) cluster including the network entity, or a second network node in a second FL cluster; and provide a sidelink communication parameter in sidelink control information (SCI) to a network node, wherein the sidelink communication parameter is an output of an ML model associated with the aggregated ML model information update.

Example 96 is a method for wireless communication at a network entity, including: obtaining a first machine learning (ML) model information update and a measurement associated with the first ML model information update; providing an aggregated ML model information update, wherein the aggregated ML model information update includes an aggregation of the first ML model information update with a second ML model information update of one of: a first network node in a first federated learning (FL) cluster including the network entity, or a second network node in a second FL cluster; and wherein a sidelink communication parameter in sidelink control information (SCI) of a network node is an output of an ML model associated with the aggregated ML model information update.

Example 97 is the method of Example 96, the method including one or more operations configured to be performed by the processor of the apparatus of any of Examples 53 to 91.

Example 98 is an apparatus for wireless communication, including means for obtaining a first machine learning (ML) model information update and a measurement associated with the first ML model information update; means for providing an aggregated ML model information update, wherein the aggregated ML model information update includes an aggregation of the first ML model information update with a second ML model information update of one of: a first network node in a first federated learning (FL) cluster including the network entity, or a second network node in a second FL cluster; and wherein a sidelink communication parameter in sidelink control information (SCI) of a network node is an output of an ML model associated with the aggregated ML model information update.

Example 99 is a non-transitory computer-readable medium storing computer-executable code, the code when executed by a processor cause the processor to obtain a first machine learning (ML) model information update and a measurement associated with the first ML model information update; provide an aggregated ML model information update, wherein the aggregated ML model information update includes an aggregation of the first ML model information update with a second ML model information update of one of: a first network node in a first federated learning (FL) cluster including the network entity, or a second network node in a second FL cluster; and wherein a sidelink communication parameter in sidelink control information (SCI) of a network node is an output of an ML model associated with the aggregated ML model information update.

What is claimed is:

1. An apparatus for wireless communication, comprising:
a processor; and
memory coupled with the processor, the processor configured to:
provide a first machine learning (ML) model information update and a measurement associated with the first ML model information update;
obtain an aggregated ML model information update, wherein the aggregated ML model information update includes an aggregation of the first ML model information update with a second ML model information update of one of:
a first network node in a first federated learning (FL) cluster including the apparatus, or
a second network node in a second FL cluster; and
provide a sidelink communication parameter in sidelink control information (SCI) to a network node, wherein the sidelink communication parameter is an output of an ML model associated with the aggregated ML model information update.

2. The apparatus of claim 1, the processor further configured to provide the first ML model information update and the measurement to a FL cluster leader of the first FL cluster, and
wherein the aggregation is with the second ML model information update of the first network node in the first FL cluster.

3. The apparatus of claim 2, wherein the measurement includes at least one of a channel busy ratio (CBR), a quantity of received packets at the apparatus, or a quantity of resource reservations by the first network node.

4. The apparatus of claim 3, wherein the measurement further includes a statistic associated with the CBR within a configured time window.

5. The apparatus of claim 2,
wherein the processor is configured to provide the first ML model information update and the measurement with a periodicity configured by one of the FL cluster leader or an FL parameter network entity;
wherein the processor is configured to provide the first ML model information update and the measurement, semi-persistently within a configured time window; or
wherein the processor is configured to provide the first ML model information update and the measurement aperiodically in response to a request from the FL cluster leader.

6. The apparatus of claim 2, wherein the processor is further configured to:
obtain a radio resource control (RRC) configuration from an FL parameter network entity, the RRC configuration indicating a resource for reporting the first ML model information update and the measurement;
wherein the processor is configured to provide the first ML model information update and the measurement in the resource.

7. The apparatus of claim 2, wherein the processor is further configured to:
obtain a message from the FL cluster leader triggering transmission of a report of the first ML model information update and the measurement;
wherein the processor is configured to provide the first ML model information update and the measurement in a reserved sidelink resource in response to the message.

8. The apparatus of claim 2, wherein the processor is configured to provide the first ML model information update and the measurement in a dedicated resource for reporting the first ML model information update and the measurement.

9. The apparatus of claim 2, wherein the aggregated ML model information update from the FL cluster leader further includes an additional ML model information update of the second network node in the second FL cluster.

10. The apparatus of claim 2, wherein the processor is further configured to:
obtain a message indicating the apparatus is a cluster member of a third FL cluster based on the measurement being an outlier to a statistic associated with a second measurement of the first network node.

11. The apparatus of claim 1,
wherein the processor is configured to provide the first ML model information update and the measurement to an FL parameter network entity; and
wherein the aggregation is with the second ML model information update of the second network node in the second FL cluster.

12. The apparatus of claim 11, wherein the processor is further configured to:
obtain a report including a third ML model information update from the first network node in the first FL cluster;
wherein the first ML model information update includes a second aggregation of the third ML model information update with an additional ML model information update from an additional network node in the first FL cluster.

13. The apparatus of claim 12, wherein the processor is further configured to:
provide the second aggregation to the first network node in the first FL cluster.

14. The apparatus of claim 12, wherein the report includes a second measurement associated with the third ML model information update, and the measurement includes a statistic associated with the second measurement.

15. The apparatus of claim 14, wherein the processor is further configured to:
provide, to the FL parameter network entity, an identifier of the first network node and the second measurement, wherein the second measurement is an outlier to the statistic.

16. The apparatus of claim 11, wherein the processor is further configured to:
provide the aggregated ML model information update to the first network node in the first FL cluster.

17. The apparatus of claim 1, wherein the processor is further configured to:
provide a first message including first FL information of the apparatus to the first network node; and
obtain a second message including second FL information of the first network node;
wherein the first network node is in the first FL cluster based on the first FL information and the second FL information.

18. The apparatus of claim 17,
wherein the first FL information comprises at least one of:
a machine learning task of the apparatus;
information associated with an available sensor coupled to the apparatus for the machine learning task;
an available ML model associated with the machine learning task; or
an available computation resource of the apparatus for the machine learning task; and
wherein the machine learning task comprises at least one of:
a reinforcement learning task;
an object detection task; or
a classification task.

19. The apparatus of claim 1, wherein the processor is further configured to:
obtain a message indicating a FL cluster leader of the first FL cluster including the apparatus;
provide a second message including FL information; and
provide a third message indicating the second network node;
wherein the message indicates one of the second network node or a third network node as the FL cluster leader of the first FL cluster based on the FL information.

20. The apparatus of claim 1, wherein the processor is further configured to:
provide a message indicating the apparatus is a FL cluster leader of the first FL cluster; and obtain a second message including FL information of the first network node;
wherein the message is responsive to the FL information.

21. The apparatus of claim 1,
wherein the first network node and the second network node are a same network node or different network nodes; and
wherein the first FL cluster and the second FL cluster are a same FL cluster or different FL clusters.

22. The apparatus of claim 1, wherein the first ML model information update comprises at least one of:
a weight;
a gradient; or
a scaling factor, the scaling factor being a multiplicand or a summand.

23. The apparatus of claim 1, further comprising:
a second processor configured to transmit the sidelink communication parameter using one or more antennas to the network node;
wherein the first network node is a first user equipment (UE);
wherein the second network node is a second UE or a road side unit (RSU); and
wherein:
the apparatus is a third UE and the network node is a second RSU;
the apparatus is the second RSU and the network node is the third UE;
the apparatus and the network node are UEs; or
the apparatus and the network node are RSUs.

24. An apparatus for wireless communication, comprising:
a processor; and
memory coupled with the processor, the processor configured to:
obtain a first machine learning (ML) model information update and a measurement associated with the first ML model information update; and
provide an aggregated ML model information update, wherein the aggregated ML model information update includes an aggregation of the first ML model information update with a second ML model information update of one of:
a first network node in a first federated learning (FL) cluster including the apparatus, or
a second network node in a second FL cluster;
and wherein a sidelink communication parameter in sidelink control information (SCI) of a network node is an output of an ML model associated with the aggregated ML model information update.

25. The apparatus of claim 24,
wherein the processor is further configured to obtain the first ML model information update and the measurement from a third network node in the first FL cluster; and
wherein the aggregation is with the second ML model information update of the first network node in the first FL cluster.

26. The apparatus of claim 25, wherein the processor is further configured to provide the aggregated ML model information update to an FL parameter network entity.

27. The apparatus of claim 25, wherein the processor is further configured to:
provide a statistic associated with the measurement to an FL parameter network entity.

28. The apparatus of claim 27, wherein the processor is further configured to:
provide, to the FL parameter network entity, an identifier of the first network node and an individual measurement of the first network node, wherein the individual measurement of the first network node is an outlier to the statistic.

29. The apparatus of claim 25, wherein the processor is further configured to:
obtain, from an FL parameter network entity, a second aggregation of the first ML model information update with an additional ML model information update of the second network node in the second FL cluster; and
provide the second aggregation to the first network node in the first FL cluster.

30. The apparatus of claim 24, wherein the processor is further configured to obtain the first ML model information update and the measurement from a FL cluster leader of the first FL cluster; and
wherein the aggregation is with the second ML model information update of the second network node in the second FL cluster.

31. The apparatus of claim 30, wherein the first ML model information update includes an aggregation of an additional ML model information update of the first network node in the first FL cluster.

32. The apparatus of claim 30, wherein the processor is further configured to:
obtain, from the FL cluster leader, an identifier of the first network node in the first FL cluster and an individual measurement of the first network node, wherein the individual measurement of the first network node is an outlier to the measurement from the FL cluster leader; and
provide a message indicating the first network node is a cluster member of a third FL cluster based on the individual measurement being the outlier.

33. The apparatus of claim 24, further comprising:
a second processor configured to transmit the sidelink communication parameter using one or more antennas to the network node;
wherein the first network node is a first user equipment (UE);
wherein the second network node is a second UE or a road side unit (RSU);
wherein:
the apparatus is a second RSU and the network node is a third UE;
the apparatus and the network node are RSUs;
the apparatus is a FL parameter network entity and the network node is the second RSU; or
the apparatus is the FL parameter network entity and the network node is the third UE;
and
wherein the FL parameter network entity is a base station or a server.

34. A method for wireless communication at a network entity, comprising:
providing a first machine learning (ML) model information update and a measurement associated with the first ML model information update;
obtaining an aggregated ML model information update, wherein the aggregated ML model information update includes an aggregation of the first ML model information update with a second ML model information update of one of:
a first network node in a first federated learning (FL) cluster including the network entity, or
a second network node in a second FL cluster;

and providing a sidelink communication parameter in sidelink control information (SCI) to a network node, wherein the sidelink communication parameter is an output of an ML model associated with the aggregated ML model information update.

35. A method for wireless communication at a network entity, comprising:

obtaining a first machine learning (ML) model information update and a measurement associated with the first ML model information update;

providing an aggregated ML model information update, wherein the aggregated ML model information update includes an aggregation of the first ML model information update with a second ML model information update of one of:
- a first network node in a first federated learning (FL) cluster including the network entity, or
- a second network node in a second FL cluster;

and wherein a sidelink communication parameter in sidelink control information (SCI) of a network node is an output of an ML model associated with the aggregated ML model information update.

* * * * *